US012632062B2

(12) United States Patent
Jiang et al.

(10) Patent No.: US 12,632,062 B2
(45) Date of Patent: May 19, 2026

(54) MOVEMENT TRAJECTORY DETERMINATION

(71) Applicant: Tencent Technology (Shenzhen) Company Limited, Guangdong (CN)

(72) Inventors: Xinyang Jiang, Shenzhen (CN); Yu Zheng, Shenzhen (CN); Wanchao Chi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 140 days.

(21) Appl. No.: 18/626,088

(22) Filed: Apr. 3, 2024

(65) Prior Publication Data
US 2024/0255954 A1 Aug. 1, 2024

Related U.S. Application Data

(63) Continuation of application No. PCT/CN2023/110838, filed on Aug. 2, 2023.

(30) Foreign Application Priority Data

Sep. 7, 2022 (CN) .......................... 202211088025.2

(51) Int. Cl.
G05D 1/241 (2024.01)
G05D 1/43 (2024.01)
G05D 109/12 (2024.01)

(52) U.S. Cl.
CPC .............. G05D 1/241 (2024.01); G05D 1/43 (2024.01); *G05D 2109/12* (2024.01)

(58) Field of Classification Search
CPC ....... G05D 2109/12; G05D 1/43; G05D 1/241
USPC .......................................................... 701/25
See application file for complete search history.

(56) References Cited

U.S. PATENT DOCUMENTS

| | | | | |
|---|---|---|---|---|
| 7,386,264 B2 * | 6/2008 | Blair | .................... | G03G 15/206 |
| | | | | 399/329 |
| 8,340,817 B2 * | 12/2012 | Honda | ........................ | B25J 5/00 |
| | | | | 700/251 |
| 2007/0241713 A1 * | 10/2007 | Yamamoto | ........... | B62D 57/032 |
| | | | | 901/1 |

(Continued)

FOREIGN PATENT DOCUMENTS

CN 104374387 A 2/2015

*Primary Examiner* — Yazan A Soofi
(74) *Attorney, Agent, or Firm* — ARENTFOX SCHIFF LLP

(57) ABSTRACT

Aspects of the disclosure include a method and an apparatus. The method includes generating second relational data indicating a relationship between a movement duration and force(s) applied to a legged robot and third relational data indicating a relationship between the force(s) and a predicted rotational angle of the legged robot. The second relational data includes a vector C to be determined. Fourth relational data is generated based on the third relational data. The fourth relational data indicates a positive correlation between a target value J associated with C and a status data error between predicted status data and target status data. C that minimizes J is determined based on the second relational data and the fourth relational data. First relational data with the determined C representing a movement trajectory of a torso of the legged robot is determined. The legged robot is caused to move based on the movement trajectory.

19 Claims, 18 Drawing Sheets

(56)  References Cited

U.S. PATENT DOCUMENTS

| | | | |
|---|---|---|---|
| 2009/0069941 A1* | 3/2009 | Honda | B62D 57/032 |
| | | | 700/258 |
| 2021/0162595 A1* | 6/2021 | Bai | B25J 9/1664 |
| 2023/0381964 A1* | 11/2023 | Wang | G05D 1/08 |
| 2024/0042606 A1* | 2/2024 | Zhou | B25J 9/1664 |

* cited by examiner

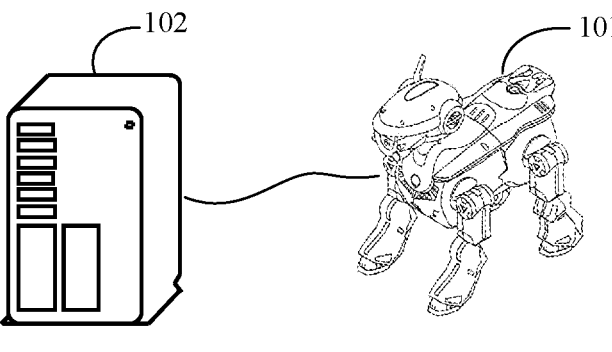

FIG. 1

| | |
|---|---|
| A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value | 201 |
| The computer device creates fourth relational data based on the third relational data, the fourth relational data indicating a positive correlation between a target value and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle | 202 |
| The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot | 203 |

FIG. 2

Figure 3:
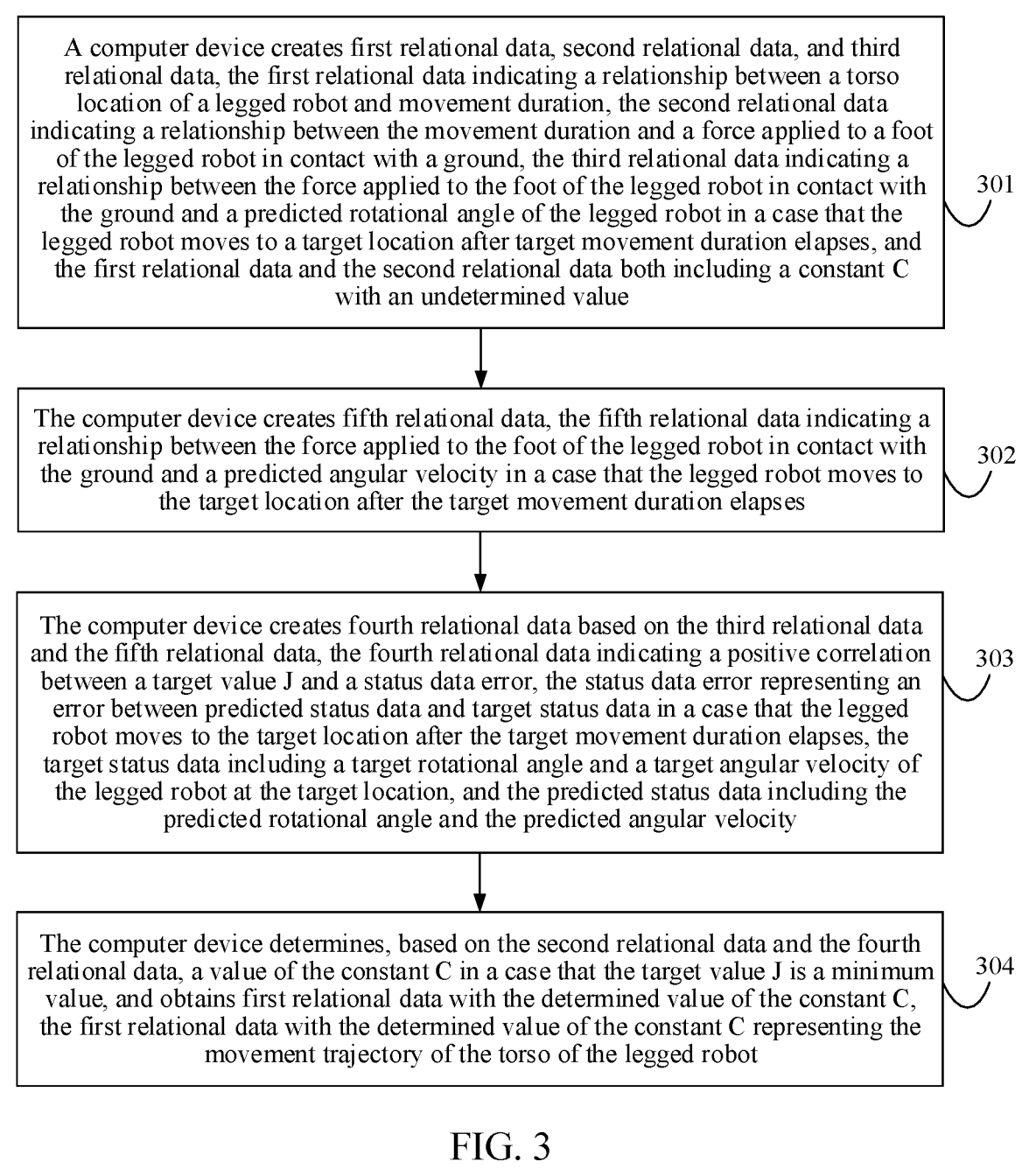

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

301

The computer device creates fifth relational data, the fifth relational data indicating a relationship between the force applied to the foot of the legged robot in contact with the ground and a predicted angular velocity in a case that the legged robot moves to the target location after the target movement duration elapses

302

The computer device creates fourth relational data based on the third relational data and the fifth relational data, the fourth relational data indicating a positive correlation between a target value J and a status data error, the status data error representing an error between predicted status data and target status data in a case that the legged robot moves to the target location after the target movement duration elapses, the target status data including a target rotational angle and a target angular velocity of the legged robot at the target location, and the predicted status data including the predicted rotational angle and the predicted angular velocity

303

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

Figure 4:
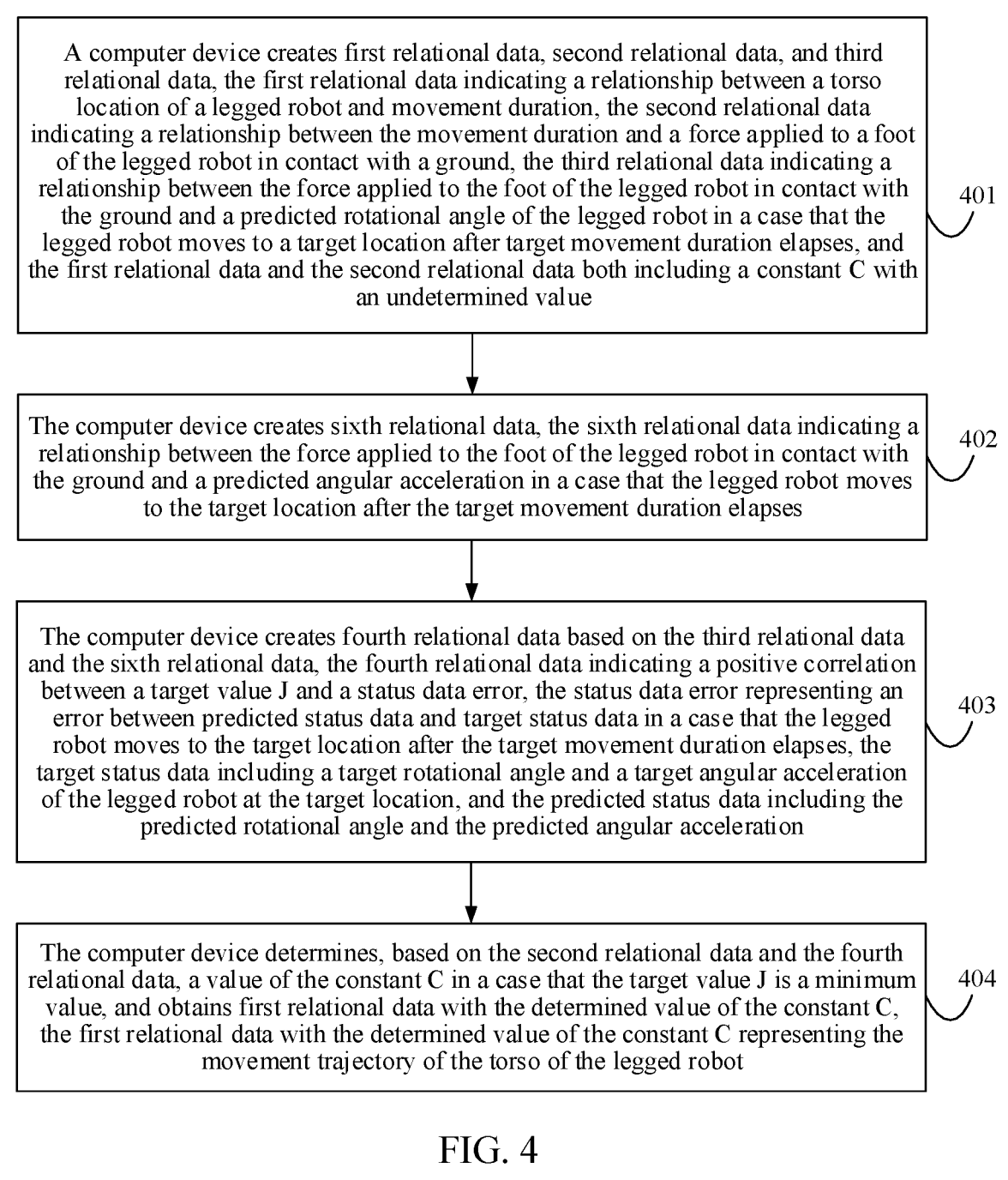

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

401

The computer device creates sixth relational data, the sixth relational data indicating a relationship between the force applied to the foot of the legged robot in contact with the ground and a predicted angular acceleration in a case that the legged robot moves to the target location after the target movement duration elapses

402

The computer device creates fourth relational data based on the third relational data and the sixth relational data, the fourth relational data indicating a positive correlation between a target value J and a status data error, the status data error representing an error between predicted status data and target status data in a case that the legged robot moves to the target location after the target movement duration elapses, the target status data including a target rotational angle and a target angular acceleration of the legged robot at the target location, and the predicted status data including the predicted rotational angle and the predicted angular acceleration

403

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

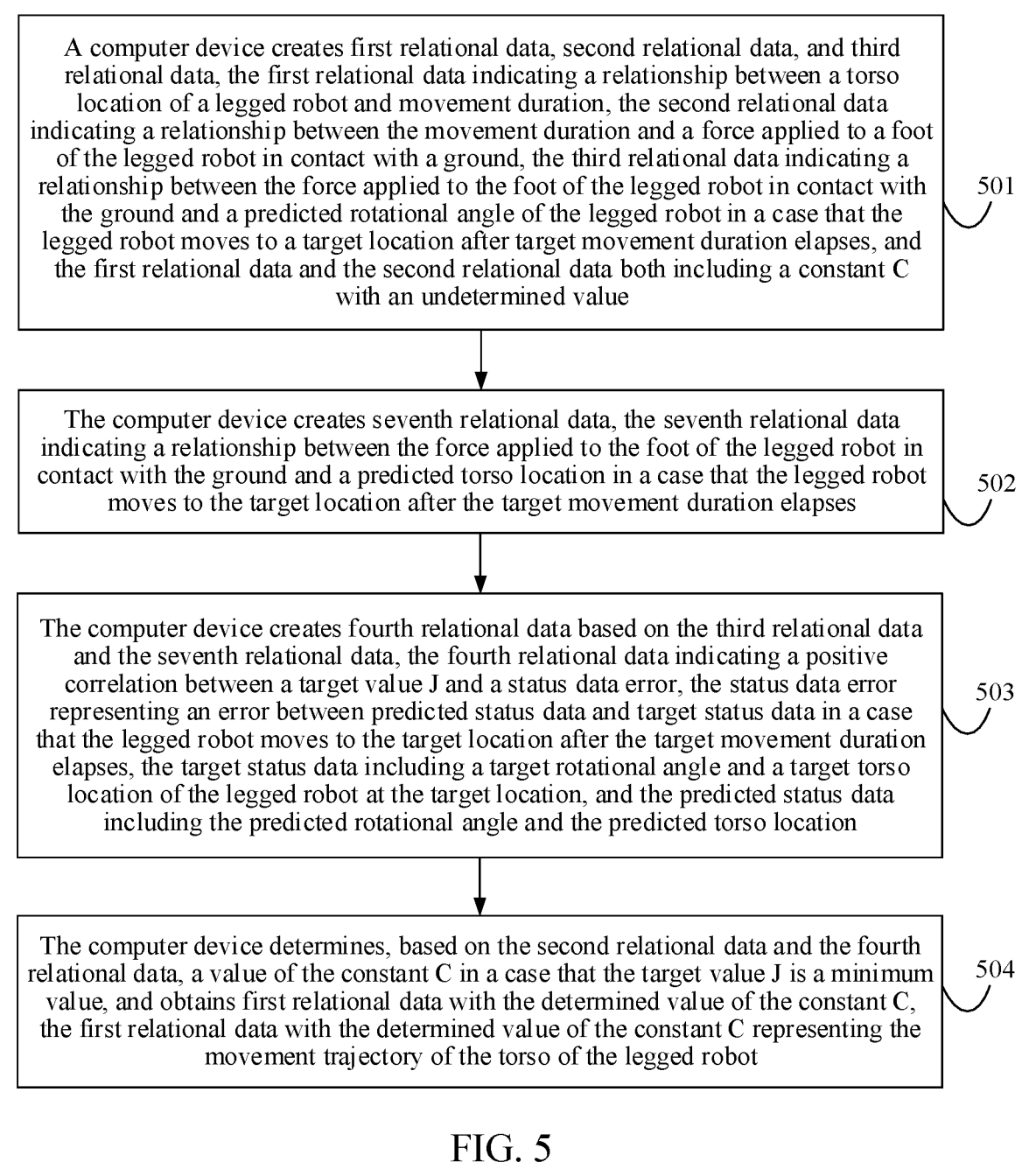

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value     501

The computer device creates seventh relational data, the seventh relational data indicating a relationship between the force applied to the foot of the legged robot in contact with the ground and a predicted torso location in a case that the legged robot moves to the target location after the target movement duration elapses     502

The computer device creates fourth relational data based on the third relational data and the seventh relational data, the fourth relational data indicating a positive correlation between a target value J and a status data error, the status data error representing an error between predicted status data and target status data in a case that the legged robot moves to the target location after the target movement duration elapses, the target status data including a target rotational angle and a target torso location of the legged robot at the target location, and the predicted status data including the predicted rotational angle and the predicted torso location     503

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot     504

FIG. 5

Figure 6:
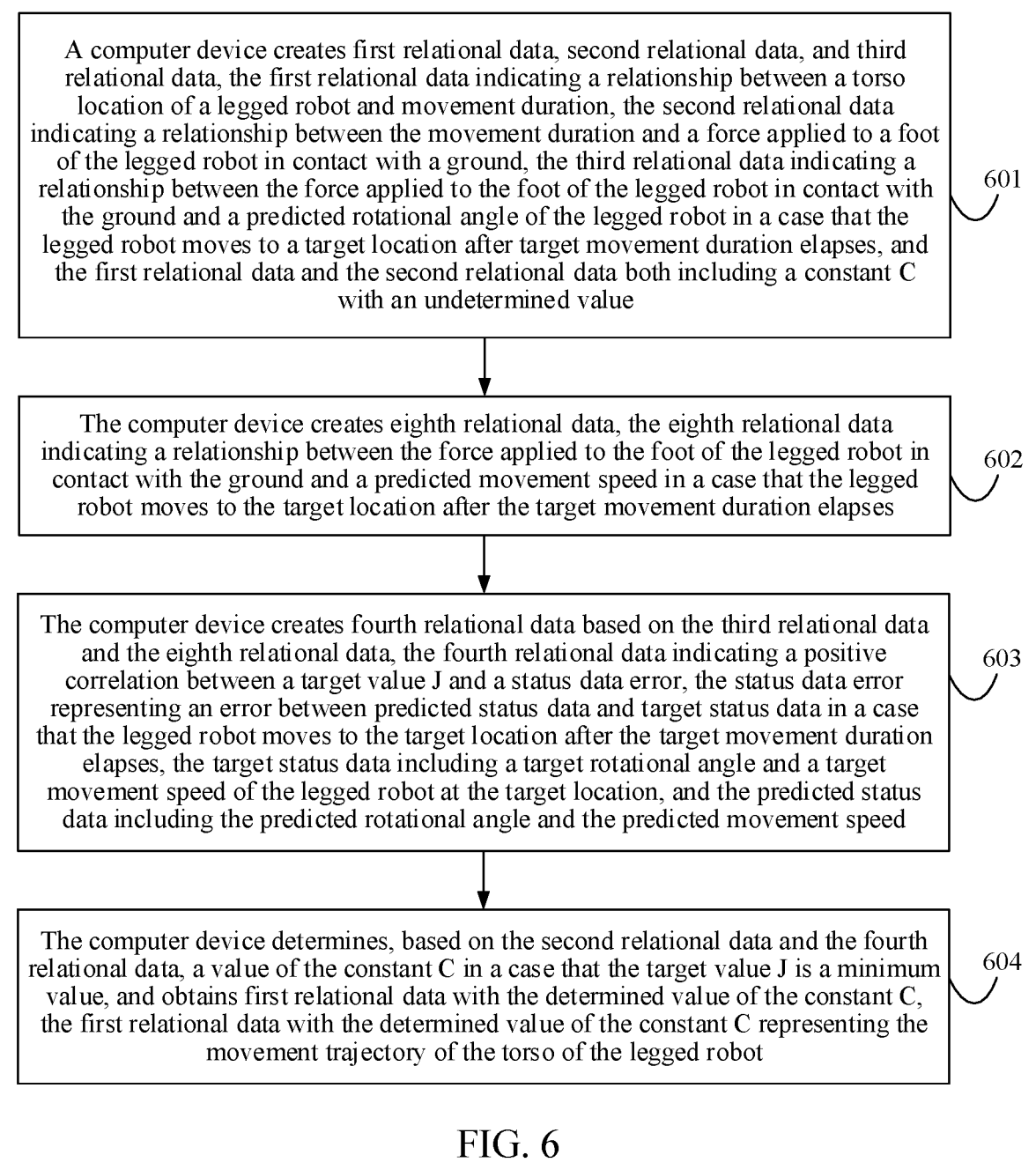

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

601

The computer device creates eighth relational data, the eighth relational data indicating a relationship between the force applied to the foot of the legged robot in contact with the ground and a predicted movement speed in a case that the legged robot moves to the target location after the target movement duration elapses

602

The computer device creates fourth relational data based on the third relational data and the eighth relational data, the fourth relational data indicating a positive correlation between a target value J and a status data error, the status data error representing an error between predicted status data and target status data in a case that the legged robot moves to the target location after the target movement duration elapses, the target status data including a target rotational angle and a target movement speed of the legged robot at the target location, and the predicted status data including the predicted rotational angle and the predicted movement speed

603

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

Figure 7:
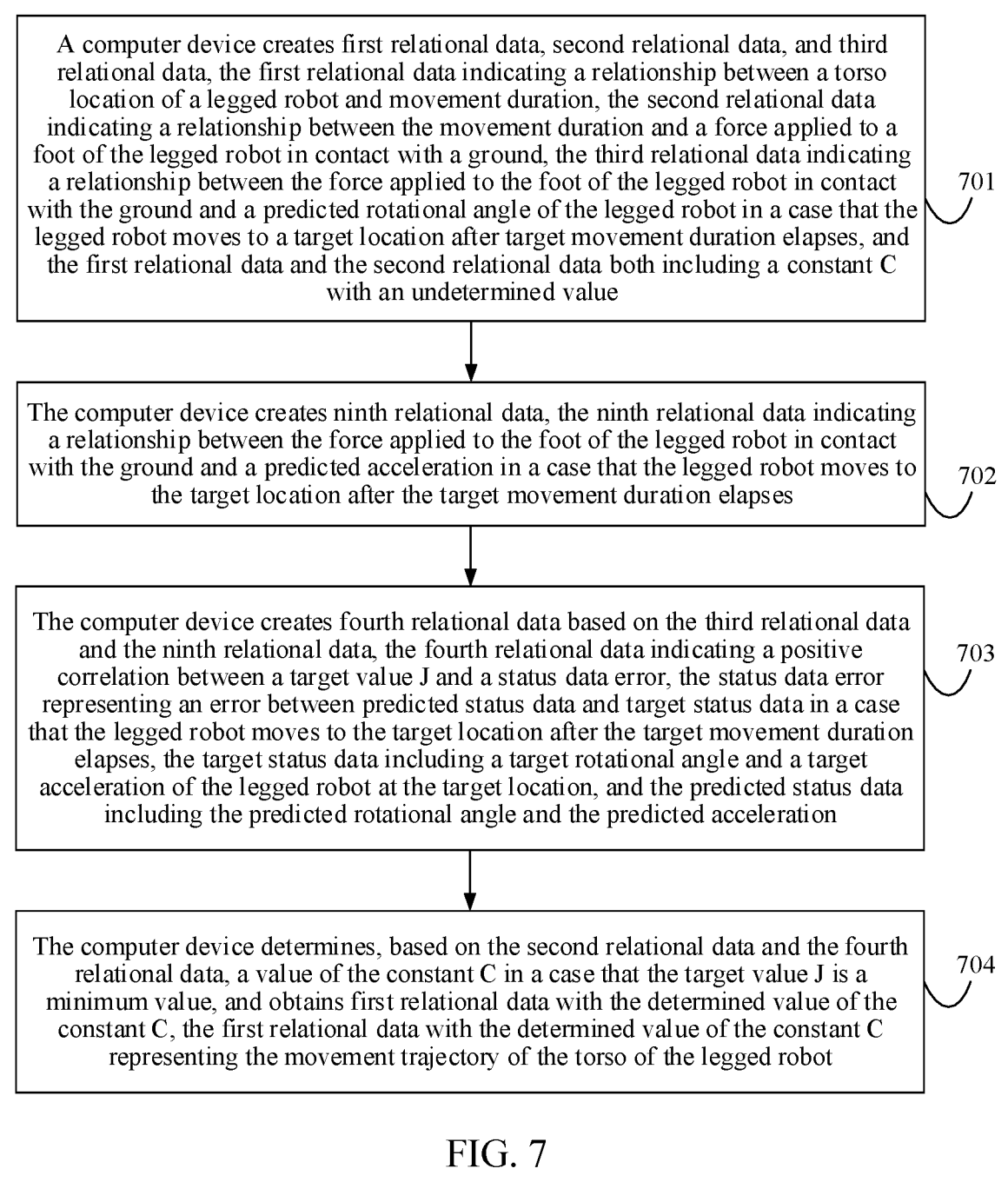

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

701

The computer device creates ninth relational data, the ninth relational data indicating a relationship between the force applied to the foot of the legged robot in contact with the ground and a predicted acceleration in a case that the legged robot moves to the target location after the target movement duration elapses

702

The computer device creates fourth relational data based on the third relational data and the ninth relational data, the fourth relational data indicating a positive correlation between a target value J and a status data error, the status data error representing an error between predicted status data and target status data in a case that the legged robot moves to the target location after the target movement duration elapses, the target status data including a target rotational angle and a target acceleration of the legged robot at the target location, and the predicted status data including the predicted rotational angle and the predicted acceleration

703

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

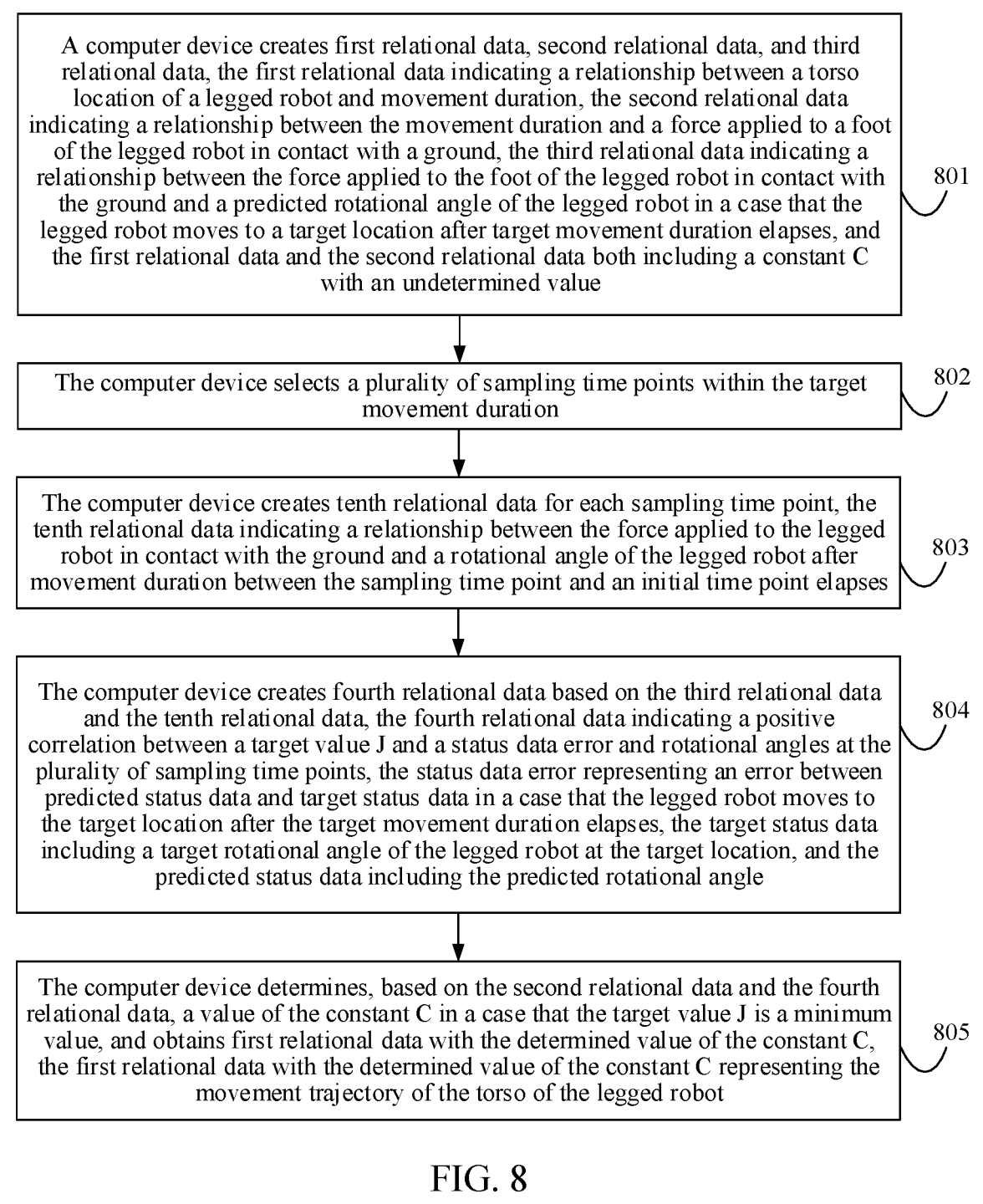

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value — 801

The computer device selects a plurality of sampling time points within the target movement duration — 802

The computer device creates tenth relational data for each sampling time point, the tenth relational data indicating a relationship between the force applied to the legged robot in contact with the ground and a rotational angle of the legged robot after movement duration between the sampling time point and an initial time point elapses — 803

The computer device creates fourth relational data based on the third relational data and the tenth relational data, the fourth relational data indicating a positive correlation between a target value J and a status data error and rotational angles at the plurality of sampling time points, the status data error representing an error between predicted status data and target status data in a case that the legged robot moves to the target location after the target movement duration elapses, the target status data including a target rotational angle of the legged robot at the target location, and the predicted status data including the predicted rotational angle — 804

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot — 805

FIG. 8

Figure 9:
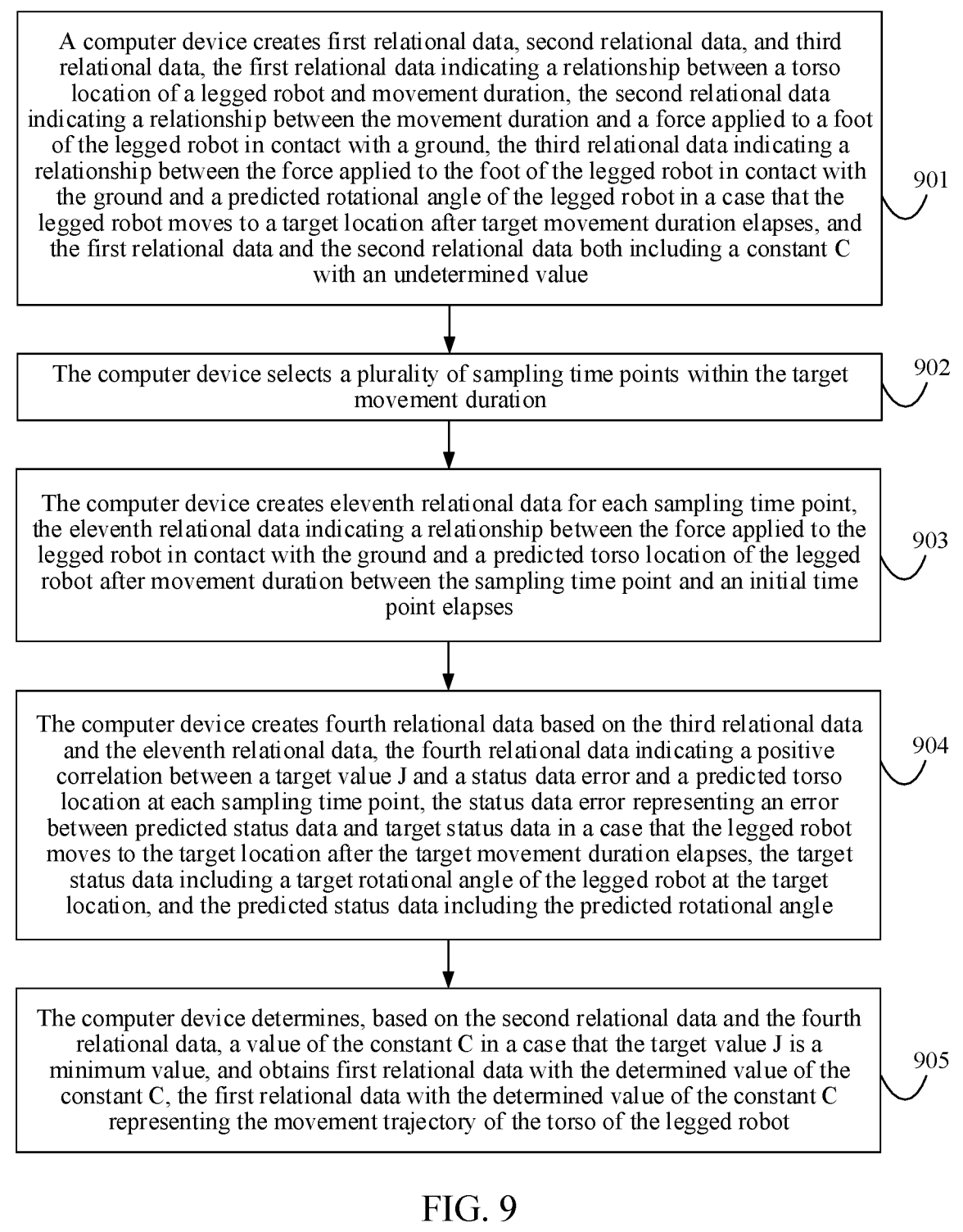

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

901

The computer device selects a plurality of sampling time points within the target movement duration

902

The computer device creates eleventh relational data for each sampling time point, the eleventh relational data indicating a relationship between the force applied to the legged robot in contact with the ground and a predicted torso location of the legged robot after movement duration between the sampling time point and an initial time point elapses

903

The computer device creates fourth relational data based on the third relational data and the eleventh relational data, the fourth relational data indicating a positive correlation between a target value J and a status data error and a predicted torso location at each sampling time point, the status data error representing an error between predicted status data and target status data in a case that the legged robot moves to the target location after the target movement duration elapses, the target status data including a target rotational angle of the legged robot at the target location, and the predicted status data including the predicted rotational angle

904

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

Figure 10:
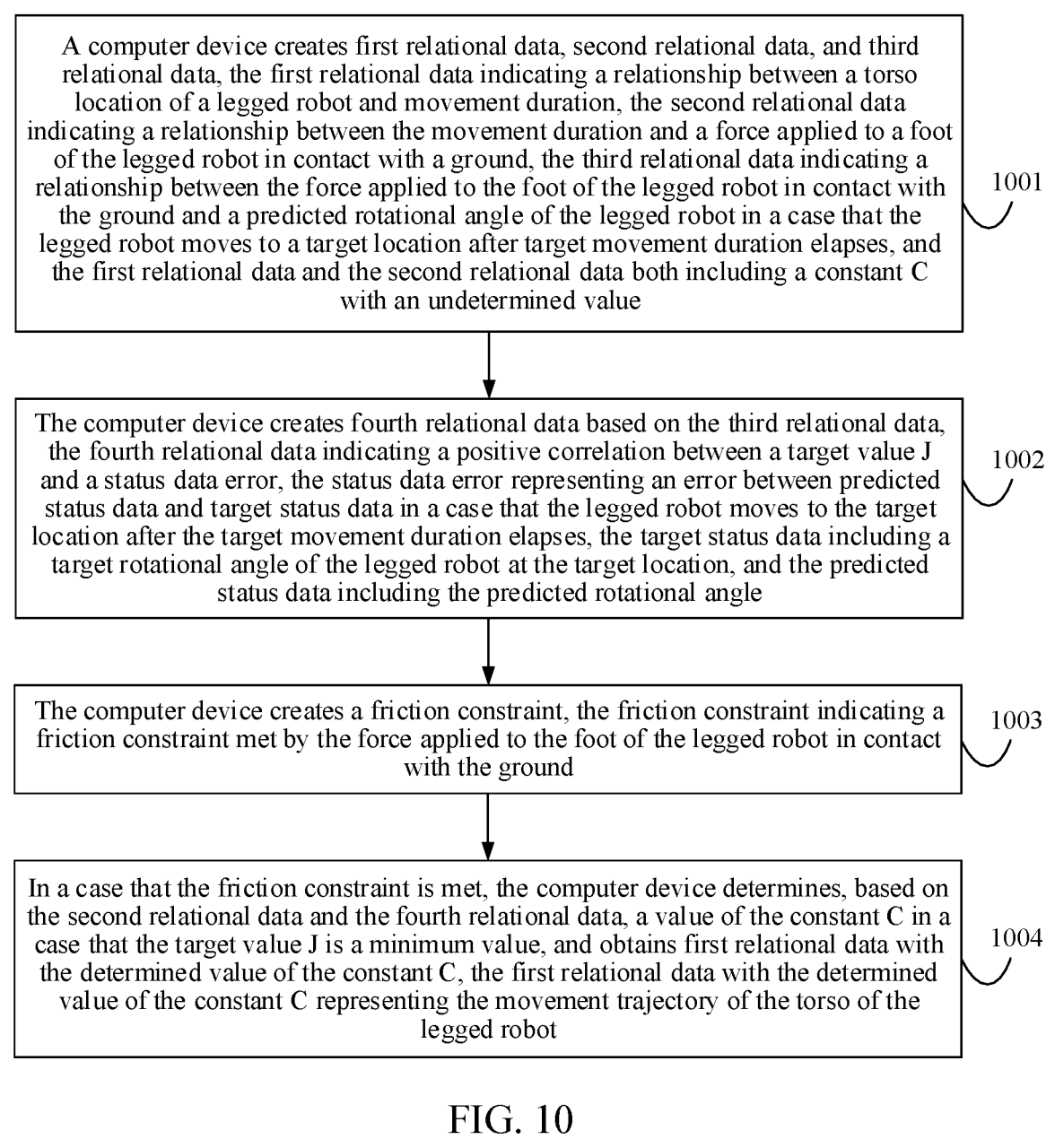

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

1001

The computer device creates fourth relational data based on the third relational data, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle

1002

The computer device creates a friction constraint, the friction constraint indicating a friction constraint met by the force applied to the foot of the legged robot in contact with the ground

1003

In a case that the friction constraint is met, the computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

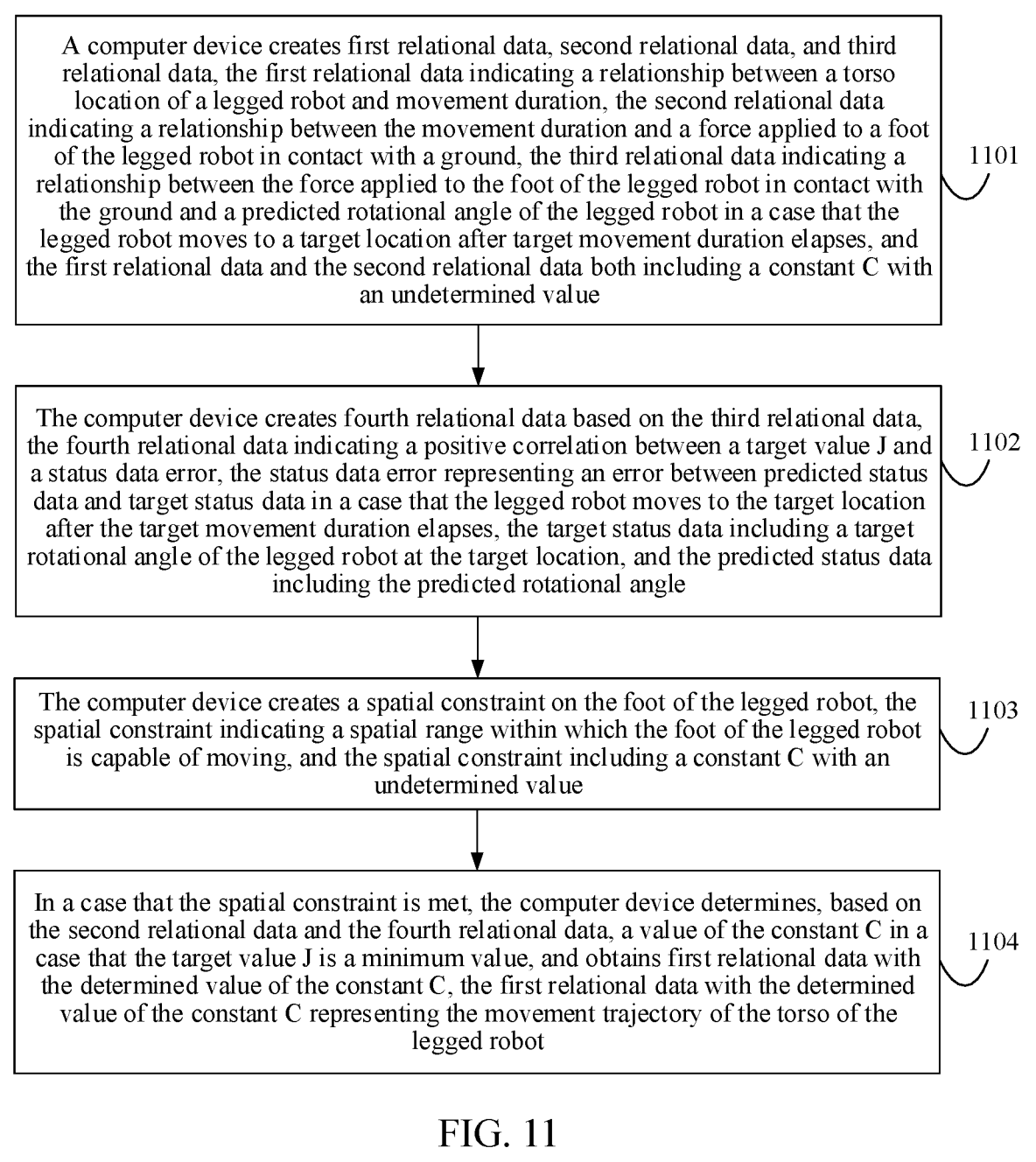

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value ⎯ 1101

The computer device creates fourth relational data based on the third relational data, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle ⎯ 1102

The computer device creates a spatial constraint on the foot of the legged robot, the spatial constraint indicating a spatial range within which the foot of the legged robot is capable of moving, and the spatial constraint including a constant C with an undetermined value ⎯ 1103

In a case that the spatial constraint is met, the computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot ⎯ 1104

FIG. 11

Figure 13:
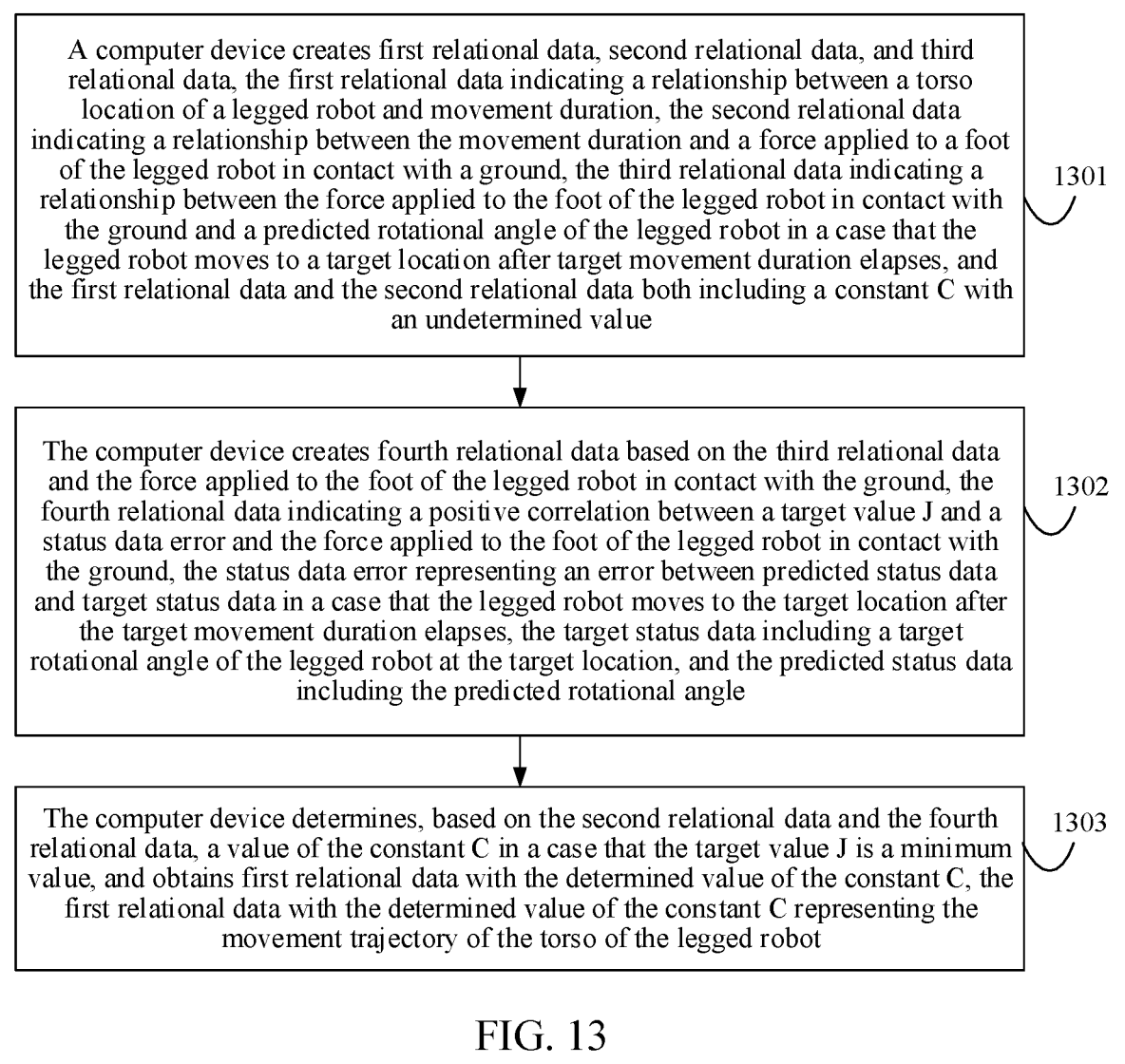

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

1301

The computer device creates fourth relational data based on the third relational data and the force applied to the foot of the legged robot in contact with the ground, the fourth relational data indicating a positive correlation between a target value J and a status data error and the force applied to the foot of the legged robot in contact with the ground, the status data error representing an error between predicted status data and target status data in a case that the legged robot moves to the target location after the target movement duration elapses, the target status data including a target rotational angle of the legged robot at the target location, and the predicted status data including the predicted rotational angle

1302

The computer device determines, based on the second relational data and the fourth relational data, a value of the constant C in a case that the target value J is a minimum value, and obtains first relational data with the determined value of the constant C, the first relational data with the determined value of the constant C representing the movement trajectory of the torso of the legged robot

Figure 14A:
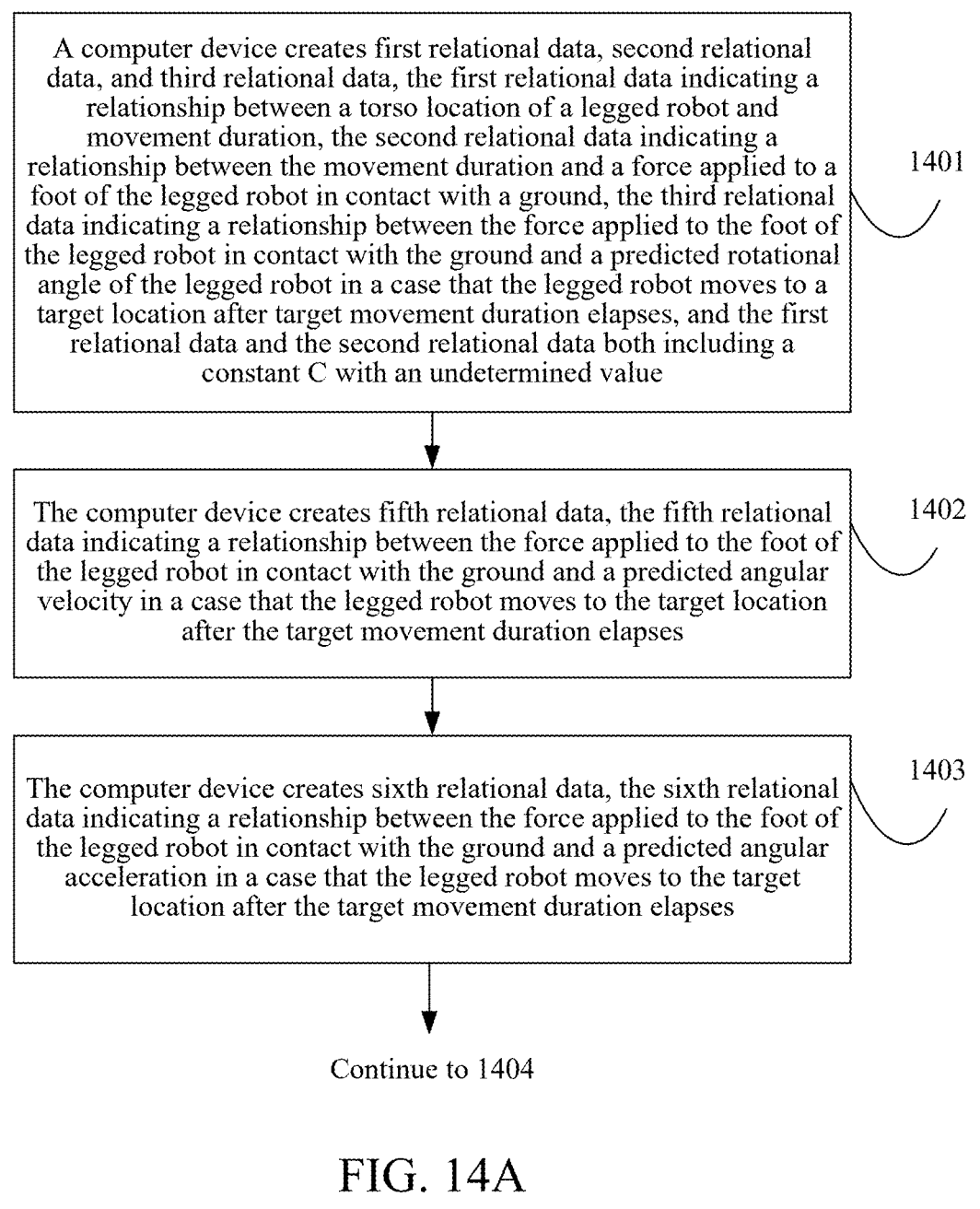

A computer device creates first relational data, second relational data, and third relational data, the first relational data indicating a relationship between a torso location of a legged robot and movement duration, the second relational data indicating a relationship between the movement duration and a force applied to a foot of the legged robot in contact with a ground, the third relational data indicating a relationship between the force applied to the foot of the legged robot in contact with the ground and a predicted rotational angle of the legged robot in a case that the legged robot moves to a target location after target movement duration elapses, and the first relational data and the second relational data both including a constant C with an undetermined value

1401

The computer device creates fifth relational data, the fifth relational data indicating a relationship between the force applied to the foot of the legged robot in contact with the ground and a predicted angular velocity in a case that the legged robot moves to the target location after the target movement duration elapses

1402

The computer device creates sixth relational data, the sixth relational data indicating a relationship between the force applied to the foot of the legged robot in contact with the ground and a predicted angular acceleration in a case that the legged robot moves to the target location after the target movement duration elapses

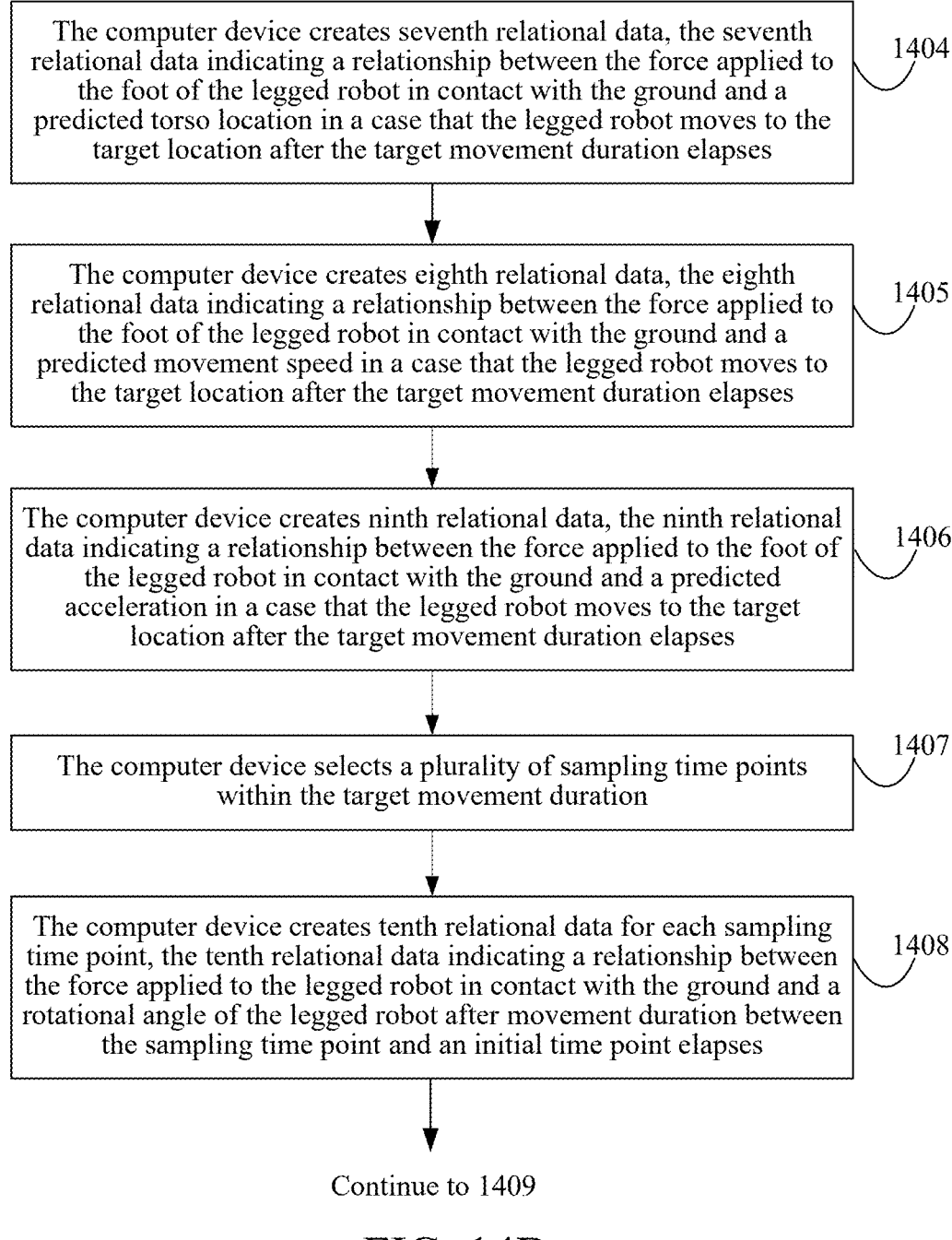

The computer device creates seventh relational data, the seventh relational data indicating a relationship between the force applied to the foot of the legged robot in contact with the ground and a predicted torso location in a case that the legged robot moves to the target location after the target movement duration elapses — 1404

The computer device creates eighth relational data, the eighth relational data indicating a relationship between the force applied to the foot of the legged robot in contact with the ground and a predicted movement speed in a case that the legged robot moves to the target location after the target movement duration elapses — 1405

The computer device creates ninth relational data, the ninth relational data indicating a relationship between the force applied to the foot of the legged robot in contact with the ground and a predicted acceleration in a case that the legged robot moves to the target location after the target movement duration elapses — 1406

The computer device selects a plurality of sampling time points within the target movement duration — 1407

The computer device creates tenth relational data for each sampling time point, the tenth relational data indicating a relationship between the force applied to the legged robot in contact with the ground and a rotational angle of the legged robot after movement duration between the sampling time point and an initial time point elapses — 1408

Figure 14C:
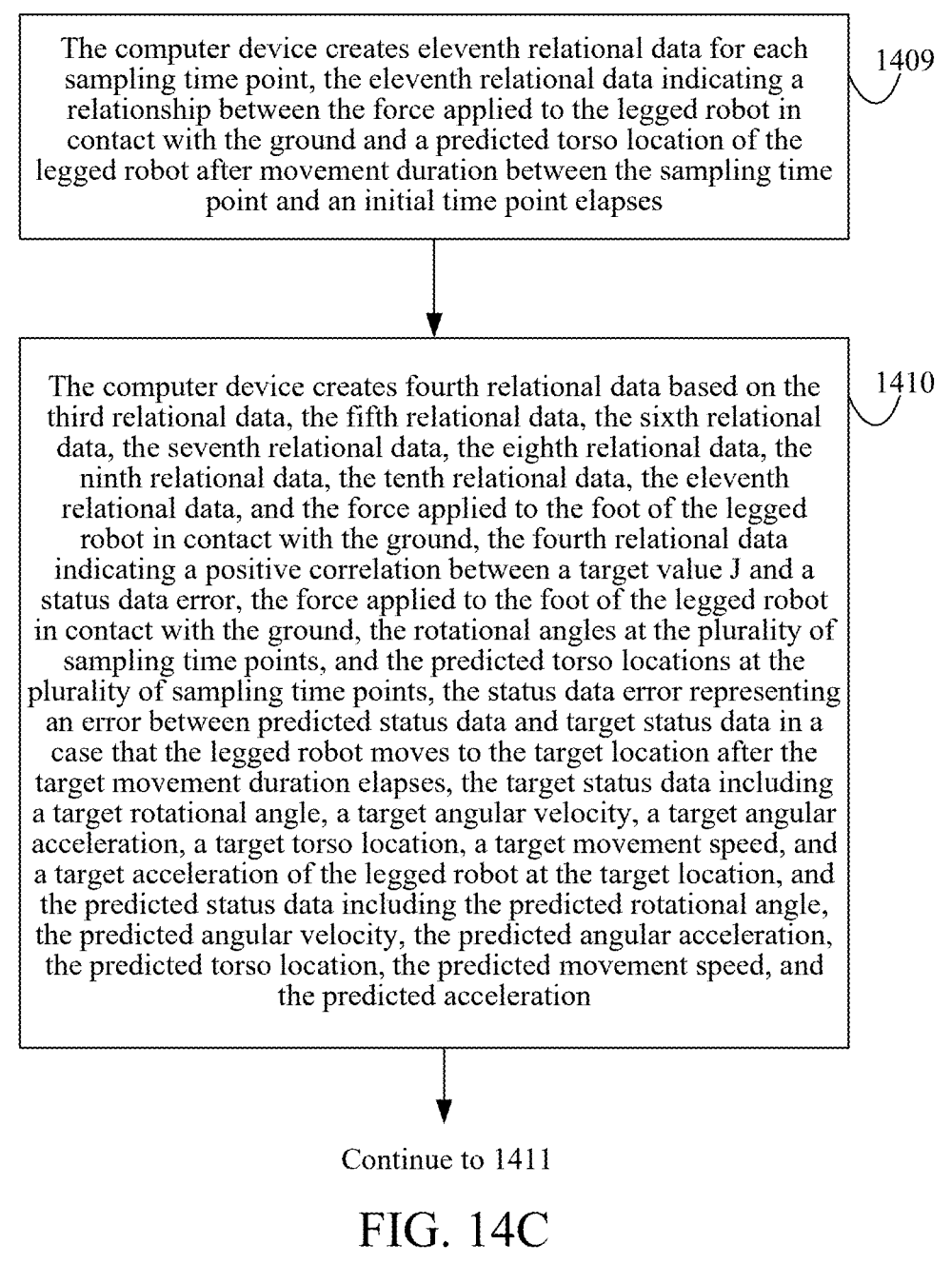

The computer device creates eleventh relational data for each sampling time point, the eleventh relational data indicating a relationship between the force applied to the legged robot in contact with the ground and a predicted torso location of the legged robot after movement duration between the sampling time point and an initial time point elapses — 1409

The computer device creates fourth relational data based on the third relational data, the fifth relational data, the sixth relational data, the seventh relational data, the eighth relational data, the ninth relational data, the tenth relational data, the eleventh relational data, and the force applied to the foot of the legged robot in contact with the ground, the fourth relational data indicating a positive correlation between a target value J and a status data error, the force applied to the foot of the legged robot in contact with the ground, the rotational angles at the plurality of sampling time points, and the predicted torso locations at the plurality of sampling time points, the status data error representing an error between predicted status data and target status data in a case that the legged robot moves to the target location after the target movement duration elapses, the target status data including a target rotational angle, a target angular velocity, a target angular acceleration, a target torso location, a target movement speed, and a target acceleration of the legged robot at the target location, and the predicted status data including the predicted rotational angle, the predicted angular velocity, the predicted angular acceleration, the predicted torso location, the predicted movement speed, and the predicted acceleration — 1410

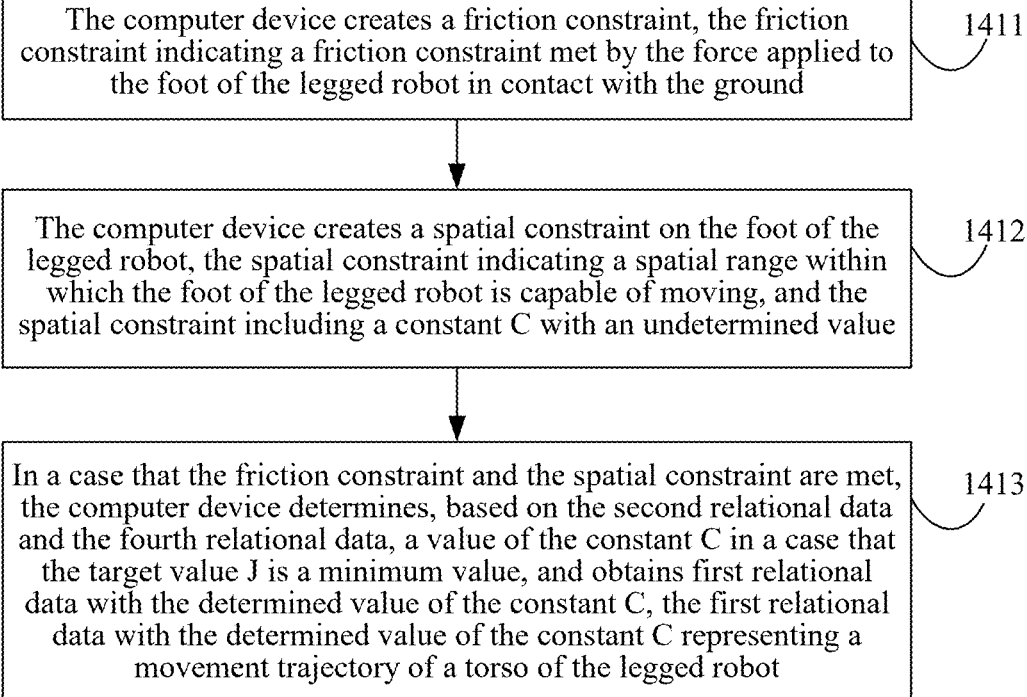

The computer device creates a friction constraint, the friction constraint indicating a friction constraint met by the force applied to the foot of the legged robot in contact with the ground ⟍_1411

The computer device creates a spatial constraint on the foot of the legged robot, the spatial constraint indicating a spatial range within which the foot of the legged robot is capable of moving, and the spatial constraint including a constant C with an undetermined value ⟍_1412

In a case that the friction constraint and the spatial constraint are met, the computer device determines, based on the second relational data and the fourth relational data, a value of the constant C in a case that the target value J is a minimum value, and obtains first relational data with the determined value of the constant C, the first relational data with the determined value of the constant C representing a movement trajectory of a torso of the legged robot ⟍_1413

FIG. 14D

Creating module　　　1601

Obtaining module　　　1602

Selection module　　　1603

Creating module　　　1601

Obtaining module　　　1602

MOVEMENT TRAJECTORY DETERMINATION

RELATED APPLICATIONS

The present application is a continuation of International Application No. PCT/CN2023/110838 filed on Aug. 2, 2023, which claims priority to Chinese Patent Application No. 202211088025.2, entitled "MOVEMENT TRAJEC-TORY DETERMINING METHOD AND APPARATUS, COMPUTER DEVICE, AND STORAGE MEDIUM" filed on Sep. 7, 2022. The entire disclosures of the prior applications are hereby incorporated by reference.

FIELD OF THE TECHNOLOGY

Aspects of this disclosure relate to the field of computer technologies including movement trajectory determination.

BACKGROUND OF THE DISCLOSURE

A legged robot is equipped with a plurality of feet. The plurality of feet are controlled to be lifted or lowered through joints configured on the feet, so that the legged robot can move, and the legged robot can simulate walking of an animal or a human being. When the legged robot moves, a movement trajectory of a torso of the legged robot is to be determined, and then the legged robot is controlled to move based on the movement trajectory. Movement of the legged robot is complex. The disclosure includes aspects related to how to determine a movement trajectory suitable for walking of the legged robot.

SUMMARY

Aspects of this disclosure provide a movement trajectory determining method and apparatus, a computer device, and a storage medium. The technical solutions are as follows:

According to an aspect, a movement trajectory determining method is provided, and is performed by a computer device, the method includes generating second relational data and third relational data. The second relational data indicates a relationship between a movement duration and one or more forces applied to one or more feet of a legged robot in contact with a ground. The third relational data indicates a relationship between the one or more forces and a predicted rotational angle of the legged robot when the legged robot moves to a target location after a target movement duration elapses. The second relational data includes a vector C with elements to be determined. The method includes generating fourth relational data based at least on the third relational data where the fourth relational data indicates a positive correlation between a target value J that is associated with the vector C and a status data error between predicted status data and target status data when the legged robot moves to the target location after the target movement duration elapses. The target status data includes a target rotational angle of the legged robot at the target location, and the predicted status data includes the predicted rotational angle. The method includes determining, based on the second relational data and the fourth relational data, the elements of the vector C that minimize the target value J and determining first relational data with the determined elements of the vector C. The first relational data with the determined elements of the vector C represents a movement trajectory of a torso of the legged robot. The legged robot is caused to move based on the movement trajectory.

According to another aspect, an apparatus, such as a control apparatus (e.g., a movement trajectory determining apparatus) is provided. The control apparatus includes processing circuitry that is configured to generate second relational data and third relational data. The second relational data indicates a relationship between a movement duration and one or more forces applied to one or more feet of a legged robot in contact with a ground. The third relational data indicates a relationship between the one or more forces and a predicted rotational angle of the legged robot when the legged robot moves to a target location after a target movement duration elapses. The second relational data includes a vector C with elements to be determined. The processing circuitry is configured to generate fourth relational data based on the third relational data. The fourth relational data indicates a positive correlation between a target value J that is associated with the vector C and a status data error. The status data error represents an error between predicted status data and target status data when the legged robot moves to the target location after the target movement duration elapses, the target status data comprises a target rotational angle of the legged robot at the target location, and the predicted status data comprises the predicted rotational angle. The processing circuitry is configured to determine, based on the second relational data and the fourth relational data, the elements of the vector C that minimize the target value J and determine first relational data with the determined elements of the vector C. The first relational data with the determined elements of the vector C represents a movement trajectory of a torso of the legged robot. The processing circuitry is configured to cause the legged robot to move based on the movement trajectory.

According to another aspect, a legged robot is provided. The legged robot includes one or more feet and the control apparatus according to the method described above.

According to another aspect, a control device is provided. The control device including a processor and a memory, the memory storing at least one computer program, and the at least one computer program being loaded and executed by the processor to implement the operations performed in the movement trajectory determining method according to the foregoing aspects.

According to another aspect, a non-transitory computer-readable storage medium is provided. The computer-readable storage medium stores instructions which when executed by at least one processor cause the at least one processor to perform the movement trajectory determining method according to the foregoing aspects.

According to another aspect, a computer program product is provided, including a computer program, the computer program, when being executed by a processor, implements the operations performed in the movement trajectory determining method according to the foregoing aspects.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. This further ensures that, in a case that the legged robot moves based on a determined movement trajectory, status data that the legged robot can have when moving to a target location is closest to the target status data, and ensures feasibility and accuracy of the determined movement trajectory.

BRIEF DESCRIPTION OF THE DRAWINGS

FIG. 1 shows an example of an implementation environment according to an aspect of this disclosure.

FIG. 2 shows a flowchart of a movement trajectory determining method according to an aspect of this disclosure.

FIG. 3 shows a flowchart of a movement trajectory determining method according to an aspect of this disclosure.

FIG. 4 shows a flowchart of a movement trajectory determining method according to an aspect of this disclosure.

FIG. 5 shows a flowchart of a movement trajectory determining method according to an aspect of this disclosure.

FIG. 6 shows a flowchart of a movement trajectory determining method according to an aspect of this disclosure.

FIG. 7 shows a flowchart of a movement trajectory determining method according to an aspect of this disclosure.

FIG. 8 shows a flowchart of a movement trajectory determining method according to an aspect of this disclosure.

FIG. 9 shows a flowchart of a movement trajectory determining method according to an aspect of this disclosure.

FIG. 10 shows a flowchart of a movement trajectory determining method according to an aspect of this disclosure.

FIG. 11 shows a flowchart of a movement trajectory determining method according to an aspect of this disclosure.

FIG. 13 shows a flowchart of a movement trajectory determining method according to an aspect of this disclosure.

FIG. 14 shows a flowchart of a movement trajectory determining method according to an aspect of this disclosure.

DESCRIPTION OF EMBODIMENTS

Figure 12:
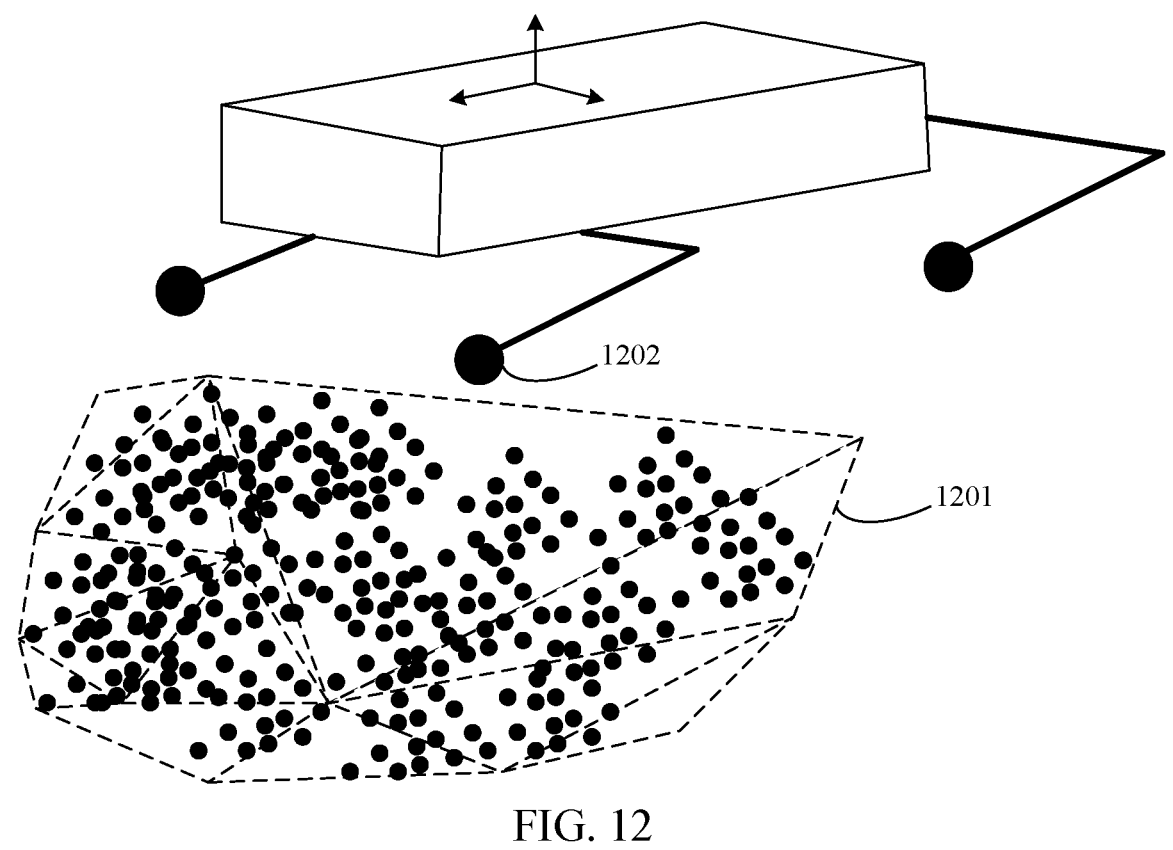
FIG. 12 shows an example of a spatial range according to an aspect of this disclosure.

The following describes technical solutions in aspects of this disclosure with reference to the accompanying drawings. The described aspects are some of the aspects of this disclosure rather than all of the aspects. Other aspects are within the scope of this disclosure.

Information (including but not limited to a captured environment image) and data (including but not limited to a movement trajectory, relational data, and the like) in this disclosure are used under authorization by users or full authorization by all parties. In addition, collection, use, and processing of related data need to comply with related laws, regulations, and standards in related countries and regions. For example, all captured environment images in this disclosure are obtained under full authorization.

A movement trajectory determining method provided in the aspects of this disclosure can be performed by a computer device. The computer device may be a legged robot or a control device. The control device can be a device for controlling a legged robot.

In a case that the method is performed by the legged robot, when the legged robot moves, a movement trajectory of a torso during movement of the legged robot from an initial location to a target location is determined, and then the legged robot is controlled to move to the target location based on the movement trajectory. In addition, during movement, the torso of the legged robot moves based on the movement trajectory to implement walking of the legged robot.

In a case that the method is performed by the control device, the control device determines a movement trajectory of a torso during movement of the legged robot from an initial location to a target location, and then controls the legged robot to move to the target location based on the movement trajectory. The control device is a server or a device in another form. In some aspects, the server is an independent physical server, a server cluster or a distributed system that includes a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In some aspects, a computer program included in the aspects of this disclosure may be deployed on one control device for execution, or may be executed on a plurality of control devices in one location, or may be executed on a plurality of control devices that are distributed in a plurality of locations and that are interconnected through a communication network. The plurality of control devices that are distributed in a plurality of locations and that are interconnected through a communication network may form a blockchain system.

In some aspects, for example, the method is performed by the control device. FIG. 1 is an exemplary diagram of an implementation environment according to an aspect of this disclosure. As shown in FIG. 1, the implementation environment includes a legged robot 101 and a control device 102. The legged robot 101 and the control device 102 establish a communication connection, and interact with each other through the established communication connection.

The legged robot 101 is configured to control at least one foot to be lifted or lowered to implement walking of the legged robot. The control device 102 is configured to provide a service for the legged robot 101, and can determine a movement trajectory of a torso of the legged robot for the legged robot 101 and transmit the movement trajectory to the legged robot 101, so that the legged robot 101 controls the legged robot to move based on the movement trajectory.

In some aspects, the legged robot 101 is configured with a perception system. The perception system obtains an image of a movement direction of the legged robot 101, and transmits the image to the control device 102. The control device 102 processes the image to obtain a target location of the legged robot 101, and determines, based on the target location of the legged robot 101, a movement trajectory of the torso during movement of the legged robot 101 from an initial location to the target location.

FIG. 2 is a flowchart of a movement trajectory determining method according to an aspect of this disclosure. The method is performed by a computer device. For example, the computer device is a legged robot or a control device. As shown in FIG. 2, the method includes the following steps:

In step 201, the computer device generates (or creates) first relational data, second relational data, and third relational data, the first relational data indicating a relationship between a torso location of a legged robot and movement duration, the second relational data indicating a relationship between the movement duration and one or more forces applied to one or more feet (including a force applied to a foot) of the legged robot in contact with a ground, the third relational data indicating a relationship between the one or more forces applied to the one or more feet of the legged robot in contact with the ground and a predicted rotational angle of the legged robot when (or in a case that) the legged robot moves to a target location after a target movement duration elapses, and the first relational data and the second relational data both including a constant C with an undetermined value. The constant C can be a vector including elements to be determined.

In an aspect of this disclosure, the legged robot is a robot that moves by simulating a walking attitude of an animal or a human being. The legged robot is a multi-legged robot. For example, the legged robot is a two-legged robot, a four-legged robot, or a six-legged robot. When the legged robot moves, one or more feet of the legged robot is controlled to be lifted or lowered to implement walking of the legged robot.

With respect to the first relational data, the first relational data represents a movement trajectory of a torso of the legged robot during movement. The created first relational data includes the constant C. In an example, a value of the constant C is not determined. Therefore, the constant C included in the first relational data is also an unknown number C. When the value of the constant C is determined, the value of the constant C no longer changes. The constant C represents the relationship between the torso location and the movement duration. Therefore, a torso location of the legged robot in a case that any movement duration elapses cannot be determined based on the created first relational data. In an example, the torso location of the legged robot can be represented by the constant C with an undetermined value and the movement duration. However, in a case that the value of the constant C included in the first relational data is determined, the constant C is also a known number C. In an example, a torso location of the legged robot in a case that any movement duration elapses can be determined based on the first relational data including the constant C with the determined value.

With respect to the second relational data, the second relational data represents the relationship between the movement duration and the one or more forces applied to the one or more feet of the legged robot in contact with the ground. In an aspect of this disclosure, the legged robot relies on contact between the one or more feet and the ground to support the legged robot to implement standing or walking, and one or more forces is applied to the one or more feet of the legged robot when the one or more feet of the legged robot are in contact with the ground. Therefore, the second relational data is created to indicate one or more forces applied to the one or more feet of the legged robot during movement. The created second relational data includes the constant C with an undetermined value. In a case that the value of the constant C is not determined, based on the second relational data, any movement duration and the constant C can be used to represent one or more forces applied to the one or more feet of the legged robot in contact with the ground after the movement duration elapses.

With respect to the third relational data, the rotational angle is an angle by which the torso of the legged robot rotates. The rotational angle can indicate an attitude of the legged robot. The target location is a location to be reached by the legged robot. The target movement duration is duration used by the legged robot to move from a current initial location to the target location. In an aspect of this disclosure, the target movement duration is any duration. In a case that the target movement duration used by the legged robot to move from the current initial location to the target location to be reached is given, when the legged robot moves to the target location after the target movement duration, the predicted rotational angle of the legged robot is related to the one or more forces applied to the one or more feet of the legged robot in contact with the ground. Therefore, the third relational data is created to indicate impact of the one or more forces applied to the one or more feet of the legged robot in contact with the ground on the rotational angle of the torso of the legged robot.

In step 202, the computer device generates (or creates) fourth relational data based on the third relational data. The fourth relational data indicates a positive correlation between a target value J and a status data error. The status data error represents an error between predicted status data and target status data in a case that the legged robot moves to the target location after the target movement duration elapses. The target status data includes a target rotational angle of the legged robot at the target location, and the predicted status data includes the predicted rotational angle. In an example, the target value J is associated with the vector C.

The target status data is status data that the legged robot is expected to have in a case that the legged robot moves to the target location. In an aspect of this disclosure, the target status data includes an expected target rotational angle of the torso in a case that the legged robot moves to the target location, and the target rotational angle is a given known value. The third relational data indicates a relationship between the one or more forces applied to the one or more feet of the legged robot in contact with the ground and the predicted rotational angle of the torso of the legged robot in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location.

In an aspect of this disclosure, the error between the target status data and the predicted status data includes a rotational angle error. Because the target rotational angle is a known value, when the target rotational angle of the torso in a case that the legged robot moves to the target location is given, the rotational angle error between the target rotational angle and the predicted rotational angle can be determined based on the predicted rotational angle and the target rotational angle. The rotational angle error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In step 203, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot. In an example, the computer device determines, based on the second relational data and the fourth relational data, the elements of the vector C that minimize the target value J. For example, the vector C is determined to minimize the target value J.

In an aspect of this disclosure, in the fourth relational data, the target value J is positively correlated with the status data error. In an example, a value of the target value J can indicate a value of the status data error. Therefore, the minimum value of the target value J is determined to make the status data error sufficiently small, which can ensure that the predicted status data is closest to the target status data, and further ensure that, in a case that the legged robot subsequently moves based on a determined movement trajectory, status data that the legged robot can have when moving to the target location is closest to the target status data.

In addition, the second relational data indicates the relationship between the movement duration and the one or more forces applied to the one or more feet of the legged robot in contact with the ground, the second relational data includes the constant C with an undetermined value, and the fourth relational data indicates the relationship between the target value J and the one or more forces applied to the one or more feet of the legged robot in contact with the ground, that is, the target value J is related to the constant C. In a case that the minimum value of the target value J is used, the value of the constant C is also determined, that is, the constant C is also a known number C. When the constant C with the determined value is substituted into the first relational data, the first relational data with the determined value of the constant C is obtained. The first relational data with the determined value of the constant C can indicate a change of the torso location of the legged robot along with the movement duration. The first relational data with the determined value of the constant C represents the movement trajectory of the torso of the legged robot. A torso location of the legged robot in a case that any movement duration elapses can be determined based on the movement trajectory.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

On the basis of the aspect shown in FIG. 2, in an aspect of this disclosure, for example, status data of the legged robot further includes an angular velocity, and the movement trajectory of the torso of the legged robot is determined by using status data including a rotational angle and an angular velocity. For details about an exemplary process, refer to the following aspect. FIG. 3 is a flowchart of a movement trajectory determining method according to an aspect of this disclosure. The method is performed by a computer device. For example, the computer device is a legged robot or a control device. As shown in FIG. 3, the method includes the following steps:

In step 301, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

In an implementation, the creating first relational data includes: setting the first relational data to be as follows: the torso location of the legged robot being equal to a sum of a first product and a first constant matrix, the first product being a product of the constant C with an undetermined value and a time matrix.

The time matrix represents the movement duration. The first constant matrix is any constant matrix, and a value of the first constant matrix is determined. In an aspect of this disclosure, the product of the constant C with an undetermined value and the time matrix represents a torso location variation of the torso location of the legged robot relative to an initial torso location during movement. The legged robot moves from an initial location. During movement of the legged robot, the torso location of the legged robot changes with the movement duration.

In some aspects, the first constant matrix is the initial torso location. The initial torso location is a known value. In an aspect of this disclosure, the torso location of the legged robot has a corresponding torso location variation after the legged robot moves for any movement duration. A sum of the torso location variation corresponding to the movement duration and the initial torso location of the legged robot when the legged robot starts to move is used as the corresponding torso location of the legged robot after any movement duration elapses. The relationship between the torso location and the movement duration can be indicated, and a movement trajectory of a torso of the legged robot can be subsequently determined based on the first relational data.

In an implementation, the second relational data is used to describe a dynamic constraint that the legged robot needs to meet during movement. In an example, the created second relational data meets the following relationship:

$$TC + d = AF_{total} + b$$

T represents the time matrix for the movement duration, and C is a constant with an undetermined value. d is a constant matrix. A represents a first coefficient matrix. $F_{total}$ represents the one or more forces applied to the one or more feet of the legged robot in contact with the ground. b represents a constant matrix.

In some aspects, all the first coefficient matrix, the constant matrix d, and the constant matrix b are determined based on the target movement duration. In an aspect of this disclosure, all the first coefficient matrix, the constant matrix d, and the constant matrix b with undetermined values are matrices including the movement duration. In a case that the target movement duration is given, values of the first coefficient matrix, the constant matrix d, and the constant matrix b are determined.

In an implementation, the creating third relational data includes: setting the third relational data to be as follows: the predicted rotational angle being equal to a sum of a second product and a second constant matrix, the second product being a product of a second coefficient matrix and a force matrix. The force matrix is a matrix including one or more forces applied to at least one foot of the legged robot in contact with the ground. The second coefficient matrix represents a coefficient for the force matrix. The second constant matrix is any constant matrix, and a parameter value in the second constant matrix is determined.

In some aspects, both the second coefficient matrix and the second constant matrix are determined based on the target movement duration. In an aspect of this disclosure, both the second coefficient matrix with an undetermined value and the second constant matrix with an undetermined value are matrices including the movement duration. In a case that the target movement duration is given, values of the second coefficient matrix and the second constant matrix are determined.

In step 302, the computer device creates fifth relational data, the fifth relational data indicating a relationship between the one or more forces applied to the one or more feet of the legged robot in contact with the ground and a predicted angular velocity in a case that the legged robot moves to the target location after the target movement duration elapses.

In an aspect of this disclosure, an angular velocity of the legged robot is an angular velocity of the torso of the legged robot. The angular velocity of the torso of the legged robot is affected by the one or more forces applied to the one or more feet of the legged robot in contact with the ground, and the angular velocity of the torso is related to the one or more forces applied to the one or more feet of the legged robot in contact with the ground. Therefore, the fifth relational data is created to indicate impact of the one or more forces applied to the one or more feet of the legged robot in contact with the ground on the angular velocity of the torso of the legged robot in a case that the legged robot moves to the target location after the target movement duration elapses.

In an implementation, the creating fifth relational data includes: setting the fifth relational data to be as follows: the predicted angular velocity of the torso in a case that the legged robot moves to the target location being equal to a sum of a third product and a third constant matrix, the third product being a product of a third coefficient matrix and the force matrix. The force matrix is a matrix including one or more forces applied to at least one one or more feet of the legged robot in contact with the ground. The third coefficient matrix represents a coefficient for the force matrix. The third constant matrix is any constant matrix, and a parameter value in the third constant matrix is determined.

In some aspects, both the third coefficient matrix and the third constant matrix are determined based on the target movement duration. In an aspect of this disclosure, both the third coefficient matrix with an undetermined value and the third constant matrix with an undetermined value are matrices including the movement duration. In a case that the target movement duration is given, values of the third coefficient matrix and the third constant matrix are determined.

In step 303, the computer device creates fourth relational data based on the third relational data and the fifth relational data. The fourth relational data indicates a positive correlation between a target value J and a status data error. The status data error represents an error between predicted status data and target status data in a case that the legged robot moves to the target location after the target movement duration elapses. The target status data includes a target rotational angle and a target angular velocity of the legged robot at the target location, and the predicted status data includes the predicted rotational angle and the predicted angular velocity.

In an aspect of this disclosure, the target status data includes an expected target rotational angle and an expected target angular velocity of the torso in a case that the legged robot moves to the target location, and both the target rotational angle and the target angular velocity are known values. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location. The fifth relational data indicates a relationship between the one or more forces applied to the one or more feet of the legged robot in contact with the ground and the predicted angular velocity in a case that the legged robot moves to the target location after the target movement duration elapses. Therefore, based on the fifth relational data, the one or more forces applied to the one or more feet of the legged robot in contact with the ground can be used to represent the predicted angular velocity of the torso in a case that the legged robot moves to the target location.

In an aspect of this disclosure, the error between the target status data and the predicted status data includes a rotational angle error and an angular velocity error. Because both the target rotational angle and the target angular velocity are known values, when the target rotational angle and the target angular velocity of the torso in a case that the legged robot moves to the target location are given, the rotational angle error between the target rotational angle and the predicted rotational angle can be determined based on the predicted rotational angle and the target rotational angle, and the angular velocity error between the target angular velocity and the predicted angular velocity can be determined based on the predicted angular velocity and the target angular velocity. Both the rotational angle error and the angular velocity error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In an implementation, step 303 includes: determining the target value J in the fourth relational data based on a first difference and a second difference. For example, step 303 includes setting the target value J in the fourth relational data to a sum of squares of the first difference and the second difference. The first difference can be a difference between the predicted rotational angle and the target rotational angle of the legged robot at the target location, and the second difference can be a difference between the predicted angular velocity and the target angular velocity of the legged robot at the target location.

In an aspect of this disclosure, the target value J is set to a sum of squares of the difference between the predicted rotational angle and the target rotational angle of the legged robot at the target location and the difference between the predicted angular velocity and the target angular velocity of the legged robot at the target location, so that the target value J has an extreme value, and a minimum value of the target value J can be determined subsequently.

An aspect of this disclosure is described by using an example in which status data of the legged robot includes a rotational angle and an angular velocity of the torso of the legged robot. However, in another aspect, steps 302 and 303 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle of the legged robot at the target location.

In step 304, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

In an example, in step 301, the computer device creates the second relational data and third relational data, and in step 304, the computer device determines the first relational data with the determined vector C.

In an example, the legged robot is caused, for example, by the computer device to move based on the movement trajectory.

In an aspect of this disclosure, in the fourth relational data, the target value J is positively correlated with the status data error. In an example, a value of the target value J can indicate a value of the status data error. Therefore, the minimum value of the target value J is determined to make the status data error sufficiently small. Thus, the predicted rotational angle and the predicted angular velocity of the torso in a case that the legged robot moves to the target location based on a determined movement trajectory are closest to the target rotational angle and the target angular velocity respectively, that is, the predicted status data is closest to the target status data. Thus, in a case that the legged robot subsequently moves based on a determined movement trajectory, status data that the legged robot can have when moving to the target location is closest to the target status data In addition, the second relational data indicates the relationship between the movement duration and the one or more forces applied to the one or more feet of the legged robot in contact with the ground, the second relational data includes the constant C with an undetermined value, and the fourth relational data indicates the relationship between the target value J and the one or more forces applied to the one or more feet of the legged robot in contact with the ground, that is, the target value J is related to the constant C. In a case that the minimum value of the target value J is used, the value of the constant C is also determined, that is, the constant C is also a known number C. When the constant C with the determined value is substituted into the first relational data, the first relational data with the determined value of the constant C is obtained. The first relational data with the determined value of the constant C can indicate a change of the torso location of the legged robot along with the movement duration. The first relational data with the determined value of the constant C represents the movement trajectory of the torso of the legged robot. A torso location of the legged robot in a case that any movement duration elapses can be determined based on the movement trajectory.

In an implementation, a process of determining the value of the constant C in a case that the target value J is the minimum value includes: determining, based on the fourth relational data, a value of the one or more forces applied to the one or more feet of the legged robot in contact with the ground in a case that the target value J is the minimum value; and determining the value of the constant C based on the value of the one or more forces applied to the one or more feet of the legged robot in contact with the ground, the target movement duration, and the second relational data, and obtaining first relational data with the determined value of the constant C In an aspect of this disclosure, the fourth relational data indicates the relationship between the target value J and the one or more forces applied to the one or more feet of the legged robot in contact with the ground. Therefore, the value of the one or more forces applied to the one or more feet of the legged robot in contact with the ground in a case that the target value J is the minimum value can be determined based on the fourth relational data. Then the value of the constant C can be determined by substituting the one or more forces with the determined value into the second relational data. Then, when the constant C with the determined value is substituted into the first relational data, the first relational data with the determined value of the constant C is obtained.

In some aspects, in a case that the legged robot includes a plurality of feet, a value of a force applied to each foot of the legged robot in contact with the ground in a case that the target value J is the minimum value is determined based on the fourth relational data. In an aspect of this disclosure, a status of contact between each foot of the legged robot and the ground can be learned by determining the value of the force applied to each foot of the legged robot in contact with the ground.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, impact of an angular velocity of the torso of the legged robot is considered, to ensure that the angular velocity of the torso of the legged robot is close to the target angular velocity when the legged robot moves to the target location based on the determined movement trajectory, which, for example, further ensures accuracy and feasibility of the determined movement trajectory.

On the basis of the aspect shown in FIG. 2, for example, status data of the legged robot further includes an angular acceleration, and the movement trajectory of the torso of the legged robot is determined by using status data including a rotational angle and an angular acceleration. For details about an exemplary process, refer to the following aspect. FIG. 4 is a flowchart of a movement trajectory determining method according to an aspect of this disclosure. The method is performed by a computer device. For example, the computer device is a legged robot or a control device. As shown in FIG. 4, the method includes the following steps:

In step 401, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 401 is similar to step 301. Details are not described herein again.

In step 402, the computer device creates sixth relational data. The sixth relational data indicates a relationship between the one or more forces applied to the one or more feet of the legged robot in contact with the ground and a predicted angular acceleration in a case that the legged robot moves to the target location after the target movement duration elapses.

In an aspect of this disclosure, an angular acceleration of the legged robot is an angular acceleration of the torso of the legged robot. The angular acceleration of the torso of the legged robot is affected by the one or more forces applied to the one or more feet of the legged robot in contact with the ground. In other words, the angular acceleration of the torso of the legged robot is related to the one or more forces applied to the one or more feet of the legged robot in contact with the ground. Therefore, the sixth relational data is created to indicate impact of the one or more forces applied to the one or more feet of the legged robot in contact with the ground on the angular acceleration of the torso of the legged robot in a case that the legged robot moves to the target location after the target movement duration elapses.

In an implementation, the creating sixth relational data includes: setting the sixth relational data to be as follows: the predicted angular acceleration of the torso of the legged robot at the target location being equal to a sum of a fourth product and a fourth constant matrix, the fourth product being a product of a fourth coefficient matrix and a force matrix. The force matrix is a matrix including one or more forces applied to at least one foot of the legged robot in contact with the ground. The fourth coefficient matrix represents a coefficient for the force matrix. The fourth constant matrix is any constant matrix, and a parameter value in the fourth constant matrix is determined.

In some aspects, both the fourth coefficient matrix and the fourth constant matrix are determined based on the target movement duration. In an aspect of this disclosure, both the fourth coefficient matrix with an undetermined value and the fourth constant matrix with an undetermined value are matrices including the movement duration. In a case that the target movement duration is given, values of the fourth coefficient matrix and the fourth constant matrix are determined.

In step 403, the computer device creates fourth relational data based on the third relational data and the sixth relational data. The fourth relational data indicates a positive correlation between a target value J and a status data error. The status data error represents an error between predicted status data and target status data in a case that the legged robot moves to the target location after the target movement duration elapses. The target status data includes a target rotational angle and a target angular acceleration of the legged robot at the target location, and the predicted status data includes the predicted rotational angle and the predicted angular acceleration.

In an aspect of this disclosure, the target status data includes an expected target rotational angle and an expected target angular acceleration of the torso in a case that the legged robot moves to the target location, and both the target rotational angle and the target angular acceleration are known values. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location. The sixth relational data indicates a relationship between the one or more forces applied to the one or more feet of the legged robot in contact with the ground and the predicted angular acceleration in a case that the legged robot moves to the target location after the target movement duration elapses. Therefore, based on the sixth relational data, the one or more forces applied to the one or more feet of the legged robot in contact with the ground can be used to represent the predicted angular acceleration of the torso in a case that the legged robot moves to the target location.

In an aspect of this disclosure, the error between the target status data and the predicted status data includes a rotational angle error and an angular acceleration error. Because both the target rotational angle and the target angular acceleration are known values, when the target rotational angle and the target angular acceleration of the torso in a case that the legged robot moves to the target location are given, the rotational angle error between the target rotational angle and the predicted rotational angle can be determined based on the predicted rotational angle and the target rotational angle, and the angular acceleration error between the target angular acceleration and the predicted angular acceleration can be determined based on the predicted angular acceleration and the target angular acceleration. Both the rotational angle error and the angular acceleration error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In an implementation, step 403 includes: setting the target value J in the fourth relational data based on a first difference and a third difference such as setting the target value J to a sum of squares of the first difference and the third difference. The first difference can be a difference between the predicted rotational angle and the target rotational angle of the legged robot at the target location, and the third difference can be a difference between the predicted angular acceleration and the target angular acceleration of the legged robot at the target location.

In an aspect of this disclosure, the target value J is set to a sum of squares of the difference between the predicted rotational angle and the target rotational angle of the legged robot at the target location and the difference between the predicted angular acceleration and the target angular acceleration of the legged robot at the target location, so that the target value J has an extreme value, and a minimum value of the target value J can be determined subsequently.

An aspect of this disclosure is described by using an example in which status data of the legged robot includes a rotational angle and an angular acceleration of the torso of the legged robot. However, in another aspect, steps 402 and 403 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 404, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 404 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, impact of an angular acceleration of the torso of the legged robot is considered, to ensure that the angular acceleration of the torso of the legged robot is close to the target angular acceleration when the legged robot moves to the target location based on the determined movement trajectory, which, for example, further ensures accuracy and feasibility of the determined movement trajectory.

On the basis of the aspect shown in FIG. 2, for example, status data of the legged robot further includes a torso location, and the movement trajectory of the torso of the legged robot is determined by using status data including a rotational angle and a torso location. For details about an exemplary process, refer to the following aspect. FIG. 5 is a flowchart of a movement trajectory determining method according to an aspect of this disclosure. The method is performed by a computer device. For example, the computer device is a legged robot or a control device. As shown in FIG. 5, the method includes the following steps:

In step 501, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 501 is similar to step 301. Details are not described herein again.

In step 502, the computer device creates seventh relational data, the seventh relational data indicating a relationship between the one or more forces applied to the one or more feet of the legged robot in contact with the ground and a predicted torso location in a case that the legged robot moves to the target location after the target movement duration elapses.

In an aspect of this disclosure, the predicted torso location of the legged robot is a location of the torso of the legged robot. The torso location of the legged robot is affected by the one or more forces applied to the one or more feet of the legged robot in contact with the ground, and the torso location of the legged robot is related to the one or more forces applied to the one or more feet of the legged robot in contact with the ground. Therefore, the seventh relational data is created to indicate impact of the one or more forces applied to the one or more feet of the legged robot in contact with the ground on the torso location of the legged robot in a case that the legged robot moves to the target location after the target movement duration elapses.

In an implementation, the creating seventh relational data includes: setting the seventh relational data to be as follows: the predicted torso location of the legged robot at the target location being equal to a sum of a fifth product and a fifth constant matrix, the fifth product being a product of a fifth coefficient matrix and a force matrix. The force matrix is a matrix including one or more forces applied to at least one foot of the legged robot in contact with the ground. The fifth coefficient matrix represents a coefficient for the force matrix. The fifth constant matrix is any constant matrix, and a parameter value in the fifth constant matrix is determined.

In some aspects, both the fifth coefficient matrix and the fifth constant matrix are determined based on the target movement duration. In an aspect of this disclosure, both the fifth coefficient matrix with an undetermined value and the fifth constant matrix with an undetermined value are matrices including the movement duration. In a case that the target movement duration is given, values of the fifth coefficient matrix and the fifth constant matrix are determined.

In step 503, the computer device creates fourth relational data based on the third relational data and the seventh relational data. The fourth relational data indicates a positive correlation between a target value J and a status data error, the status data error represents an error between predicted status data and target status data in a case that the legged robot moves to the target location after the target movement duration elapses, the target status data includes a target rotational angle and a target torso location of the legged robot at the target location, and the predicted status data includes the predicted rotational angle and the predicted torso location.

In an aspect of this disclosure, the target status data includes an expected target rotational angle of the torso and an expected target torso location in a case that the legged robot moves to the target location, and both the target rotational angle and the target torso location are known values. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location. The seventh relational data indicates a relationship between the one or more forces applied to the one or more feet of the legged robot in contact with the ground and the predicted torso location in a case that the legged robot moves to the target location after the target movement duration elapses. Therefore, based on the seventh relational data, the one or more forces applied to the one or more feet of the legged robot in contact with the ground can be used to represent the predicted torso location of the torso in a case that the legged robot moves to the target location.

In an aspect of this disclosure, the error between the target status data and the predicted status data includes a rotational angle error and a torso location error. Because both the target rotational angle and the target torso location are known values, when the target rotational angle of the torso and the target torso location in a case that the legged robot moves to the target location are given, the rotational angle error between the target rotational angle and the predicted rotational angle can be determined based on the predicted rotational angle and the target rotational angle, and the torso location error between the target torso location and the predicted torso location can be determined based on the predicted torso location and the target torso location. Both the rotational angle error and the torso location error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In an implementation, step 503 includes: setting the target value J in the fourth relational data based on a first difference and a fourth difference such as setting the target value J to a sum of squares of the first difference and the fourth difference. The first difference can be a difference between the predicted rotational angle and the target rotational angle of the legged robot at the target location, and the fourth difference can be a difference between the predicted torso location and the target torso location of the legged robot at the target location.

In an aspect of this disclosure, the target value J is set to a sum of squares of the difference between the predicted rotational angle and the target rotational angle of the legged robot at the target location and the difference between the predicted torso location and the target torso location of the legged robot at the target location, so that the target value J has an extreme value, and a minimum value of the target value J can be determined subsequently.

An aspect of this disclosure is described by using an example in which status data of the legged robot includes a rotational angle and a torso location of the torso of the legged robot. However, in another aspect, steps 502 and 503 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 504, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 504 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, impact of a torso location of the legged robot is considered, to ensure that the torso location of the legged robot is close to the target torso location when the legged robot moves to the target location based on the determined movement trajectory, which, for example, further ensures accuracy and feasibility of the determined movement trajectory.

On the basis of the aspect shown in FIG. 2, for example, status data of the legged robot further includes a movement speed, and the movement trajectory of the torso of the legged robot is determined by using status data including a rotational angle and a movement speed. For details about an exemplary process, refer to the following aspect. FIG. 6 is a flowchart of a movement trajectory determining method according to an aspect of this disclosure. The method is performed by a computer device. For example, the computer device is a legged robot or a control device. As shown in FIG. 6, the method includes the following steps:

In step 601, the computer device creates first relational data, second relational data, and third relational data. The first relational data indicates a relationship between a torso location of a legged robot and movement duration, the second relational data indicates a relationship between the movement duration and one or more forces applied to a one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 601 is similar to step 301. Details are not described herein again.

In step 602, the computer device creates eighth relational data, the eighth relational data indicating a relationship between the one or more forces applied to the one or more feet of the legged robot in contact with the ground and a predicted movement speed in a case that the legged robot moves to the target location after the target movement duration elapses.

In an aspect of this disclosure, the predicted movement speed of the legged robot is a movement speed of the torso of the legged robot. The movement speed of the legged robot is affected by the one or more forces applied to the one or more feet of the legged robot in contact with the ground, and the movement speed of the legged robot is related to the one or more forces applied to the one or more feet of the legged robot in contact with the ground. Therefore, the eighth relational data is created to indicate impact of the one or more forces applied to the one or more feet of the legged robot in contact with the ground on the movement speed of the legged robot in a case that the legged robot moves to the target location after the target movement duration elapses.

In an implementation, the creating eighth relational data includes: setting the eighth relational data to be as follows: the predicted movement speed of the torso of the legged robot at the target location being equal to a sum of a sixth product and a sixth constant matrix, the sixth product being a product of a sixth coefficient matrix and a force matrix. The force matrix is a matrix including one or more forces applied to at least one foot of the legged robot in contact with the ground. The sixth coefficient matrix represents a coefficient for the force matrix. The sixth constant matrix is any constant matrix, and a parameter value in the sixth constant matrix is determined.

In some aspects, both the sixth coefficient matrix and the sixth constant matrix are determined based on the target movement duration. In an aspect of this disclosure, both the sixth coefficient matrix with an undetermined value and the sixth constant matrix with an undetermined value are matrices including the movement duration. In a case that the target movement duration is given, values of the sixth coefficient matrix and the sixth constant matrix are determined.

In step 603, the computer device creates fourth relational data based on the third relational data and the eighth relational data where the fourth relational data indicates a positive correlation between a target value J and a status data error. The status data error represents an error between predicted status data and target status data in a case that the legged robot moves to the target location after the target movement duration elapses, the target status data includes a target rotational angle and a target movement speed of the legged robot at the target location, and the predicted status data include the predicted rotational angle and the predicted movement speed.

In an aspect of this disclosure, the target status data includes an expected target rotational angle and an expected target movement speed of the torso in a case that the legged robot moves to the target location, and both the target rotational angle and the target movement speed are known values. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location. The eighth relational data indicates a relationship between the one or more forces applied to the one or more feet of the legged robot in contact with the ground and the predicted movement speed in a case that the legged robot moves to the target location after the target movement duration elapses. Therefore, based on the eighth relational data, the one or more forces applied to the one or more feet of the legged robot in contact with the ground can be used to represent the predicted movement speed of the torso in a case that the legged robot moves to the target location.

In an aspect of this disclosure, the error between the target status data and the predicted status data includes a rotational angle error and a movement speed error. Because both the target rotational angle and the target movement speed are known values, when the target rotational angle and the target movement speed of the torso in a case that the legged robot moves to the target location are given, the rotational angle error between the target rotational angle and the predicted rotational angle can be determined based on the predicted rotational angle and the target rotational angle, and the movement speed error between the target movement speed and the predicted movement speed can be determined based on the predicted movement speed and the target movement speed. Both the rotational angle error and the movement speed error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In an implementation, step 603 includes: setting the target value J in the fourth relational data based on a first difference and a fifth difference such as setting the target value J to a sum of squares of the first difference and the fifth difference. The first difference can be a difference between the predicted rotational angle and the target rotational angle of the legged robot at the target location, and the fifth difference can be a difference between the predicted movement speed and the target movement speed of the legged robot at the target location.

In an aspect of this disclosure, the target value J is set to a sum of squares of the difference between the predicted rotational angle and the target rotational angle of the legged robot at the target location and the difference between the predicted movement speed and the target movement speed of the legged robot at the target location, so that the target value J has an extreme value, and a minimum value of the target value J can be determined subsequently.

An aspect of this disclosure is described by using an example in which status data of the legged robot includes a rotational angle and a movement speed of the torso of the legged robot. However, in another aspect, steps 602 and 603 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 604, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 604 is similar to step 304. Details are not described herein again.

This disclosure provides a manner of determining a movement trajectory of a torso of a legged robot. In view of impact of a rotational angle of the torso on the movement trajectory during movement of the legged robot, a status error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, impact of a movement speed of the legged robot is considered, to ensure that the movement speed of the legged robot is close to the target movement speed when the legged robot moves to the target location based on the determined movement trajectory, which, for example, further ensures accuracy and feasibility of the determined movement trajectory.

On the basis of the aspect shown in FIG. 2, for example, status data of the legged robot further includes an acceleration, and the movement trajectory of the torso of the legged robot is determined by using status data including a rotational angle and an acceleration. For details about an exemplary process, refer to the following aspect. FIG. 7 is a flowchart of a movement trajectory determining method according to an aspect of this disclosure. The method is performed by a computer device. For example, the computer device is a legged robot or a control device. As shown in FIG. 7, the method includes the following steps:

In step 701, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 701 is similar to step 301. Details are not described herein again.

In step 702, the computer device creates ninth relational data. The ninth relational data indicates a relationship between the one or more forces applied to the one or more feet of the legged robot in contact with the ground and a predicted acceleration in a case that the legged robot moves to the target location after the target movement duration elapses.

In an aspect of this disclosure, the predicted acceleration of the legged robot is an acceleration of the torso of the legged robot. The acceleration of the legged robot is affected by the one or more forces applied to the one or more feet of the legged robot in contact with the ground, and the acceleration of the legged robot is related to the one or more forces applied to the one or more feet of the legged robot in contact with the ground. Therefore, the ninth relational data is created to indicate impact of the one or more forces applied to the one or more feet of the legged robot in contact with the ground on the acceleration of the legged robot in a case that the legged robot moves to the target location after the target movement duration elapses.

In an implementation, the creating ninth relational data includes: setting the ninth relational data to be as follows: the predicted acceleration of the torso of the legged robot at the target location being equal to a sum of a seventh product and a seventh constant matrix, the seventh product being a product of a seventh coefficient matrix and a force matrix. The force matrix is a matrix including one or more forces applied to at least one foot of the legged robot in contact with the ground. The seventh coefficient matrix represents a coefficient for the force matrix. The seventh constant matrix is any constant matrix, and a parameter value in the seventh constant matrix is determined.

In some aspects, both the seventh coefficient matrix and the seventh constant matrix are determined based on the target movement duration. In an aspect of this disclosure, both the seventh coefficient matrix with an undetermined value and the seventh constant matrix with an undetermined value are matrices including the movement duration. In a case that the target movement duration is given, values of the seventh coefficient matrix and the seventh constant matrix are determined.

In step 703, the computer device creates fourth relational data based on the third relational data and the ninth relational data. The fourth relational data indicates a positive correlation between a target value J and a status data error, the status data error represents an error between predicted status data and target status data in a case that the legged robot moves to the target location after the target movement duration elapses, the target status data includes a target rotational angle and a target acceleration of the legged robot at the target location, and the predicted status data includes the predicted rotational angle and the predicted acceleration.

In an aspect of this disclosure, the target status data includes an expected target rotational angle and an expected target acceleration of the torso in a case that the legged robot moves to the target location, and both the target rotational angle and the target acceleration are known values. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location. The ninth relational data indicates a relationship between the one or more forces applied to the one or more feet of the legged robot in contact with the ground and the predicted acceleration in a case that the legged robot moves to the target location after the target movement duration elapses. Therefore, based on the ninth relational data, the one or more forces applied to the one or more feet of the legged robot in contact with the ground can be used to represent the predicted acceleration of the torso in a case that the legged robot moves to the target location.

In an aspect of this disclosure, the error between the target status data and the predicted status data includes a rotational angle error and an acceleration error. Because both the target rotational angle and the target acceleration are known values, when the target rotational angle and the target acceleration of the torso in a case that the legged robot moves to the target location are given, the rotational angle error between the target rotational angle and the predicted rotational angle can be determined based on the predicted rotational angle and the target rotational angle, and the acceleration error between the target acceleration and the predicted acceleration can be determined based on the predicted acceleration and the target acceleration. Both the rotational angle error and the acceleration error can be represented by the one or more forces applied to the one or more feet of the legged robot in contact with the ground. Therefore, the created fourth relational data indicates the positive correlation between the target value J and the status data error, and can also indicate a relationship between the target value J and the one or more forces applied to the one or more feet of the legged robot in contact with the ground.

In an implementation, step 703 includes: setting the target value J in the fourth relational data based on a first difference and a sixth difference such as setting the target value J to a sum of squares of the first difference and the sixth difference. The first difference can being a difference between the predicted rotational angle and the target rotational angle of the legged robot at the target location, and the sixth difference being a difference between the predicted acceleration and the target acceleration of the legged robot at the target location.

In an aspect of this disclosure, the target value J is set to a sum of squares of the difference between the predicted rotational angle and the target rotational angle of the legged robot at the target location and the difference between the predicted acceleration and the target acceleration of the legged robot at the target location, so that the target value J has an extreme value, and a minimum value of the target value J can be determined subsequently.

An aspect of this disclosure is described by using an example in which status data of the legged robot includes a rotational angle and an acceleration of the torso of the legged robot. However, in another aspect, steps 702 and 703 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 704, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 704 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, impact of an acceleration of the legged robot is considered, to ensure that the acceleration of the legged robot is close to the target acceleration when the legged robot moves to the target location based on the determined movement trajectory, which, for example, further ensures accuracy and feasibility of the determined movement trajectory.

On the basis of the aspect shown in FIG. 2, for example, a plurality of sampling time points are selected within the target movement duration, and the movement trajectory of the torso of the legged robot is determined by using rotational angles at the plurality of sampling time points. For details about an exemplary process, refer to the following aspect. FIG. 8 is a flowchart of a movement trajectory determining method according to an aspect of this disclosure. The method is performed by a computer device. For example, the computer device is a legged robot or a control device. As shown in FIG. 8, the method includes the following steps:

In step 801, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 801 is similar to step 301. Details are not described herein again.

In step 802, the computer device selects a plurality of sampling time points within the target movement duration.

In an aspect of this disclosure, the target movement duration is any duration. In an implementation, the target movement duration is a time period with an initial time point as a starting point and an end time point as an ending point. At the initial time point, the legged robot is at an initial location. At the end time point, the legged robot is at the target location. The sampling time point is a time point between the initial time point corresponding to the initial location and the end time point corresponding to the target location. The plurality of sampling time points include two or more sampling time points. Interval duration between any two adjacent sampling time points may or may not be equal.

For example, the target movement duration is 60 seconds, the initial time point corresponding to the initial location is 0 seconds, the end time point corresponding to the target location is 60 seconds, and five sampling time points are selected within the target movement duration. A first sampling time point is 10 seconds, a second sampling time point is 20 seconds, a third sampling time point is 30 seconds, a fourth sampling time point is 40 seconds, and a fifth sampling time point is 50 seconds. Alternatively, a first sampling time point is 5 seconds, a second sampling time point is 20 seconds, a third sampling time point is 25 seconds, a fourth sampling time point is 40 seconds, and a fifth sampling time point is 55 seconds.

In an implementation, step 802 includes: dividing the target movement duration into a plurality of time periods, using an end time point of each time period as a sampling time point, and using a start time point of the first time period as a sampling time point. The plurality of time periods obtained may or may not be equal.

In step 803, the computer device creates tenth relational data for each sampling time point. The tenth relational data indicates a relationship between the one or more forces applied to the legged robot in contact with the ground and a rotational angle of the legged robot after movement duration between the sampling time point and an initial time point elapses.

In an aspect of this disclosure, there is movement duration between each sampling time point and the initial time point. The rotational angle of the legged robot is affected by the one or more forces applied to the one or more feet of the legged robot in contact with the ground. Therefore, for movement duration for each sampling time point, a rotational angle of a torso of the legged robot in a case that the movement duration elapses is related to the one or more forces applied to the one or more feet of the legged robot in contact with the ground. Therefore, the tenth relational data is created to indicate impact of the one or more forces applied to the one or more feet of the legged robot in contact with the ground on the rotational angle of the legged robot in a case that the movement duration for each sampling time point elapses.

In an implementation, the creating tenth relational data includes: setting the tenth relational data for each sampling time point to be as follows: the rotational angle being equal to a sum of an eighth product and an eighth constant matrix, the eighth product being a product of an eighth coefficient matrix and a force matrix. The force matrix is a matrix including one or more forces applied to at least one foot of the legged robot in contact with the ground. The eighth coefficient matrix represents a coefficient for the force matrix. The eighth constant matrix is any constant matrix, and a parameter value in the eighth constant matrix is determined.

In some aspects, both the eighth coefficient matrix and the eighth constant matrix in the tenth relational data for each sampling time point are determined based on the movement duration for the sampling time point. In an aspect of this disclosure, for tenth relational data for any sampling time point, both the eighth coefficient matrix with an undetermined value and the eighth constant matrix with an undetermined value are matrices including movement duration. In a case that the movement duration for the sampling time point is given, values of the eighth coefficient matrix and the eighth constant matrix are determined.

In step 804, the computer device creates fourth relational data based on the third relational data and the tenth relational data. The fourth relational data indicates a positive correlation between a target value J and a status data error and rotational angles at the plurality of sampling time points, the status data error represents an error between predicted status data and target status data in a case that the legged robot moves to the target location after the target movement duration elapses, the target status data includes a target rotational angle of the legged robot at the target location, and the predicted status data includes the predicted rotational angle.

In an aspect of this disclosure, the tenth relational data for each sampling time point indicates a relationship between the one or more forces applied to the one or more feet of the legged robot in contact with the ground and a rotational angle of the legged robot in a case that movement duration for the sampling time point elapses. Therefore, based on the tenth relational data for each sampling time point, the one or more forces applied to the one or more feet of the legged robot in contact with the ground can be used to represent the rotational angle of the legged robot in a case that the movement duration for each sampling time point elapses. The target status data includes an expected target rotational angle of the torso in a case that the legged robot moves to the target location, and the target rotational angle is a known value. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location.

In an aspect of this disclosure, the error between the target status data and the predicted status data includes a rotational angle error. Because the target rotational angle is a known value, when the target rotational angle of the torso in a case that the legged robot moves to the target location is given, the rotational angle error between the target rotational angle and the predicted rotational angle can be determined based on the predicted rotational angle and the target rotational angle. The rotational angle error can be represented by the one or more forces applied to the one or more feet of the legged robot in contact with the ground. The rotational angles at the plurality of sampling time points can also be represented by the one or more forces applied to the one or more feet of the legged robot in contact with the ground. Therefore, the created fourth relational data indicates a positive correlation between the target value J and the status data error, and can also indicate a relationship between the target value J and the one or more forces applied to the one or more feet of the legged robot in contact with the ground.

In an implementation, step 804 includes: setting the target value J in the fourth relational data based on a first value and a second value such as setting the target value J to a sum of the first value and the second value. The first value is a square of a first difference. The first difference is a difference between the target rotational angle and the predicted rotational angle. The second value is a weighted sum of squares of a plurality of rotational angle differences. The plurality of rotational angle differences include a difference between every two adjacent rotational angles in the rotational angles at the plurality of sampling time points.

In an aspect of this disclosure, the target value J is set to a sum of a square of the difference between the predicted rotational angle and the target rotational angle of the legged robot at the target location and the weighted sum of squares of the plurality of rotational angle differences, so that the target value J has an extreme value, and a minimum value of the target value J can be determined subsequently. During the creating the fourth relational data, a change of the rotational angle of the legged robot during movement is considered, to ensure feasibility of a subsequently determined movement trajectory.

In an aspect of this disclosure, the fourth relational data is created by using the rotational angles at the plurality of sampling time points selected within the target movement duration. However, in another aspect, steps 802 to 804 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 805, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 805 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, a change of the rotational angle of the legged robot during movement is considered, to ensure feasibility of a determined movement trajectory.

On the basis of the aspect shown in FIG. 2, for example, a plurality of sampling time points are selected within the target movement duration, and the movement trajectory of the torso of the legged robot is determined by using torso locations at the plurality of sampling time points. For details about an exemplary process, refer to the following aspect. FIG. 9 is a flowchart of a movement trajectory determining method according to an aspect of this disclosure. The method is performed by a computer device. For example, the computer device is a legged robot or a control device. As shown in FIG. 9, the method includes the following steps:

In step 901, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 901 is similar to step 301. Details are not described herein again.

In step 902, the computer device selects a plurality of sampling time points within the target movement duration.

Step 902 is similar to step 802. Details are not described herein again.

In step 903, the computer device creates eleventh relational data for each sampling time point. The eleventh relational data indicates a relationship between the one or more forces applied to the legged robot in contact with the ground and a predicted torso location of the legged robot after movement duration between the sampling time point and an initial time point elapses.

In an aspect of this disclosure, there is movement duration between each sampling time point and the initial time point. The torso location of the legged robot is affected by the one or more forces applied to the one or more feet of the legged robot in contact with the ground. Therefore, for movement duration for each sampling time point, a torso location of the legged robot in a case that the movement duration elapses is related to the one or more forces applied to the one or more feet of the legged robot in contact with the ground. Therefore, the eleventh relational data is created to indicate impact of the one or more forces applied to the one or more feet of the legged robot in contact with the ground on the torso location of the legged robot in a case that the movement duration for each sampling time point elapses.

In an implementation, the creating eleventh relational data includes: setting the eleventh relational data for each sampling time point to be as follows: the torso location being equal to a sum of a ninth product and a ninth constant matrix, the ninth product being a product of a ninth coefficient matrix and a force matrix. The force matrix is a matrix including one or more forces applied to at least one foot of the legged robot in contact with the ground. The ninth coefficient matrix represents a coefficient for the force matrix. The ninth constant matrix is any constant matrix, and a parameter value in the ninth constant matrix is determined.

In some aspects, both the ninth coefficient matrix and the ninth constant matrix in the eleventh relational data for each sampling time point are determined based on the movement duration for the sampling time point. In an aspect of this disclosure, for eleventh relational data for any sampling time point, both the ninth coefficient matrix with an undetermined value and the ninth constant matrix with an undetermined value are matrices including movement duration. In a case that the movement duration for the sampling time point is given, values of the ninth coefficient matrix and the ninth constant matrix are determined.

In step 904, the computer device creates fourth relational data based on the third relational data and the eleventh relational data. The fourth relational data indicates a positive correlation between a target value J and a status data error and a predicted torso location at each sampling time point, the status data error represents an error between predicted status data and target status data in a case that the legged robot moves to the target location after the target movement duration elapses, the target status data includes a target rotational angle of the legged robot at the target location, and the predicted status data includes the predicted rotational angle.

In an aspect of this disclosure, the eleventh relational data for each sampling time point indicates a relationship between the one or more forces applied to the one or more feet of the legged robot in contact with the ground and a predicted torso location of the legged robot in a case that movement duration for the sampling time point elapses. Therefore, based on the eleventh relational data for each sampling time point, the one or more forces applied to the one or more feet of the legged robot in contact with the ground can be used to represent the predicted torso location of the legged robot in a case that the movement duration for each sampling time point elapses. The target status data includes an expected target rotational angle of the torso in a case that the legged robot moves to the target location, and the target rotational angle is a known value. The third relational data indicates a relationship between the one or more forces applied to the one or more feet of the legged robot in contact with the ground and the predicted rotational angle in a case that the legged robot moves to the target location after the target movement duration elapses. Therefore, based on the third relational data, the one or more forces applied to the one or more feet of the legged robot in contact with the ground can be used to represent the predicted rotational angle of the torso in a case that the legged robot moves to the target location.

In an aspect of this disclosure, the error between the target status data and the predicted status data includes a rotational angle error. Because the target rotational angle is a known value, when the target rotational angle of the torso in a case that the legged robot moves to the target location is given, the rotational angle error between the target rotational angle and the predicted rotational angle can be determined based on the predicted rotational angle and the target rotational angle. The rotational angle error can be represented by the one or more forces applied to the one or more feet of the legged robot in contact with the ground. Predicted torso locations at the plurality of sampling time points can also be represented by the one or more forces applied to the one or more feet of the legged robot in contact with the ground. Therefore, the created fourth relational data indicates a positive correlation between the target value J and the status data error, and can also indicate a relationship between the target value J and the one or more forces applied to the one or more feet of the legged robot in contact with the ground.

In an implementation, step 904 includes: setting the target value J in the fourth relational data based on a first value and a third value such as setting the target value J to a sum of the first value and the third value. The first value is a square of a first difference. The first difference is a difference between the target rotational angle and the predicted rotational angle. The third value is a weighted sum of squares of a plurality of distances. The plurality of distances include a difference between every two adjacent predicted torso locations in the predicted torso locations at the plurality of sampling time points.

In an aspect of this disclosure, the target value J is set to a sum of a square of the difference between the predicted rotational angle and the target rotational angle of the legged robot at the target location and the weighted sum of squares of the plurality of distances, so that the target value J has an extreme value, and a minimum value of the target value J can be determined subsequently. During the creating the fourth relational data, a change of the torso location of the legged robot during movement is considered, to ensure feasibility of a subsequently determined movement trajectory.

In an aspect of this disclosure, the fourth relational data is created by using the predicted torso locations at the plurality of sampling time points selected within the target movement duration. However, in another aspect, steps 902 to 904 do not need to be performed, and fourth relational data is created based on the third relational data in another manner, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

In step 905, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 905 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, a change of the torso location of the legged robot during movement is considered, to ensure feasibility of a determined movement trajectory.

On the basis of the aspect shown in FIG. 2, a friction constraint is further created to limit the one or more forces applied to the one or more feet of the legged robot in contact with the ground, to ensure feasibility of a determined movement trajectory. For details about an exemplary process, refer to the following aspect. FIG. 10 is a flowchart of a movement trajectory determining method according to an aspect of this disclosure. The method is performed by a computer device. For example, the computer device is a legged robot or a control device. As shown in FIG. 10, the method includes the following steps:

In step 1001, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 1001 is similar to step 301. Details are not described herein again.

In step 1002, the computer device creates fourth relational data based on the third relational data. The fourth relational data indicates a positive correlation between a target value J and a status data error, the status data error represents an error between predicted status data and target status data in a case that the legged robot moves to the target location after the target movement duration elapses, the target status data includes a target rotational angle of the legged robot at the target location, and the predicted status data includes the predicted rotational angle.

Step 1002 is similar to step 202. Details are not described herein again.

In step 1003, the computer device creates a friction constraint that indicates a friction constraint met by the one or more forces applied to the one or more feet of the legged robot in contact with the ground.

The friction constraint is created to limit a status of contact between the one or more feet and the ground during movement of the legged robot, and thus may avoid relative sliding when the one or more feet of the legged robot gets in contact with the ground during movement, and ensures that the legged robot can move properly.

In step 1004, in a case that the friction constraint is met, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

In an aspect of this disclosure, in the fourth relational data, the target value J is positively correlated with the status data error. In an example, a value of the target value J can indicate a value of the status data error. Therefore, the minimum value of the target value J is determined as far as possible to make the status data error sufficiently small, and the one or more forces applied to the one or more feet of the legged robot in contact with the ground is enabled to meet the friction constraint. Thus, the predicted status data is closest to the target status data, and further ensure that, in a case that the legged robot subsequently moves based on a determined movement trajectory, status data that the legged robot can have when moving to the target location is closest to the target status data, which, for example, ensures accuracy and feasibility of the determined movement trajectory.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the determining the movement trajectory of the torso of the legged robot, the created friction constraint is used to limit a status of contact between the one or more feet of the legged robot and the ground, to avoid relative sliding when the one or more feet of the legged robot gets in contact with the ground during movement, to ensure that the legged robot can move properly and ensure feasibility of a determined movement trajectory of the legged robot.

On the basis of the aspect shown in FIG. 2, a spatial constraint on the one or more feet of the legged robot is further created to limit a spatial range within which the one or more feet of the legged robot is capable of moving, to ensure feasibility of a determined movement trajectory. For details about an exemplary process, refer to the following aspect. FIG. 11 is a flowchart of a movement trajectory determining method according to an aspect of this disclosure. The method is performed by a computer device. For example, the computer device is a legged robot or a control device. As shown in FIG. 11, the method includes the following steps:

In step 1101, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 1101 is similar to step 301. Details are not described herein again.

In step 1102, the computer device creates fourth relational data based on the third relational data, the fourth relational data indicating a positive correlation between a target value J and a status data error, the status data error representing an error between predicted status data and target status data in a case that the legged robot moves to the target location after the target movement duration elapses, the target status data including a target rotational angle of the legged robot at the target location, and the predicted status data including the predicted rotational angle.

Step 1102 is similar to step 202. Details are not described herein again.

In step 1103, the computer device creates a spatial constraint on the one or more feet of the legged robot. The spatial constraint indicates a spatial range within which the one or more feet of the legged robot is capable of moving, and the spatial constraint includes a constant C with an undetermined value.

In an aspect of this disclosure, when the legged robot starts to move from any location, the one or more feet of the legged robot can move within the spatial range within which the one or more feet are capable of moving, and cannot move to a location beyond the spatial range. Therefore, the spatial constraint on the one or more feet of the legged robot is created to limit the spatial range within which the one or more feet of the legged robot is capable of moving, to ensure that the one or more feet of the legged robot is within the spatial range within which the one or more feet is capable of moving during subsequent movement based on a determined movement trajectory. Thus, the one or more feet of the legged robot may be prevented from moving beyond the spatial range within which the one or more feet is capable of moving, and ensures feasibility of a subsequently determined movement trajectory of the legged robot. As shown in FIG. 12, a polyhedron 1201 in FIG. 12 can include a spatial range within which a foot 1202 of a legged robot is capable of moving, the spatial range includes a plurality of spatial points, and the plurality of spatial points are spatial points that the foot 1202 is capable of reaching.

In step 1104, in a case that the spatial constraint is met, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

In an aspect of this disclosure, in the fourth relational data, the target value J is positively correlated with the status data error. In an example, a value of the target value J can indicate a value of the status data error. Therefore, the minimum value of the target value is determined as far as possible to make the status data error sufficiently small, and the one or more feet of the legged robot are enabled to meet the spatial constraint. Thus, the predicted status data is closest to the target status data, and further ensure that, in a case that the legged robot subsequently moves based on a determined movement trajectory, status data that the legged robot can have when moving to the target location is closest to the target status data, and the one or more feet of the legged robot is within the spatial range within which the one or more feet are capable of moving, which, for example, further ensures accuracy and feasibility of the determined movement trajectory.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, because the spatial constraint is used to indicate the spatial range within which the one or more feet of the legged robot is capable of moving, the spatial constraint is used to limit movement of the one or more feet of the legged robot within the spatial range within which the one or more feet are capable of moving, to prevent the one or more feet of the legged robot from moving beyond the spatial range within which the one or more feet is capable of moving during movement based on a determined movement trajectory. Thus, feasibility of the movement trajectory may be ensured.

On the basis of the aspect shown in FIG. 2, the fourth relational data is created by further considering one or more forces applied to one or more feet of the legged robot in contact with the ground, to ensure feasibility of a determined movement trajectory. For details about an exemplary process, refer to the following aspect. FIG. 13 is a flowchart of a movement trajectory determining method according to an aspect of this disclosure. The method is performed by a computer device. For example, the computer device is a legged robot or a control device. As shown in FIG. 13, the method includes the following steps:

In step 1301, the computer device creates first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, the third relational data indicates a relationship between the one or more forces applied to the one or more feet of the legged robot in contact with the ground and a predicted rotational angle of the legged robot in a case that the legged robot moves to a target location after target movement duration elapses, and the first relational data and the second relational data both include a constant C with an undetermined value.

Step 1301 is similar to step 301. Details are not described herein again.

In step 1302, the computer device creates fourth relational data based on the third relational data and the one or more forces applied to the one or more feet of the legged robot in contact with the ground. The fourth relational data indicates a positive correlation between a target value J and a status data error and the one or more forces applied to the one or more feet of the legged robot in contact with the ground, the status data error represents an error between predicted status data and target status data in a case that the legged robot moves to the target location after the target movement duration elapses, the target status data includes a target rotational angle of the legged robot at the target location, and the predicted status data including the predicted rotational angle.

During the creating the fourth relational data, the one or more forces applied to the one or more feet of the legged robot is considered, to ensure that the one or more forces applied to the legged robot conforms to one or more forces applied to the legged robot during real movement, to ensure feasibility of a subsequently determined movement trajectory.

In an implementation, step 1302 includes: setting the target value J to a sum of a square of a first difference and a weighted sum of squares of forces applied to the one or more feet of the legged robot.

In an aspect of this disclosure, the target value J is set to a sum of a square of a difference between the predicted rotational angle and the target rotational angle of the legged robot at the target location and the weighted sum of squares of the forces applied to the one or more feet of the legged robot, so that the target value J has an extreme value, and a minimum value of the target value J can be determined subsequently. During the creating the fourth relational data, the one or more forces applied to the one or more feet of the legged robot during movement is considered, to ensure feasibility of a subsequently determined movement trajectory.

In step 1303, the computer device determines, based on the second relational data and the fourth relational data, a value of the constant C in a case that the target value J is a minimum value, and obtains first relational data with the determined value of the constant C. The first relational data with the determined value of the constant C represents the movement trajectory of the torso of the legged robot.

Step 1303 is similar to step 304. Details are not described herein again.

This disclosure provides a manner of determining a movement trajectory of a torso of a legged robot. In view of impact of a rotational angle of the torso on the movement trajectory during movement of the legged robot, a status data error between predicted status data and specified target status data is minimized by using status data including the rotational angle of the torso, and a value of a constant C in first relational data is determined, to ensure that the predicted status data is closest to the target status data. Thus, in a case that the legged robot moves based on a determined movement trajectory, status data that the legged robot can have when moving to a target location is closest to the target status data, and ensures feasibility and accuracy of the determined movement trajectory.

In addition, during the creating the fourth relational data, the one or more forces applied to the one or more feet of the legged robot is considered, to ensure that the one or more forces applied to the legged robot conforms to one or more forces applied to the legged robot during real movement, to ensure feasibility of a determined movement trajectory.

The aspects of FIG. 2 to FIG. 13 can be freely combined. For example, the aspects shown in FIG. 2 to FIG. 13 are combined. An aspect of this disclosure further provides a movement trajectory determining method. The method is performed by a computer device. For example, the computer device is a legged robot or a control device. As shown in FIG. 14, the method includes the following steps:

In step 1401, the computer device creates first relational data, second relational data, and third relational data, the first relational data indicating a relationship between a torso location of a legged robot and movement duration, the second relational data indicating a relationship between the movement duration and one or more forces applied to one or more feet of the legged robot in contact with a ground, the third relational data indicating a relationship between the one or more forces applied to the one or more feet of the legged robot in contact with the ground and a predicted rotational angle of the legged robot in a case that the legged robot moves to a target location after target movement duration elapses, and the first relational data and the second relational data both including a constant C with an undetermined value.

In step 1402, the computer device creates fifth relational data, the fifth relational data indicating a relationship between the one or more forces applied to the one or more feet of the legged robot in contact with the ground and a predicted angular velocity in a case that the legged robot moves to the target location after the target movement duration elapses.

In step 1403, the computer device creates sixth relational data, the sixth relational data indicating a relationship between the one or more forces applied to the one or more feet of the legged robot in contact with the ground and a predicted angular acceleration in a case that the legged robot moves to the target location after the target movement duration elapses.

In step 1404, the computer device creates seventh relational data, the seventh relational data indicating a relationship between the one or more forces applied to the one or more feet of the legged robot in contact with the ground and a predicted torso location in a case that the legged robot moves to the target location after the target movement duration elapses.

In step 1405, the computer device creates eighth relational data, the eighth relational data indicating a relationship between the one or more forces applied to the one or more feet of the legged robot in contact with the ground and a predicted movement speed in a case that the legged robot moves to the target location after the target movement duration elapses.

In step 1406, the computer device creates ninth relational data, the ninth relational data indicating a relationship between the one or more forces applied to the one or more feet of the legged robot in contact with the ground and a predicted acceleration in a case that the legged robot moves to the target location after the target movement duration elapses.

In step 1407, the computer device selects a plurality of sampling time points within the target movement duration.

In step 1408, the computer device creates tenth relational data for each sampling time point, the tenth relational data indicating a relationship between the one or more forces applied to the legged robot in contact with the ground and a rotational angle of the legged robot after movement duration between the sampling time point and an initial time point elapses.

In step 1409, the computer device creates eleventh relational data for each sampling time point, the eleventh relational data indicating a relationship between the one or more forces applied to the legged robot in contact with the ground and a predicted torso location of the legged robot after movement duration between the sampling time point and an initial time point elapses.

In step 1410, the computer device creates fourth relational data based on the third relational data, the fifth relational data, the sixth relational data, the seventh relational data, the eighth relational data, the ninth relational data, the tenth relational data, the eleventh relational data, and the one or more forces applied to the one or more feet of the legged robot in contact with the ground, the fourth relational data indicating a positive correlation between a target value J and a status data error, the one or more forces applied to the one or more feet of the legged robot in contact with the ground, the rotational angles at the plurality of sampling time points, and the predicted torso locations at the plurality of sampling time points, the status data error representing an error between predicted status data and target status data in a case that the legged robot moves to the target location after the target movement duration elapses, the target status data including a target rotational angle, a target angular velocity, a target angular acceleration, a target torso location, a target movement speed, and a target acceleration of the legged robot at the target location, and the predicted status data including the predicted rotational angle, the predicted angular velocity, the predicted angular acceleration, the predicted torso location, the predicted movement speed, and the predicted acceleration.

In step 1411, the computer device creates a friction constraint, the friction constraint indicating a friction constraint met by the one or more forces applied to the one or more feet of the legged robot in contact with the ground.

In step 1412, the computer device creates a spatial constraint on the one or more feet of the legged robot, the spatial constraint indicating a spatial range within which the one or more feet of the legged robot is capable of moving, and the spatial constraint including a constant C with an undetermined value.

In step 1413, in a case that the friction constraint and the spatial constraint are met, the computer device determines, based on the second relational data and the fourth relational data, a value of the constant C in a case that the target value J is a minimum value, and obtains first relational data with the determined value of the constant C, the first relational data with the determined value of the constant C representing a movement trajectory of a torso of the legged robot.

This disclosure provides a manner of determining a movement trajectory of a torso of a legged robot. A rotational angle, an angular velocity, an angular acceleration, a torso location, a movement speed, and an acceleration of the torso, and impact of one or more forces applied to one or more feet of the legged robot on a movement trajectory are comprehensively considered, and movement of the legged robot is limited by a friction constraint and a spatial constraint, to ensure feasibility of a determined movement trajectory.

The first relational data to the eleventh relational data in the aspects shown in FIG. 2 to FIG. 14 can be stored in the legged robot in a form of a descriptive statement or a function.

The aspects shown in FIG. 2 to FIG. 14 are described by using an example of determining the movement trajectory of the torso of the legged robot. On the basis of determining the legged robot, relational data between movement duration and a movement speed, an acceleration, a rotational angle, an angular velocity, and an angular acceleration of the legged robot can be further determined. Then a location and a posture of the legged robot during movement are determined, to control the legged robot to move based on a determined location and posture.

In an implementation, twelfth relational data, thirteenth relational data, fourteenth relational data, fifteenth relational data, and sixteenth relational data are created, the twelfth relational data indicating a relationship between the movement speed of the legged robot and the movement duration, the thirteenth relational data indicating a relationship between the acceleration of the legged robot and the movement duration, the fourteenth relational data indicating a relationship between the rotational angle of the legged robot and the movement duration, the fifteenth relational data indicating a relationship between the angular velocity of the legged robot and the movement duration, and the sixteenth relational data indicating a relationship between the angular acceleration of the legged robot and the movement duration. All the twelfth relational data, the thirteenth relational data, the fourteenth relational data, the fifteenth relational data, and the sixteenth relational data include a constant C with an undetermined value. Therefore, after a value of the constant C is determined, twelfth relational data, thirteenth relational data, fourteenth relational data, fifteenth relational data, and sixteenth relational data with the determined value of the constant C are obtained, the twelfth relational data with the determined value of the constant C representing a speed trajectory of the legged robot, the thirteenth relational data with the determined value of the constant C representing an acceleration trajectory of the legged robot, the fourteenth relational data with the determined value of the constant C representing a rotational angle trajectory of the legged robot, the fifteenth relational data with the determined value of the constant C representing an angular velocity trajectory of the legged robot, and the sixteenth relational data with the determined value of the constant C representing an angular acceleration trajectory of the legged robot.

In an aspect of this disclosure, in a case that the movement trajectory, the speed trajectory, the acceleration trajectory, the rotational angle trajectory, the angular velocity trajectory, and the angular acceleration trajectory of the torso of the legged robot are determined, the legged robot is controlled to move based on the movement trajectory, the speed trajectory, the acceleration trajectory, the rotational angle trajectory, the angular velocity trajectory, and the angular acceleration trajectory.

Figures 15, 16, 17:
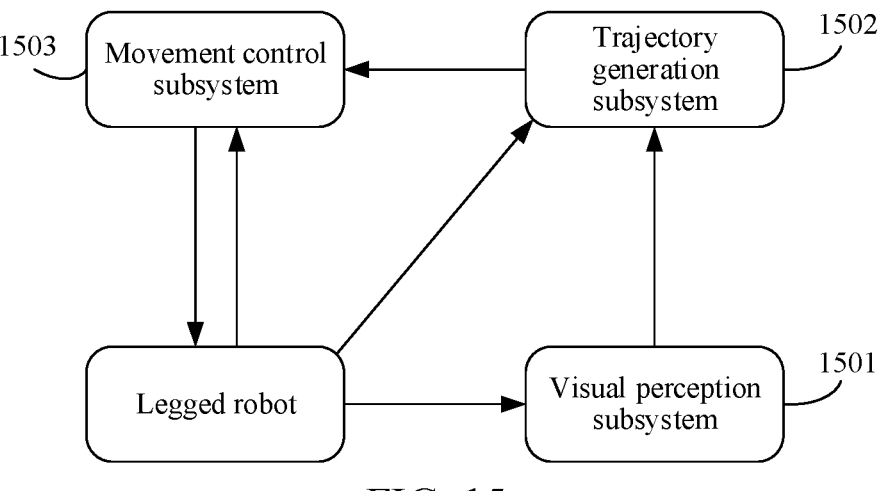
FIG. 15 shows a block diagram of controlling, by a legged robot system, a legged robot to move according to an aspect of this disclosure.
FIG. 16 shows an example of a control apparatus (e.g., a movement trajectory determining apparatus) according to an aspect of this disclosure.
FIG. 17 shows an example of a control apparatus (e.g., a movement trajectory determining apparatus) according to an aspect of this disclosure.

On the basis of the aspects shown in FIG. 2 to FIG. 14, an aspect of this disclosure further provides a block diagram of controlling, by a legged robot system, a legged robot to move. As shown in FIG. 15, the legged robot system includes a visual perception subsystem 1501, a trajectory generation subsystem 1502, and a movement control subsystem 1503. The visual perception subsystem 1501 obtains a target location and a step order of the legged robot based on status data of the legged robot, and transmits the obtained target location and step order to the trajectory generation subsystem 1502.

In an implementation, the visual perception subsystem 1501 includes a camera. The legged robot photographs an environment in a movement direction of the legged robot by using the camera to obtain an environment image including the movement direction of the legged robot, performs feature extraction on the environment image to obtain a target location and a foothold location of the legged robot, and transmits the target location, the step order, and the foothold location to the trajectory generation subsystem 1502.

The trajectory generation subsystem 1502 receives the target location and the step order of the legged robot that are transmitted by the visual perception subsystem 1501, determines a movement trajectory of a torso of the legged robot according to the aspects shown in FIG. 2 to FIG. 14, determines a joint torque for each joint of the legged robot based on the determined movement trajectory of the torso of the legged robot and the step order, and transmits the joint torque for each joint of the legged robot to the movement control subsystem 1503.

The movement control subsystem 1503 receives the joint torque for each joint of the legged robot that is transmitted by the trajectory generation subsystem 1502, controls each joint to rotate based on the joint torque for each joint of the legged robot to drive the legged robot to move, and monitors status data of the legged robot in real time during a process of controlling the legged robot to move, to ensure that the legged robot can move stably.

The first relational data to the eleventh relational data, the friction constraint, and the spatial constraint are included in the foregoing aspects. On the basis of the foregoing aspects, the following aspects describe in detail processes of creating the first relational data to the eleventh relational data, the friction constraint, and the spatial constraint.

1. Process of Creating the Third Relational Data and the Fifth Relational Data to the Ninth Relational Data by the Computer Device First, rigid body dynamic relational data of the legged robot is created. The rigid body dynamic relational data is as follows:

$$\begin{cases} \sum_{i=1}^{N} f_i = m(\ddot{p} - g) \\ \sum_{i=1}^{N} (\hat{r}_i - \hat{p}) f_i = \mathcal{L} \end{cases} \quad (1)$$

N represents a quantity of feet of the legged robot that are in contact with the ground, and N is an integer greater than 0. i represents a sequence number of a foot of the legged robot that is in contact with the ground, and i is a positive integer not greater than N. $f_i$ represents a force applied to an $i^{th}$ foot of the feet of the legged robot that are in contact with the ground in a world coordinate system. m represents mass of the legged robot. p represents a torso location of the legged robot in the world coordinate system. $\ddot{p}$ represents an acceleration of the torso of the legged robot in the world coordinate system. g represents an acceleration of gravity. $r_i$ represents a contact location, on the ground, of the $i^{th}$ foot of the legged robot that is in contact with the ground in the world coordinate system. $\hat{r}_i$ represents a skew symmetric matrix for the contact location $r_i$. $\hat{p}$ represents a skew symmetric matrix for the torso location p. $\mathcal{L}$ represents an angular momentum of the torso of the legged robot in a coordinate system with an origin at a center of mass and with a same attitude as the world system. $\dot{\mathcal{L}}$ represents a torque applied to the torso of the legged robot. $f_i$, p, g, $r_i$, and $\mathcal{L}$ all belong to $\mathbb{R}^3$, and $\mathbb{R}$ represents a set of real numbers in multidimensional space.

In a case that leg mass of the legged robot can be ignored, the angular momentum of the torso of the legged robot meets the following relationship:

$$\mathcal{L} = \mathcal{R}\mathcal{J}^B\omega^B \tag{2}$$

$\mathcal{L}$ represents the angular momentum of the torso of the legged robot in the coordinate system with the origin at the center of mass and with the same attitude as the world system. $\mathcal{R}$ represents an attitude of the torso of the legged robot in the world coordinate system. $\mathcal{J}$ B represents a rotational inertia of the torso of the legged robot in a coordinate system of the torso of the legged robot. $\omega^B$ represents an angular velocity of the torso of the legged robot in the coordinate system of the torso of the legged robot.

In an aspect of this disclosure, the torso of the legged robot is a base of the legged robot, and the coordinate system of the torso is a base coordinate system.

On the basis of the formula (2), in combination with $\hat{\omega}^G = \dot{R}R^T$, the following formula (3) can be obtained:

$$\dot{\mathcal{L}} = \mathcal{J}^G\dot{\omega}^G - (\mathcal{J}^G\omega^G) \times \omega^G \tag{3}$$

$$\omega^G = \mathcal{R}\omega^B$$

$$\dot{\omega}^G = \mathcal{R}\dot{\omega}^B$$

$$\mathcal{J}^G = \mathcal{R}\mathcal{J}^G\mathcal{R}^T$$

$\dot{\mathcal{L}}$ represents the torque applied to the torso of the legged robot, and $\mathcal{J}^G$ represents a rotational inertia of the torso of the legged robot in the coordinate system with the origin at the center of mass and with the same attitude as the world system. $\omega^G$ represents an angular velocity of the torso of the legged robot in the world coordinate system. $\hat{\omega}^G$ represents a skew symmetric matrix for the angular velocity $\omega^G$. $\dot{\omega}^G$ represents an angular acceleration of the torso of the legged robot in the world coordinate system. $\mathcal{R}$ represents the attitude of the torso of the legged robot in the world coordinate system. $\omega^B$ represents the angular velocity of the torso of the legged robot in the coordinate system of the torso of the legged robot. $\dot{\omega}^B$ represents an angular acceleration of the torso of the legged robot in the coordinate system of the torso of the legged robot. $\mathcal{J}^B$ represents the rotational inertia of the torso of the legged robot in the coordinate system of the torso of the legged robot. $\dot{R}$ represents a derivative of the attitude $\mathcal{R}$ of the torso to time. $R^T$ is a transposed matrix of $\mathcal{R}$.

Based on the formula (1), the target movement duration is divided into k control periods. Duration of each control period is $\Delta T$. A current time point is 0. After the k control periods elapse, a torso location, a speed, an acceleration, an angle, an angular velocity, and an angular acceleration of the torso of the legged robot in the world coordinate system meet the following relationship:

$$\ddot{p}_k = \frac{1}{m}\sum_{i=1}^{N} f_{i,k} + g \tag{4}$$

$$\dot{p}_k = \sum_{j=0}^{k-1}\Delta T\ddot{p}_j + \dot{p}_0$$

$$p_k = \sum_{j=0}^{k}\left(k - \frac{1+2j}{2}\right)\Delta T^2\ddot{p}_j + k\Delta T\dot{p}_0 + p_0$$

$$\Delta p_k = \sum_{j=0}^{k}\left(k - \frac{1+2j}{2}\right)\Delta T^2\ddot{p}_j + k\Delta T\dot{p}_0$$

$$\omega_k = \sum_{j=0}^{k-1}\Delta T\dot{\omega}_j + \omega_0$$

$$\theta_k = \sum_{j=0}^{k}\left(k - \frac{1+2j}{2}\right)\Delta T^2\dot{\omega}_j + k\Delta T\omega_0 + \theta_0$$

$$\Delta\omega_k = \sum_{j=0}^{k-1}\Delta T\dot{\omega}_j$$

$$\Delta\theta_k = \sum_{j=0}^{k}\left(k - \frac{1+2j}{2}\right)\Delta T^2\dot{\omega}_j + k\Delta T\omega_0$$

$\ddot{p}_k$ represents the acceleration of the legged robot. m represents the mass of the legged robot. N represents the quantity of feet of the legged robot that are in contact with the ground, and N is an integer greater than 0. i represents the sequence number of the foot of the legged robot that is in contact with the ground, and i is a positive integer not greater than N·$f_{i,k}$ represents a force applied to the $i^{th}$ foot of the feet of the legged robot that are in contact with the ground in the world coordinate system after the k control periods elapse. g represents the acceleration of gravity. $\dot{p}k$ represents the speed of the torso of the legged robot. $\Delta T$ represents the duration of the control period. j represents sequence numbers of the k control periods, and j is an integer not greater than k−1. $\ddot{p}_j$ represents an acceleration of the legged robot in a $j^{th}$ control period. $\dot{p}_0$ represents an initial movement speed of the legged robot. $p_k$ represents the torso location of the legged robot. k represents a quantity of control periods for the legged robot. $p_0$ represents an initial location of the torso of the legged robot. $\Delta p_k$ represents a torso location increment of the legged robot after the k control periods elapse. $\omega_k$ represents an angular velocity of the torso of the legged robot after a $k^{th}$ control period elapses. $\dot{\omega}_j$ represents an angular acceleration of the torso of the legged robot within the $j^{th}$ control period. $\omega_0$ represents an initial angular velocity of the legged robot. $\theta_k$ represents a rotational angle of the torso of the legged robot within the $k^{th}$ control period. $\theta_0$ represents a rotational angle of the legged robot at an initial moment. $\Delta\omega_k$ represents an angular velocity increment of the torso of the legged robot after the $k^{th}$ control period elapses. $\Delta\theta_k$ represents a rotational angle increment of the torso of the legged robot after the $k^{th}$ control period elapses.

The force $f_i$ applied to the foot of the legged robot in contact with the ground constitutes a force matrix $F_{total}$. After the k control periods elapse, the torso location, the speed, and the angular velocity of the legged robot in the world coordinate system can be in a linear relationship with the force matrix $F_{total}$. Therefore, after the k control periods elapse, the torso location, the speed, and the angular velocity of the legged robot in the world coordinate system meet the seventh relational data, the eighth relational data, and the ninth relational data. The seventh relational data, the eighth relational data, and the ninth relational data are as follows:

$$p_k = A_{p,k} F_{total} + b_{p,k} \qquad (5)$$

$$\dot{p}_k = A_{\dot{p},k} F_{total} + b_{\dot{p},k}$$

$$\ddot{p}_k = A_{\ddot{p},k} F_{total} + b_{\ddot{p},k}$$

$$b_{p,k} = \frac{1}{2}(k\Delta T)^2 g + k\Delta T \dot{p}_0 + p_0$$

$$b_{\dot{p},k} = k\Delta T g + \dot{p}_0$$

$$b_{\ddot{p},k} = g$$

$p_k$ represents the torso location of the legged robot after the k control periods elapse, namely, the predicted torso location of the legged robot at the target location. $A_{p,k}$ represents the fifth coefficient matrix. $F_{total}$ represents the force matrix constituted by the force $f_{i,k}$ applied to the foot of the legged robot in contact with the ground. $b_{p,k}$ represents the fifth constant matrix. $\dot{p}_k$ represents the movement speed of the torso of the legged robot after the k control periods elapse, namely, the predicted movement speed of the torso of the legged robot at the target location. $A_{\dot{p},k}$ represents the sixth coefficient matrix. $b_{\dot{p},k}$ represents the sixth constant matrix. $\ddot{p}_k$ represents the acceleration of the torso of the legged robot after the k control periods elapse, namely, the predicted acceleration of the torso of the legged robot at the target location. $A_{\ddot{p},k}$ represents the seventh coefficient matrix. $b_{\ddot{p},k}$ represents the seventh constant matrix. $\Delta T$ represents the duration of each control period. g represents the acceleration of gravity. $\dot{p}_0$ represents the initial movement speed of the legged robot. $p_0$ represents the initial location of the torso of the legged robot.

The angular acceleration $\dot{\omega}_k$ of the torso of the legged robot after the k control periods elapse can be in a linear relationship with the force matrix $F_{total}$. Therefore, the rotational angle, the angular velocity, and the angular acceleration of the torso of the legged robot are in a linear relationship with the vector $F_{total}$ in the world coordinate system. Based on the Taylor's formula, an expansion form of the Taylor's formula can be shown in the following formula:

$$e^{\Delta\hat{\theta}} \approx I + \Delta\hat{\theta} \qquad (6)$$

$$e^{\Delta\hat{\theta}_1 \Delta\hat{\theta}_2} \approx I + \Delta\hat{\theta}_1 + \Delta\hat{\theta}_2$$

Based on the expansion form of the Taylor's formula, the attitude of the torso of the legged robot can meet the following relationship in the world coordinate system within the $k^{th}$ control period:

$$R_k \approx \left(I + \Delta\hat{\theta}_k\right)R_0 \qquad (7)$$

$R_k$ represents an attitude of the torso of the legged robot in the world coordinate system within the $k^{th}$ control period. I is an identity matrix. $\Delta\hat{\theta}_k$ represents a skew symmetric matrix for the rotational angle increment $\Delta\theta_k$ of the torso of the legged robot after the $k^{th}$ control period elapses. $R_0$ represents an attitude of the torso of the legged robot in the world coordinate system at an initial time point.

The rotational inertia of the legged robot meets the following relationship in the world coordinate system within the $k^{th}$ control period:

$$\mathcal{J}_k \approx \mathcal{J}_0 + \Delta\hat{\theta}_k \mathcal{J}_0 - \mathcal{J}_0 \Delta\hat{\theta}_k \qquad (8)$$

$$\mathcal{J}_0 = R_0 \mathcal{J}^B R_0^T$$

$\mathcal{J}_k$ represents a rotational inertia of the torso of the legged robot in the world coordinate system within the $k^{th}$ control period. $\mathcal{J}_0$, represents a rotational inertia of the torso of the legged robot in the world coordinate system at the initial moment. $\Delta\hat{\theta}_k$ represents the skew symmetric matrix for the rotational angle increment $\Delta\theta_k$ of the torso of the legged robot after the $k^{th}$ control period elapses. $R_0$ represents the attitude of the torso of the legged robot in the world coordinate system at the initial time point. $\mathcal{J}^B$ represents the rotational inertia of the torso of the legged robot in the coordinate system of the torso. $R_0^T$ represents a transposed matrix of the attitude $R_0$.

In the formula (8), $\Delta\hat{\theta}_k \mathcal{J}_0 \Delta\hat{\theta}_k$ includes a quadratic term of $\Delta\theta_k$. $\Delta\theta_k$, when being small, can be ignored. In an example, the formula (8) is substituted into the formula (3), and higher order terms related to $\Delta\omega_k$ and $\Delta\theta_k$ are ignored (a higher order is not less than a second order). The following formula can be obtained:

$$\dot{\mathcal{L}}_k \approx \mathcal{J}_0 \dot{\omega}_k + \left(\Delta\hat{\theta}_k \mathcal{J}_0 - \mathcal{J}_0 \Delta\hat{\theta}_k\right)\dot{\omega}_k - \left(\mathcal{J}_0 \omega_0\right) \times \omega_0 - \qquad (9)$$

$$\left(\mathcal{J}_0 \Delta\omega_k\right) \times \omega_0 - \left(\mathcal{J}_0 \omega_0\right) \times \Delta\omega_k - \left[\left(\Delta\hat{\theta}_k \mathcal{J}_0 - \mathcal{J}_0 \Delta\hat{\theta}_k\right)\omega_0\right] \times \omega_0$$

$\dot{\mathcal{L}}_k$ represents a torque applied to the torso of the legged robot within the $k^{th}$ control period. $\mathcal{J}_0$ represents the rotational inertia of the torso of the legged robot in the world coordinate system at the initial moment. $\dot{\omega}_k$ represents the angular acceleration of the torso of the legged robot within the $k^{th}$ control period. $\Delta\hat{\theta}_k$ represents the skew symmetric matrix for the rotational angle increment $\Delta\theta_k$ of the torso of the legged robot after the $k^{th}$ control period elapses. $\omega_0$ represents the initial angular velocity of the torso of the legged robot. $\Delta\omega_k$ represents the angular velocity increment of the torso of the legged robot after the k control periods elapse.

In an example, $\mathcal{J}^B = \text{diag}([\mathcal{J}_x \ \mathcal{J}_y \ \mathcal{J}_z])$ and $R = [R_x \ R_y \ R_z]$. The legged robot can rotate around a coordinate axis in the coordinate system of the torso of the legged robot. An X-axis is used as an example. In a case that the torso of the legged robot rotates around an X-axis in the coordinate system of the torso of the legged robot, the rotational angle increment and the angular velocity of the torso of the legged robot meet the following relationship:

$$\Delta\theta = \alpha R_x, \ \omega = \beta R_x \qquad (10)$$

$$(\Delta\theta \mathcal{J}_0 - \mathcal{J}_0 \Delta\theta)\dot{\omega} = 0$$

$\Delta\theta$ represents the rotational angle increment of the torso of the legged robot. $\alpha$ is a constant. $\dot{\omega}$ represents the angular acceleration of the torso of the legged robot. $\beta$ is a constant. $R_x$ represents an attitude of the torso of the legged robot rotating around the X-axis in the coordinate system of the legged robot. $\mathcal{J}_0$ represents the rotational inertia of the torso of the legged robot in the world coordinate system at the initial moment.

Based on the formula (4), to achieve $\Delta\theta=\alpha R_x$ and $\dot{\omega}=\beta R_x$, while meeting $\omega_0=\gamma R_x$, the formula (9) may be simplified as follows:

$$\dot{\mathcal{L}}_k \approx \mathcal{J}_0\dot{\omega}_k + \hat{\omega}_0\mathcal{J}_0\omega_0 + [\hat{\omega}_0\mathcal{J}_0 - \widehat{(\mathcal{J}_0\omega_0)}]\Delta\omega_k \qquad (11)$$

$\dot{\mathcal{L}}_k$ represents a torque applied to the center of mass of the legged robot within the $k^{th}$ control period. $\mathcal{J}_0$ represents the rotational inertia of the torso of the legged robot in the world coordinate system at the initial moment. $\dot{\omega}_k$ represents the angular acceleration of the torso of the legged robot within the $k^{th}$ control period. $\hat{\omega}_0$ represents a skew symmetric matrix for the initial angular velocity $\omega_0$ of the torso of the legged robot at the initial time point. $\omega_0$ represents the initial angular velocity of the torso of the legged robot at the initial time point. $\widehat{\mathcal{J}_0\omega_0}$ represents a skew symmetric matrix for $\mathcal{J}_0\omega_0$. $\Delta\omega_k$ represents the angular velocity increment of the torso of the legged robot after the k control periods elapse.

To achieve a linear relationship between $\dot{\omega}_k$ and $F_{total}$ without rotation around a principal axis, a quadratic term $(\Delta\theta_k\mathcal{J}_0 - \mathcal{J}_0\Delta\hat{\theta}_k)\dot{\omega}_k$ is ignored, and the formula (9) may be simplified as follows:

$$\dot{\mathcal{L}}_k \approx \mathcal{J}_0\dot{\omega}_k + \hat{\omega}_0\mathcal{J}_0\omega_0 + [\hat{\omega}_0\mathcal{J}_0 - \widehat{(\mathcal{J}_0\omega_0)}]\Delta\omega_k + \hat{\omega}_0[\mathcal{J}_0\hat{\omega}_0 - \widehat{(\mathcal{J}_0\omega_0)}]\Delta\theta_k \quad (12)$$

$\dot{\mathcal{L}}_k$ represents the torque applied to the torso of the legged robot within the $k^{th}$ control period. $\dot{\mathcal{L}}_k$ represents the rotational inertia of the torso of the legged robot in the world coordinate system at the initial moment. $\dot{\omega}_k$ represents the angular acceleration of the torso of the legged robot within the $k^{th}$ control period. $\hat{\omega}_0$ represents the skew symmetric matrix for the initial angular velocity $\omega_0$ of the torso of the legged robot. $\widehat{\mathcal{J}_0\omega_0}$ represents the skew symmetric matrix for $\mathcal{J}_0\omega_0$. $\Delta\omega_k$ represents the angular velocity increment of the torso of the legged robot after the k control periods elapse. $\Delta\theta_k$ represents the rotational angle increment of the torso of the legged robot after the k control periods elapse.

On the basis of the formula (12), assuming that $Q=\hat{\omega}_0\mathcal{J}_0 - \widehat{(\mathcal{J}_0\omega_0)}$, $Q^T=-\mathcal{J}_0\hat{\omega}_0 + \widehat{(\mathcal{J}_0\omega_0)}$. Assuming that $U=-\hat{\omega}_0[\mathcal{J}_0\hat{\omega}_0 - \widehat{(\mathcal{J}_0\omega_0)}]=\hat{\omega}_0Q^T$, Q and U are substituted into the formula (12) to obtain the following formula (13):

$$\dot{\mathcal{L}}_k \approx \mathcal{J}_0\dot{\omega}_k + \hat{\omega}_0\mathcal{J}_0\omega_0 + Q\Delta\omega_k - U\Delta\theta_k \qquad (13)$$

$\dot{\mathcal{L}}_k$ represents the torque applied to the torso of the legged robot within the $k^{th}$ control period. $\mathcal{J}_0$ represents the rotational inertia of the torso of the legged robot in the world coordinate system at the initial moment. $\dot{\omega}_k$ represents the angular acceleration of the torso of the legged robot within the $k^{th}$ control period. $\hat{\omega}_0$, represents the skew symmetric matrix for the initial angular velocity $\omega_0$ of the torso of the legged robot. $\Delta\omega_k$ represents the angular velocity increment of the torso of the legged robot after the k control periods

44 elapse. $\Delta\theta_k$ represents the rotational angle increment of the torso of the legged robot after the k control periods elapse.

The formula (namely, the formula for $\Delta p_k$) in the fourth line of the formula (4) and the formula (namely, $$\sum_{i=1}^{N} f_i = m(\ddot{p} - g))$$

in the first line of the formula (1) are substituted into the formula (namely, $$\sum_{i=1}^{N} (\hat{r}_i - \hat{p})f_i = \dot{\mathcal{L}})$$

in the second line of the formula (1) to obtain the following relationship:

$$\Sigma_{i=1}^{N}(\hat{r}_i - \hat{p}_0)f_i = m\Delta\hat{p}(\ddot{p} - g) + \dot{\mathcal{L}} \qquad (14)$$

N represents the quantity of feet of the legged robot that are in contact with the ground, and N is an integer greater than 0. i represents the sequence number of the foot of the legged robot that is in contact with the ground, and i is a positive integer not greater than N. $f_i$ represents the force applied to the $i^{th}$ foot of the feet of the legged robot that are in contact with the ground in the world coordinate system. m represents the mass of the legged robot. $\ddot{p}$ represents the acceleration of the torso of the legged robot in the world coordinate system. g represents the acceleration of gravity. $r_i$ represents the contact location, on the ground, of the $i^{th}$ foot of the legged robot that is in contact with the ground in the world coordinate system. $\hat{r}_i$ represents the skew symmetric matrix for the contact location $r_i$. $\hat{p}$ represents the skew symmetric matrix for the torso location p. $\hat{p}_0$ represents a skew symmetric matrix for a torso location $p_0$ of the legged robot in the world coordinate system. $\dot{\mathcal{L}}$ represents the torque applied to the torso of the legged robot.

Assuming that $\Delta\hat{p}_k\ddot{p}_k\approx 0$, $(\Delta\hat{\theta}_k\mathcal{J}_0 - \mathcal{J}_0\Delta\hat{\theta}_k)\dot{\omega}_k\approx 0$ in the formula (14), in combination with the formula (13), the formula (14) is approximated as the following relationship:

$$\Sigma_{i=1}^{N}(\hat{r}_{i,k} - \hat{p}_0)f_{i,k} \approx m\hat{g}\Delta p_k + \mathcal{J}_0\dot{\omega}_k + \hat{\omega}_0\mathcal{J}_0\omega_0 + Q\Delta\omega_k - U\Delta\theta_k \quad (15)$$

N represents the quantity of feet of the legged robot that are in contact with the ground, and N is an integer greater than 0. i represents the sequence number of the foot of the legged robot that is in contact with the ground, and i is a positive integer not greater than N. $f_{i,k}$ represents the force applied to the $i^{th}$ foot of the feet of the legged robot that are in contact with the ground in the world coordinate system within the $k^{th}$ control period. m represents the mass of the legged robot. $\Delta p_k$ represents the torso location increment of the legged robot after the k control periods elapse. g represents the acceleration of gravity. $\hat{g}$ represents a skew symmetric matrix for the acceleration of gravity g. $r_{i,k}$ represents a contact location, on the ground, of the $i^{th}$ foot of the legged robot that is in contact with the ground in the world coordinate system within the $k^{th}$ control period. $\hat{r}_{i,k}$ represents a skew symmetric matrix for the contact location $r_{i,k}$. $\hat{p}_0$ represents the skew symmetric matrix for the torso location $p_0$ of the legged robot in the world coordinate system. $\mathcal{J}_0$ represents the rotational inertia of the torso of the legged robot in the world coordinate system at the initial moment. $\dot{\omega}_k$ represents the angular acceleration of the torso of the legged robot within the $k^{th}$ control period. $\hat{\omega}_0$ represents the skew symmetric matrix for the initial angular velocity $\omega_0$ of the torso of the legged robot. $\Delta\omega_k$ represents the angular velocity increment of the torso of the legged robot after the k control periods elapse. $\Delta\theta_k$ represents the rotational angle increment of the torso of the legged robot after the k control periods elapse.

The formulas (namely, the formulas for $\Delta p_k$, $\Delta\omega_k$, and $\Delta\theta_k$) in the fourth line, the seventh line, and the eighth line of the formula (4) are substituted into the formula (15) to obtain the following relationships:

$$\sum_{i=1}^{N} (\hat{r}_{i,k} - \hat{p}_0) f_{i,k} = \tag{16}$$

$$\sum_{i=0}^{k-1}\left(k - \frac{1+2i}{2}\right)\Delta T^2 m\hat{g}\dot{p}_i + \mathcal{J}_0\dot{\omega}_k + \sum_{i=0}^{k-1}\Delta TQ\dot{\omega}_i -$$

$$\sum_{i=0}^{k-1}\left(k - \frac{1+2i}{2}\right)\Delta T^2 P\dot{\omega}_i + \hat{\omega}_0\mathcal{J}_0\omega_0 + mk\Delta T\hat{g}\dot{p}_0 + k\Delta TP\omega_0$$

$$\mathcal{J}_0\dot{\omega}_k = \sum_{i=1}^{N} (\hat{r}_{i,k} - \hat{p}_0) f_{i,k} + \tag{17}$$

$$\sum_{i=0}^{k-1}\left(\left(\frac{1+2i}{2} - k\right)\Delta T^2 m\hat{g}\dot{p}_i + \left(\left(k - \frac{1+2i}{2}\right)\Delta T^2 P - \Delta TQ\right)\dot{\omega}_i\right) -$$

$$\hat{\omega}_0\mathcal{J}_0\omega_0 - mk\Delta T\hat{g}\dot{p}_0 + k\Delta T\hat{\omega}_0\widetilde{(\mathcal{J}_0\omega_0)}\omega_0$$

$$U = -\hat{\omega}_0[\mathcal{J}_0\hat{\omega}_0 - \widetilde{(\mathcal{J}_0\omega_0)}] = \hat{\omega}_0 Q^T$$

$$Q = \hat{\omega}_0\mathcal{J}_0 - \widetilde{(\mathcal{J}_0\omega_0)}$$

N represents the quantity of feet of the legged robot that are in contact with the ground, and N is an integer greater than 0. i represents the sequence number of the foot of the legged robot that is in contact with the ground, and i is a positive integer not greater than N. $f_{i,k}$ represents the force applied to the $i^{th}$ foot of the feet of the legged robot that are in contact with the ground in the world coordinate system within the $k^{th}$ control period. m represents the mass of the legged robot. $\Delta p_k$ represents the torso location increment of the legged robot after the k control periods elapse. g represents the acceleration of gravity. $\hat{g}$ represents the skew symmetric matrix for the acceleration of gravity g. $r_{i,k}$ represents the contact location, on the ground, of the $i^{th}$ foot of the legged robot that is in contact with the ground in the world coordinate system within the $k^{th}$ control period. $\hat{r}_{i,k}$ represents the skew symmetric matrix for the contact location $r_{i,k}$. $\hat{p}_0$ represents the skew symmetric matrix for the torso location $p_0$ of the legged robot in the world coordinate system. $\mathcal{J}_0$ represents the rotational inertia of the torso of the legged robot in the world coordinate system at the initial moment. $\dot{\omega}_k$ represents the angular acceleration of the torso of the legged robot within the $k^{th}$ control period. $\omega_0$ represents the initial angular velocity of the torso of the legged robot. $\hat{\omega}_0$ represents the skew symmetric matrix for the initial angular velocity $\omega_0$ of the torso of the legged robot. $\Delta\omega_k$ represents the angular velocity increment of the torso of the legged robot after the k control periods elapse. $\Delta\theta_k$ represents the rotational angle increment of the torso of the legged robot after the k control periods elapse. $\Delta T$ represents the duration of the control period. j represents the sequence numbers of the k control periods, and j is an integer not greater than k−1. $\ddot{p}_j$ represents the acceleration of the legged robot in the $j^{th}$ control period. $\dot{\omega}_j$ represents the angular acceleration of the torso of the legged robot within the $j^{th}$ control period.

In the formula (17), $k\Delta T\hat{\omega}_0(\widetilde{\mathcal{J}_0\omega_0})\omega_0$ is obtained by substituting $U=-\hat{\omega}_0[\mathcal{J}_0\hat{\omega}_0 - \widetilde{\mathcal{J}_0\omega_0}]$ into $k\Delta TU\omega_0$.

In a case that $$k = 0, \dot{\omega}_0 = \mathcal{J}_0^{-1}\sum_{i=1}^{N}(\hat{r}_{i,0} - \hat{p}_0)f_{i,0} - \mathcal{J}_0^{-1}\hat{\omega}_0\mathcal{J}_0\omega_0 \cdot \omega_0$$

represents an angular acceleration of the torso of the legged robot at the initial time point. $\mathcal{J}_0$ represents the rotational inertia of the torso of the legged robot in the world coordinate system at the initial moment.

$$\mathcal{J}_0^{-1}$$

is an inverse matrix of the rotational inertia $\mathcal{J}_0$. N represents the quantity of feet of the legged robot that are in contact with the ground, and N is an integer greater than 0. i represents the sequence number of the foot of the legged robot that is in contact with the ground, and i is a positive integer not greater than N. $r_{i,0}$ represents a contact location, on the ground, of the $i^{th}$ foot of the legged robot that is in contact with the ground in the world coordinate system at the initial time point. $\hat{r}_{i,0}$ represents a skew symmetric matrix for the contact location $r_{i,0}$. $\hat{p}_0$ represents the skew symmetric matrix for the torso location $p_0$ of the legged robot in the world coordinate system. $f_{i,0}$ represents a force applied to the $i^{th}$ foot of the feet of the legged robot that are in contact with the ground in the world coordinate system at the initial time point. $\omega_0$ represents the initial angular velocity of the torso of the legged robot. $\hat{\omega}_0$, represents the skew symmetric matrix for the initial angular velocity $\omega_0$ of the torso of the legged robot. Therefore, do is in a linear relationship with the column vector $F_{total}$. In addition, in combination with the linear relationship between $\ddot{p}_k$ and the force matrix $F_{total}$, the angular acceleration $\dot{\omega}_k$ of the torso of the legged robot within the $k^{th}$ control period can be in a linear relationship with the force matrix $F_{total}$.

Therefore, to sum up, after the k control periods elapse, the rotational angle, the angular velocity, and the acceleration of the torso of the legged robot in the world coordinate system are in a linear relationship with the force matrix $F_{total}$. Therefore, after the k control periods elapse, the torso location, the speed, and the angular velocity of the legged robot in the world coordinate system meet the third relational data, the fifth relational data, and the sixth relational data. The third relational data, the fifth relational data, and the sixth relational data are as follows:

$$\theta_k = A_{\theta,k}F_{total} + b_{\theta,k} \tag{18}$$

$$\omega_k = A_{\omega,k}F_{total} + b_{\omega,k}$$

$$\dot{\omega}_k = A_{\dot{\omega},k}F_{total} + b_{\dot{\omega},k}$$

$\theta_k$ represents the rotational angle of the torso of the legged robot after the k control periods elapse, namely, the predicted rotational angle of the legged robot in a case that the legged robot moves to the target location after the target movement duration elapses. $A_{\theta,k}$ represents the second coefficient matrix. $F_{total}$ represents the force matrix constituted by the force $f_{i,k}$ applied to the foot of the legged robot in contact with the ground. $b_{\theta,k}$ represents the second constant matrix. $\omega_k$ represents the angular velocity of the torso of the legged robot after the k control periods elapse, namely, the predicted angular velocity of the torso of the legged robot in a case that the legged robot moves to the target location. $A_{\omega,k}$ represents the third coefficient matrix. $b_{\omega,k}$ represents the third constant matrix. $\dot{\omega}_k$ represents the angular acceleration of the torso of the legged robot after the k control periods elapse, namely, the predicted angular acceleration of the torso of the legged robot at the target location. $\Delta_{\dot{\omega},k}$ represents the fourth coefficient matrix. $b_{\dot{\omega},k}$ represents the fourth constant matrix.

2. Process of Creating the Second Relational Data by the Computer Device

An acceleration and an angular acceleration of the torso of the legged robot are parameterized to obtain the following formula:

$$\ddot{p}_k = T_{\ddot{p}k}c_{\ddot{p}} + d_{\ddot{p}k} \qquad (19)$$

$$\dot{\omega}_k = T_{\dot{\omega}k}c_{\dot{\omega}} + d_{\dot{\omega}k}$$

$\ddot{p}_k$ represents an acceleration of the torso of the legged robot within the $k^{th}$ control period. $T_{\ddot{p}k}$ represents a time matrix within the $k^{th}$ control period, where $T_{\ddot{p}k}$ is a constant. $c_{\ddot{p}}$ represents a first constant with an undetermined value. $d_{\ddot{p}k}$ represents a constant matrix within the $k^{th}$ control period. $\dot{\omega}k$ represents an angular acceleration of the torso of the legged robot within the $k^{th}$ control period. $T_{\dot{\omega}k}$ represents a time matrix within the $k^{th}$ control period, where $T_{\dot{\omega}k}$ is a constant. $c_{\dot{\omega}}$ represents a second constant with an undetermined value. $d_{\dot{\omega}k}$ represents a constant matrix within the $k^{th}$ control period.

In an aspect of this disclosure, the formula in the first line of the formula (19) is the thirteenth relational data, where the thirteenth relational data indicates a relationship between the acceleration of the legged robot and movement duration, and the formula in the second line of the formula (19) is the sixteenth relational data, where the sixteenth relational data indicates a relationship between the angular acceleration of the legged robot and movement duration.

In an aspect of this disclosure, the acceleration and the angular acceleration of the torso of the legged robot may be parameterized by using a Bezier curve or in another manner.

On the basis of the formula (19), in combination with the formulas (5) and (18), a dynamic constraint for the legged robot within a $k^{th}$ control period during movement can be obtained. In an example, the second relational data is obtained. The second relational data meets the following relationship:

$$\begin{bmatrix} T_{\ddot{p}k} & 0 \\ 0 & T_{\dot{\omega}k} \end{bmatrix}\begin{bmatrix} c_{\ddot{p}} \\ c_{\dot{\omega}} \end{bmatrix} + \begin{bmatrix} d_{\ddot{p}k} \\ d_{\dot{\omega}k} \end{bmatrix} = \begin{bmatrix} A_{\ddot{p},k} \\ A_{\dot{\omega},k} \end{bmatrix}F_{total} + \begin{bmatrix} b_{\ddot{p},k} \\ b_{\dot{\omega},k} \end{bmatrix} \qquad (20)$$

$$T_k C + d_k = A_k F_{total} + b_k$$

$\ddot{p}_k$ represents the acceleration of the torso of the legged robot within a $k^{th}$ control period. $T_{\ddot{p}k}$ represents a time matrix within the $k^{th}$ control period, where $T_{\ddot{p}k}$ is a constant. $c_{\ddot{p}}$ represents the first constant with an undetermined value. $d_{\ddot{p}k}$ represents a constant matrix within the $k^{th}$ control period. $\dot{\omega}k$ represents the angular acceleration of the torso of the legged robot within the $k^{th}$ control period. $T_{\dot{\omega}k}$ represents a time matrix within the $k^{th}$ control period, where $T_{\dot{\omega}k}$ is a constant. $c_{\dot{\omega}}$ represents the second constant with an undetermined value. $d_{\dot{\omega}k}$ represents a constant matrix within the $k^{th}$ control period. $F_{total}$ represents the force matrix constituted by the force $f_{i,k}$ applied to the foot of the legged robot in contact with the ground. $\Delta_{\ddot{p}k}$ represents the sixth coefficient matrix. $b_{\ddot{p},k}$ represents the sixth constant matrix. $A_{\dot{\omega}_k,k}$ represents the fourth coefficient matrix. $b_{\dot{\omega}_k,k}$ represents the fourth constant matrix. $T_k$ is a time matrix including the time matrix $T_{\ddot{p}k}$ and the time matrix $T_{\dot{\omega}k}$. C is a constant with an undetermined value, and the constant C with an undetermined value includes the first constant $c_{\ddot{p}}$ and the second constant $c_{\dot{\omega}}$ with undetermined values. $d_k$ is a constant matrix including the constant matrices $d_{\ddot{p}k}$ and $d_{\dot{\omega}k}$ within the $k^{th}$ control period. $A_k$ is a coefficient matrix including the sixth coefficient matrix $\Delta_{\ddot{p}k}$ and the fourth coefficient matrix $\Delta_{\dot{\omega}_k,k}$. $b_k$ is a constant matrix including the sixth constant matrix and the fourth constant matrix.

In an implementation, relational data respectively corresponding to the torso location, the movement speed, the rotational angle, and the angular velocity of the torso of the legged robot within the $k^{th}$ control period is created based on the formula (19). The relational data is similar to the formula (19), and each piece of relational data includes constants $c_p$, $c_{\dot{p}}$, $c_\theta$, and $c_\omega$ with undetermined values. In an example, the first relational data, the twelfth relational data, the fourteenth relational data, and the fifteenth relational data are created, the first relational data indicating a relationship between a torso location of the legged robot and movement duration, the twelfth relational data indicating a relationship between a movement speed of the legged robot and movement duration, the fourteenth relational data indicating a relationship between a rotational angle of the legged robot and movement duration, and the fifteenth relational data indicating a relationship between an angular velocity of the legged robot and movement duration.

In some aspects, the first relational data, the twelfth relational data, the fourteenth relational data, and the fifteenth relational data that are created meet the following relationship:

$$p_k = T_{pk}c_p + d_{pk} \qquad (21)$$

$$\dot{p}_k = T_{\dot{p}k}c_{\dot{p}} + d_{\dot{p}k}$$

$$\theta_k = T_{\theta k}c_\theta + d_{\theta k}$$

$$\omega_k = T_{\omega k}c_\omega + d_{\omega k}$$

$p_k$ represents a torso location of the torso of the legged robot within the $k^{th}$ control period. $T_{pk}$ represents a time matrix within the $k^{th}$ control period, where $T_{pk}$ is a constant. $c_p$ represents a third constant with an undetermined value. In an aspect of this disclosure, an example in which a constant with an undetermined value in the first relational data is the third constant is used for description. $d_{pk}$ represents a constant matrix within the $k^{th}$ control period. $\dot{p}_k$ represents a movement speed of the torso of the legged robot within the $k^{th}$ control period. $T_{\dot{p}k}$ represents a time matrix within the $k^{th}$ control period, where $T_{\dot{p}k}$ is a constant. $c_{\dot{p}}$ represents a fourth constant with an undetermined value. $d_{\dot{p}k}$ represents a constant matrix within the $k^{th}$ control period. $\theta_k$ represents a rotational angle of the torso of the legged robot within the $k^{th}$ control period. $T_{\theta k}$ represents a time matrix within the $k^{th}$ control period, where $T_{\theta k}$ is a constant. $c_\theta$ represents a fifth constant with an undetermined value. $d_{\theta k}$ represents a constant matrix within the $k^{th}$ control period. $\omega_k$ represents an angular velocity of the torso of the legged robot within the $k^{th}$ control period. $T_{\omega k}$ represents a time matrix within the $k^{th}$ control period, where $T_{\omega k}$ is a constant. $c_{\omega}$ represents a sixth constant with an undetermined value. $d_{\omega k}$ represents a constant matrix within the $k^{th}$ control period.

On the basis of creating the first relational data, the twelfth relational data, the fourteenth relational data, and the fifteenth relational data, in the created formula (20), C is a constant with an undetermined value, and the constant C with an undetermined value includes the first constant $c_{\dot{p}}$, the second constant $c_{\ddot{\omega}}$, the third constant $c_p$, the fourth constant $c_{\dot{p}}$, the fifth constant $c_\theta$, and the sixth constant $c_\omega$.

3. Process of Creating the Friction Constraint by the Computer Device

In an aspect of this disclosure, a friction constraint on one or more contact points at which one or more feet of the legged robot are in contact with the ground is linearized to create a linear friction constraint. To avoid relative sliding when the one or more feet are in contact with the ground during movement of the legged robot, that is, to avoid slipping when the one or more feet are in contact with the ground, the one or more feet of the legged robot are to meet the following friction constraint when being in contact with the ground. In the following, the friction constraint is represented by a friction cone constraint:

$$\begin{cases} n_i^T f_i \geq 0 \\ \sqrt{\left(t_{i1}^T f_i\right)^2 + \left(t_{i2}^T f_i\right)^2} \leq \mu_i n_i^T f_i \end{cases} \quad (22)$$

$n_i$ is a normal vector for a contact point at which an $i^{th}$ foot of the legged robot is in contact with the ground, $n_i \in \mathbb{R}^{3 \times 1}$ indicates that the normal vector $n_i$ is a three-dimensional column vector, and $n_i$ represents a set of real numbers in multidimensional space. $t_{i1}$ and $t_{i2}$ represent two tangent vectors on a plane perpendicular to the normal vector for the contact point between the $i^{th}$ foot of the legged robot and the ground. The tangent vector $t_{i1}$ is orthogonal to the tangent vector $t_{i2}$. $t_{i1}$ and $t_{i2} \in \mathbb{R}^{3 \times 1}$ indicate that both the tangent vector $t_{i1}$ and the tangent vector $t_{i2}$ are three-dimensional column vectors. The normal vector $n_i$, the tangent vector $t_{i1}$, and the tangent vector $t_{i2}$ constitute a unit orthogonal basis. T indicates to transpose a vector. $\mu_i$ is a friction coefficient between the $i^{th}$ foot of the legged robot and the ground. $f_i$ represents a force applied to the $i^{th}$ foot of the legged robot in contact with the ground.

The legged robot is limited by the friction constraint during movement of the legged robot. Therefore, directions of forces applied to the $i^{th}$ foot of the legged robot in contact with the ground are in a friction cone. In an aspect of this disclosure, a quadratic friction constraint may be approximately converted into a linear constraint by using a rectangular pyramid. Therefore, the created friction constraint meets the following relationships:

$$\begin{bmatrix} -\mu_i n_i^T \pm t_{i1}^T \\ -\mu_i n_i^T \pm t_{i2}^T \\ -n_i^T \\ n_i^T \end{bmatrix} f_i \leq \begin{bmatrix} 0 \\ 0 \\ -f_i^{min} \\ f_i^{max} \end{bmatrix} \quad (23)$$

$$D_{mu} f_i \leq f_{lim} \quad (24)$$

$$D_{mu} = \begin{bmatrix} -\mu_i n_i^T \pm t_{i1}^T \\ -\mu_i n_i^T \pm t_{i2}^T \\ -n_i^T \\ n_i^T \end{bmatrix}$$

-continued $$f_{lim} = \begin{bmatrix} 0 \\ 0 \\ -f_i^{min} \\ f_i^{max} \end{bmatrix}$$

$\mu_i$ is the friction coefficient. $n_i$ is the normal vector for the contact point at which the $i^{th}$ foot of the legged robot is in contact with the ground, $n_i \in \mathbb{R}^{3 \times 1}$ indicates that the normal vector $n_i$ is a three-dimensional column vector, and $\mathbb{R}$ represents a set of real numbers in multidimensional space. $t_{i1}$ and $t_{i2}$ represent two tangent vectors on the plane perpendicular to the normal vector for the contact point between the $i^{th}$ foot of the legged robot and the ground. The tangent vector $t_{i1}$ is orthogonal to the tangent vector $t_{i2}$. $t_{i1}$ and $t_{i2} \in \mathbb{R}^{3 \times 1}$ indicate that both the tangent vector $t_{i1}$ and the tangent vector $t_{i2}$ are three-dimensional column vectors. T indicates to transpose a vector. $f_i$ represents the force applied to the $i^{th}$ foot of the legged robot in contact with the ground.

$$f_i^{min}$$

represents a minimum value of the force applied to the $i^{th}$ foot of the legged robot in contact with the ground in a normal direction.

$$f_i^{max}$$

represents a maximum value of the force applied to the $i^{th}$ foot of the legged robot in contact with the ground in the normal direction. Both $$f_i^{min}$$

and $$f_i^{max}$$

are greater than 0. Both $$f_i^{min}$$

and $$f_i^{max}$$

{P(t)} may be any specified values.

$$-\mu_i n_i^T \pm t_{i1}^T$$

and $$-\mu_i n_i^T \pm t_{i2}^T$$

represent normal vectors for four sides of the rectangular pyramid.

Based on the foregoing relational expressions, components, on the four sides of the rectangular pyramid, of the force $f_i$ applied to the $i^{th}$ foot of the legged robot in contact with the ground, and components, in the normal direction, of the force $f_i$ applied to the $i^{th}$ foot of the legged robot in contact with the ground are limited, so that a direction of the force $f_i$ applied to the $i^{th}$ foot of the legged robot in contact with the ground is limited within the rectangular pyramid.

4. Process of Creating the Spatial Constraint by the Computer Device

In an aspect of this disclosure, working space within which one or more feet of the legged robot are capable of moving is linearized to create a linear spatial constraint. The working space for the one or more feet of the legged robot is usually a non-convex region, and can be approximately a convex polyhedron. The convex polyhedron includes a plurality of faces, and each face is represented by the following linear inequality:

$$S_{il}^T x_i \le d_{il}$$

$s_{il}$ represents an outer normal vector for an $l^{th}$ face of a convex polyhedron for an $i^{th}$ foot. A value of l is $(1, 2, \ldots\ldots, L_{total})$, and $L_{total}$ is a positive integer not less than 4. $x_i$ represents a coordinate of a foothold location of the $i^{th}$ foot of the legged robot in a coordinate system of a shoulder joint of a leg to which the $i^{th}$ foot belongs. $d_{il}$ represents a projected value, in an outer normal direction of the $i^{th}$ face of the convex polyhedron, of a vector formed by an origin directed to any point on the $i^{th}$ face.

Linear inequalities for the plurality of faces of the convex polyhedron for the one or more feet of the legged robot are combined to obtain an initial spatial constraint. The initial spatial constraint meets the following relational expression:

$$S_i^T x_i \le d_i \tag{25}$$

$S_i$ represents a set of outer normal vectors for a plurality of faces of the convex polyhedron for the $i^{th}$ foot. $x_i$ represents the coordinate of the foothold location of the $i^{th}$ foot of the legged robot in the coordinate system of the shoulder joint of the leg to which the $i^{th}$ foot belongs. $d_i$ represents a set of projected values, in the outer normal direction of the $l^{th}$ face, of a vector formed by the origin directed to any point on the plurality of faces of the convex polyhedron for the $i^{th}$ foot. T indicates to transpose a matrix.

In the foregoing inequalities, a working space constraint that the $i^{th}$ foot needs to meet during movement of the legged robot may be expressed in the following form:

$$S_i^T \left( R_0^T (I - \widehat{r_{\theta,k} c_\omega} - \widehat{t_{\theta,k}})(p_i - T_{p,k} c_{\tilde{p}} - d_{p,k}) - p_{s,i} \right) \le d_i \tag{26}$$

$$S_i^T \left( R_0^T (I - \widehat{t_{\theta,k}})(p_i - T_{p,k} c_{\tilde{p}} - d_{p,k}) - \right.$$

-continued
$$\left. R_0^T \widehat{t_{\theta,k} c_\omega}(p_i - d_{p,k}) + R_0^T \widehat{t_{\theta,k} c_\omega} T_{p,k} c_{\tilde{p}} - p_{s,i} \right) \le d_i$$

$S_i$ represents the set of outer normal vectors for the plurality of faces of the convex polyhedron for the $i^{th}$ foot. $x_i$ represents the coordinate of the foothold location of the $i^{th}$ foot of the legged robot in the coordinate system of the shoulder joint of the leg to which the $i^{th}$ foot belongs. $d_i$ represents the set of projected values, in the outer normal direction of the $l^{th}$ face, of the vector formed by the origin directed to any point on the plurality of faces of the convex polyhedron for the $i^{th}$ foot. T indicates to transpose a matrix. $R_0$ represents the attitude of the torso of the legged robot in the world coordinate system at the initial time point. I represents an identity matrix. $T_{\theta,k}$ represents a time matrix in the seventeenth relational data, and the seventeenth relational data indicates a relationship between the rotational angle of the torso of the legged robot and the force applied to the foot of the legged robot in contact with the ground within the $k^{th}$ control period. $c_{\tilde{\omega}}$ represents the second constant with an undetermined value. $\widehat{d_{\theta,k}}$ represents a skew symmetric matrix for a constant matrix $d_{\theta,k}$ in the seventeenth relational data. $p_i$ represents a contact location between the $i^{th}$ foot of the legged robot and the ground. $T_{p,k}$ represents a time matrix in the eighteenth relational data, and the eighteenth relational data indicates a relationship between the torso location of the legged robot and the force applied to the foot of the legged robot in contact with the ground within the $k^{th}$ control period. $c_{\tilde{p}}$ represents the first constant with an undetermined value. $d_{p,k}$ represents a constant matrix in the eighteenth relational data. $p_{s,i}$ represents a contact location between the $i^{th}$ foot of the legged robot and the ground. $d_i$ represents the set of projected values, in the outer normal direction of the $l^{th}$ face, of the vector formed by the origin directed to any point on the plurality of faces of the convex polyhedron for the $i^{th}$ foot.

In the formula (26), $R_0^T \widehat{T_{\theta,k} c_\omega} T_{p,k} c_{\tilde{p}}$ represents a value, in an initial body coordinate system, of a cross product of an angle variation caused by an angular acceleration and a displacement variation caused by an acceleration in the world system, namely, a change of a foot location in the body system caused by the angular acceleration and the acceleration. To enable the spatial constraint to be a linear constraint, $R_0^T \widehat{T_{\theta,k} c_\omega} T_{p,k} c_{\tilde{p}}$ in the formula (26) is ignored. After the term $R_0^T \widehat{T_{\theta,k} c_\omega} T_{p,k} c_{\tilde{p}}$ is ignored, a linear spatial constraint is expressed as follows:

$$S_i^T \left( R_0^T (I - \widehat{t_{\theta,k}})(p_i - T_{p,k} c_{\tilde{p}} - d_{p,k}) - R_0^T \widehat{t_{\theta,k} c_\omega}(p_i - d_{p,k}) - p_{s,i} \right) \le d_i$$

$S_i$ represents the set of outer normal vectors for the plurality of faces of the convex polyhedron for the $i^{th}$ foot. $x_i$ represents the coordinate of the foothold location of the $i^{th}$ foot of the legged robot in the coordinate system of the shoulder joint of the leg to which the $i^{th}$ foot belongs. $d_i$ represents the set of projected values, in the outer normal direction of the $l^{th}$ face, of the vector formed by the origin directed to any point on the plurality of faces of the convex polyhedron for the $i^{th}$ foot. T indicates to transpose a matrix. $R_0$ represents the attitude of the torso of the legged robot in the world coordinate system at the initial time point. I represents an identity matrix. $T_{\theta,k}$ represents a time matrix in the twelfth relational data, and the twelfth relational data indicates a relationship between the rotational angle of the torso of the legged robot and the force applied to the foot of the legged robot in contact with the ground within the $k^{th}$ control period. $c_{\dot{\omega}}$ represents the second constant with an undetermined value. $\widetilde{d_{\theta,k}}$ represents a skew symmetric matrix for a constant matrix $d_{\theta,k}$ in the twelfth relational data. $p_i$ represents a contact location between the $i^{th}$ foot of the legged robot and the ground. $T_{p,k}$ represents a time matrix in the thirteenth relational data, and the thirteenth relational data indicates a relationship between the torso location of the legged robot and the force applied to the foot of the legged robot in contact with the ground within the $k^{th}$ control period. $c_{\bar{p}}$ represents the first constant with an undetermined value. $d_{p,k}$ represents a constant matrix in the thirteenth relational data. $p_{s,i}$ represents a contact location between the $i^{th}$ foot of the legged robot and the ground. $d_i$ represents the set of projected values, in the outer normal direction of the $l^{th}$ face, of the vector formed by the origin directed to any point on the plurality of faces of the convex polyhedron for the $i^{th}$ foot.

5. Process of Creating the Fourth Relational Data by the Computer Device

The fourth relational data created by selecting the plurality of sampling time points within the target movement duration and based on the third relational data, the fifth relational data, the sixth relational data, the seventh relational data, the eighth relational data, the ninth relational data, the tenth relational data, the eleventh relational data, and the one or more forces applied to the one or more feet of the legged robot in contact with the ground meets the following relationship:

$$J = J_{grf} + J_{len} + J_{tgt}$$

J represents the target value. $J_{grf}$ represents the weighted sum of squares of forces applied to the one or more feet of the legged robot in contact with the ground. $J_{len}$ represents the sum of the weighted sum of squares of the plurality of distances and the weighted sum of squares of the plurality of rotational angle differences. $J_{tgt}$ represents a weighted sum of squares of the difference between the target rotational angle and the predicted rotational angle, the difference between the target angular velocity and the predicted angular velocity, the difference between the target angular acceleration and the predicted angular acceleration, the difference between the target torso location and the predicted torso location, the difference between the target movement speed and the predicted movement speed, and the difference between the target acceleration and the predicted acceleration in a case that the legged robot is at the target location.

After the fourth relational data is created, the value of the constant C in a case that the target value J is the minimum value is determined by using the created friction constraint and spatial constraint and the following relational expression:

$$\begin{cases} J = J_{grf} + J_{len} + J_{tgt} \\ T_k C + d_k = A_k F_{total} + b_k \\ D_{mu} f_i \leq f_{lim} \\ S_i^T\left(R_0^T(I - \widetilde{i_{\theta,k}})(p_i - T_{p,k} c_{\bar{p}} - d_{p,k}) - R_0^T \widetilde{r_{0,k} c_{\dot{\omega}}}(p_i - d_{p,k}) - p_{s,i}\right) \leq d_i \end{cases}$$

-continued $$D_{mu} = \begin{bmatrix} -\mu_i n_i^T \pm t_{i1}^T \\ -\mu_i n_i^T \pm t_{i2}^T \\ -n_i^T \\ n_i^T \end{bmatrix}$$

$$f_{lim} = \begin{bmatrix} 0 \\ 0 \\ -f_i^{min} \\ f_i^{max} \end{bmatrix}$$

J represents the target value. $J_{grf}$ represents the weighted sum of squares of forces applied to the one or more feet of the legged robot in contact with the ground. $J_{len}$ represents the sum of the weighted sum of squares of the plurality of distances and the weighted sum of squares of the plurality of rotational angle differences. $J_{tgt}$ represents the weighted sum of squares of the difference between the target rotational angle and the predicted rotational angle, the difference between the target angular velocity and the predicted angular velocity, the difference between the target angular acceleration and the predicted angular acceleration, the difference between the target torso location and the predicted torso location, the difference between the target movement speed and the predicted movement speed, and the difference between the target acceleration and the predicted acceleration in a case that the legged robot is at the target location. $T_k$ is a time matrix including the time matrix $T_{\bar{p}k}$ and the time matrix $T_{\dot{\omega}k}$. C is a constant with an undetermined value, and the constant C with an undetermined value includes the first constant $c_{\bar{p}}$ and the second constant $c_{\dot{\omega}}$ with undetermined values. $d_k$ is a constant matrix including the constant matrices $d_{\bar{p}k}$ and $d_{\dot{\omega}k}$ within the $k^{th}$ control period. $A_k$ is a coefficient matrix including the sixth coefficient matrix $A_{\bar{p},k}$ and the fourth coefficient matrix $A_{\dot{\omega}_k,k}$. $b_k$ is a constant matrix including the sixth constant matrix and the fourth constant matrix. $\mu_i$ is the friction coefficient. $n_i$ is the normal vector for the contact point at which the $i^{th}$ foot of the legged robot is in contact with the ground, $n_i \in \mathbb{R}^{3 \times 1}$ indicates that the normal vector $n_i$ is a three-dimensional column vector, and $\mathbb{R}$ represents a set of real numbers in multidimensional space. $t_{i1}$ and $t_{i2}$ represent two tangent vectors on the plane perpendicular to the normal vector for the contact point between the $i^{th}$ foot of the legged robot and the ground. The tangent vector $t_{i1}$ is orthogonal to the tangent vector $t_{i2}$. $t_{i1}$ and $t_{i2} \in \mathbb{R}^{3 \times 1}$ indicate that both the tangent vector $t_{i1}$ and the tangent vector $t_{i2}$ are three-dimensional column vectors. T indicates to transpose a vector. $f_i$ represents the force applied to the $i^{th}$ foot of the legged robot in contact with the ground. $f_i^{min}$ represents the minimum value of the force applied to the $i^{th}$ foot of the legged robot in contact with the ground in the normal direction. $f_i^{max}$ represents the maximum value of the force applied to the $i^{th}$ foot of the legged robot in contact with the ground in the normal direction. Both $$f_i^{min}$$

and $$f_i^{max}$$

are greater than 0. Both $$f_i^{min}$$

and $$f_i^{max}$$

{P(t)} may be any specified values.

$$-\mu_i n_i^T \pm t_{i1}^T$$

and $$-\mu_i n_i^T \pm t_{i2}^T$$

represent the normal vectors for the four sides of the rectangular pyramid. $S_i$ represents the set of outer normal vectors for the plurality of faces of the convex polyhedron for the $i^{th}$ foot. $x_i$ represents the coordinate of the foothold location of the $i^{th}$ foot of the legged robot in the coordinate system of the shoulder joint of the leg to which the $i^{th}$ foot belongs. $d_i$ represents the set of projected values, in the outer normal direction of the $l^{th}$ face, of the vector formed by the origin directed to any point on the plurality of faces of the convex polyhedron for the $i^{th}$ foot. T indicates to transpose a matrix. $R_0$ represents the attitude of the torso of the legged robot in the world coordinate system at the initial time point. I represents an identity matrix. $T_{\theta,k}$ represents a time matrix in the twelfth relational data, and the twelfth relational data indicates a relationship between the rotational angle of the torso of the legged robot and the force applied to the foot of the legged robot in contact with the ground within the $k^{th}$ control period. $c_{\dot{\omega}}$ represents the second constant with an undetermined value. $\widehat{d_{\theta,k}}$ represents a skew symmetric matrix for a constant matrix $d_{\theta,k}$ in the twelfth relational data. $p_i$ represents a contact location between the $i^{th}$ foot of the legged robot and the ground. $T_{p,k}$ represents a time matrix in the thirteenth relational data, and the thirteenth relational data indicates a relationship between the torso location of the legged robot and the force applied to the foot of the legged robot in contact with the ground within the $k^{th}$ control period. $c_{\ddot{p}}$ represents the first constant with an undetermined value. $d_{p,k}$ represents a constant matrix in the thirteenth relational data. $p_{s,i}$ represents a contact location between the $i^{th}$ foot of the legged robot and the ground. $d_i$ represents the set of projected values, in the outer normal direction of the $l^{th}$ face, of the vector formed by the origin directed to any point on the plurality of faces of the convex polyhedron for the $i^{th}$ foot.

In an implementation, the constant C with an undetermined value includes the first constant $c_{\ddot{p}}$, the second constant $c_{\dot{\omega}}$, the third constant $c_p$, the fourth constant $c_{\dot{p}}$, the fifth constant $c_\theta$, and the sixth constant $c_\omega$ with undetermined values. Based on the foregoing relational data, after a value of the constant C is determined, values of the first constant $c_{\ddot{p}}$, the second constant $c_{\dot{\omega}}$, the third constant $c_p$, the fourth constant $c_{\dot{p}}$, the fifth constant $c_\theta$, and the sixth constant $c_\omega$ that are included in the constant C can be determined. A third constant $c_p$ with a determined value may be substituted into the formula in the first line of the formula (21) to obtain a movement trajectory of the torso of the legged robot. In addition, a first constant $c_{\ddot{p}}$, a second constant $c_{\dot{\omega}}$, a fourth constant $c_{\dot{p}}$, a fifth constant $c_\theta$, and a sixth constant $c_\omega$ with determined values may be respectively substituted into corresponding formulas in the formula (19) and the formula (21) to obtain a speed trajectory, an acceleration trajectory, a rotational angle trajectory, an angular velocity trajectory, and an angular acceleration trajectory of the torso of the legged robot, so that the legged robot can be subsequently controlled to move based on the movement trajectory, the speed trajectory, the acceleration trajectory, the rotational angle trajectory, the angular velocity trajectory, and the angular acceleration trajectory of the torso of the legged robot.

The movement trajectory determining method provided in the aspects of this disclosure is applicable to a variety of legged robots, for example, a two-legged robot, a four-legged robot, or a six-legged robot; is applicable to a variety of gaits of a legged robot, for example, bipedal walking, quadrupedal walking, quadrupedal trotting, a gait such as a random gait, or a diagonal gait; and is applicable to a variety of complex environments, for example, a flat ground, an uneven ground, a slope, or stairs. In addition to a ground force, a curve oscillation amplitude, and expected target status data, a sum of squares of accelerations, a sum of squares of speed differences between adjacent points, a sum of squares of acceleration differences, and the like may be further included in the fourth relational data. Location of a contact point: A contact point is not limited to a contact point between a foot of a legged robot and a ground, and is also applicable to contact between an environment and a part such as a body, a torso, or an upper limb of the legged robot. In addition, with respect to the friction constraint, an approximation of a friction cone corresponding to each foot is not limited to four edges. A larger quantity of faces of a pyramid of the friction cone indicates that the friction cone is more real, which may ensure feasibility of a determined movement trajectory, for example.

FIG. 16 is an exemplary diagram of an apparatus or a control apparatus (e.g., a movement trajectory determining apparatus) according to an aspect of this disclosure. The apparatus is configured in a computer device. For example, the computer device is a legged robot or a control device. As shown in FIG. 16, the apparatus includes a creating module 1601 and an obtaining module 1602. The creating module 1601 can be configured to create first relational data, second relational data, and third relational data. The first relational data indicates a relationship between a torso location of a legged robot and movement duration, the second relational data indicates a relationship between the movement duration and one or more forces applied to one or more feet of the legged robot in contact with a ground, and the third relational data indicates a relationship between the one or more forces and a predicted rotational angle of the legged robot in a case that the legged robot moves to a target location after target movement duration elapses. The first relational data and the second relational data both include a constant C with an undetermined value. The creating module 1601 can be further configured to create fourth relational data based on the third relational data. The fourth relational data indicates a positive correlation between a target value J and a status data error The status data error can represent an error between predicted status data and target status data in a case that the legged robot moves to the target location after the target movement duration elapses, the target status data include a target rotational angle of the legged robot at the target location, and the predicted status data include the predicted rotational angle. The obtaining module 1602 can be configured to determine, based on the second relational data and the fourth relational data, a value of the constant C in a case that the target value J is a minimum value, and obtain first relational data with the determined value of the constant C, the first relational data with the determined value of the constant C representing a movement trajectory of a torso of the legged robot.

In another possible implementation, the obtaining module 1602 is configured to: determine, based on the fourth relational data, value(s) of the one or more forces in a case that the target value J is the minimum value; and determine the value of the constant C based on the value(s) of the one or more forces, the target movement duration, and the second relational data.

In another implementation, the creating module 1601 is further configured to: create fifth relational data, the fifth relational data indicating a relationship between the one or more forces and a predicted angular velocity in a case that the legged robot moves to the target location after the target movement duration elapses; and create the fourth relational data based on the third relational data and the fifth relational data, the target status data further including a target angular velocity of the legged robot at the target location, and the predicted status data further including the predicted angular velocity.

In another implementation, the creating module 1601 is configured to set the target value J in the fourth relational data to a sum of squares of a first difference and a second difference, the first difference being a difference between the target rotational angle and the predicted rotational angle, and the second difference being a difference between the target angular velocity and the predicted angular velocity.

In another implementation, the creating module 1601 is further configured to: create sixth relational data, the sixth relational data indicating a relationship between the one or more forces and a predicted angular acceleration in a case that the legged robot moves to the target location after the target movement duration elapses; and create the fourth relational data based on the third relational data and the sixth relational data, the target status data further including a target angular acceleration of the legged robot at the target location, and the predicted status data further including the predicted angular acceleration.

In another implementation, the creating module 1601 is further configured to set the target value J in the fourth relational data to a sum of squares of a first difference and a third difference, the first difference being a difference between the target rotational angle and the predicted rotational angle, and the third difference being a difference between the target angular acceleration and the predicted angular acceleration.

In another implementation, the creating module 1601 is further configured to: create seventh relational data, the seventh relational data indicating a relationship between the one or more forces and a predicted torso location in a case that the legged robot moves to the target location after the target movement duration elapses; and create the fourth relational data based on the third relational data and the seventh relational data, the target status data further including a target torso location of the legged robot at the target location, and the predicted status data further including the predicted torso location.

In another implementation, the creating module 1601 is further configured to set the target value J in the fourth relational data to a sum of squares of a first difference and a fourth difference, the first difference being a difference between the target rotational angle and the predicted rotational angle, and the fourth difference being a difference between the target torso location and the predicted torso location.

In another implementation, the creating module 1601 is further configured to: create eighth relational data, the eighth relational data indicating a relationship between the one or more forces and a predicted movement speed in a case that the legged robot moves to the target location after the target movement duration elapses; and create the fourth relational data based on the third relational data and the eighth relational data, the target status data further including a target movement speed of the legged robot at the target location, and the predicted status data further including the predicted movement speed.

In another implementation, the creating module 1601 is further configured to set the target value J in the fourth relational data to a sum of squares of a first difference and a fifth difference, the first difference being a difference between the target rotational angle and the predicted rotational angle, and the fifth difference being a difference between the target movement speed and the predicted movement speed.

In another implementation, the creating module 1601 is further configured to: create ninth relational data, the ninth relational data indicating a relationship between the one or more forces and a predicted acceleration in a case that the legged robot moves to the target location after the target movement duration elapses; and create the fourth relational data based on the third relational data and the ninth relational data, the target status data further including a target acceleration of the legged robot at the target location, and the predicted status data further including the predicted acceleration.

In another implementation, the creating module 1601 is further configured to set the target value J in the fourth relational data to a sum of squares of a first difference and a sixth difference, the first difference being a difference between the target rotational angle and the predicted rotational angle, and the sixth difference being a difference between the target acceleration and the predicted acceleration.

In another implementation, as shown in FIG. 17, the apparatus further includes a selection module 1603 that can be configured to select a plurality of sampling time points within the target movement duration. The creating module 1601 can be further configured to create tenth relational data for each sampling time point. The tenth relational data indicates a relationship between the one or more forces and a rotational angle of the legged robot after movement duration between the sampling time point and an initial time point elapses; and the creating module 1601 can be configured to create the fourth relational data based on the third relational data and the tenth relational data. The fourth relational data indicates a positive correlation between the target value J and the status data error and the rotational angle at the sampling time point.

In another implementation, the apparatus further includes a selection module 1603 that can be configured to select a plurality of sampling time points within the target movement duration. The creating module 1601 can be further configured to create eleventh relational data for each sampling time point. The eleventh relational data indicates a relationship between the one or more forces and a predicted torso location of the legged robot after movement duration between the sampling time point and an initial time point elapses. The creating module 1601 can be configured to create the fourth relational data based on the third relational data and the eleventh relational data. The fourth relational data indicates a positive correlation between the target value J and the status data error and the predicted torso location at each sampling time point.

In another implementation, the creating module 1601 is further configured to create a friction constraint. The friction constraint indicates a friction constraint met by the one or more forces applied to the one or more feet of the legged robot in contact with the ground. The obtaining module 1602 is configured to: in a case that the friction constraint is met, determine, based on the second relational data and the fourth relational data, the value of the constant C in a case that the target value J is the minimum value.

In another implementation, the creating module 1601 is further configured to create a spatial constraint on the one or more feet of the legged robot, the spatial constraint indicating a spatial range within which the one or more feet of the legged robot is capable of moving, and the spatial constraint includes the constant C. The obtaining module 1602 is configured to: in a case that the spatial constraint is met, determine, based on the second relational data and the fourth relational data, the value of the constant C in a case that the target value J is the minimum value.

In the movement trajectory determining apparatus provided in the foregoing aspect, the division of the foregoing functional modules is merely used as an example for description. In some examples, the functions may be allocated to and can be performed by different functional modules according to requirements. That is, an internal structure of a legged robot is divided into different functional modules, to perform all or some of the functions described above. In addition, the movement trajectory determining apparatus provided in the foregoing aspect and the movement trajectory determining method aspect belong to a same concept. For details about an exemplary implementation process of the movement trajectory determining apparatus, refer to the method aspect.

In an aspect, the apparatus can include processing circuitry that is configured to perform functions of one or more modules in the apparatus, such as one or more of the creating module 1601, the obtaining module 1602, the selection module 1603, and the like.

An aspect of this disclosure further provides a legged robot, the legged robot including a processor and a memory, the memory storing at least one computer program, and the at least one computer program being loaded and executed by the processor to implement the operations performed in the movement trajectory determining method in the foregoing aspects. In an aspect, the memory can include a non-transitory computer-readable storage medium.

Figures 18, 19:
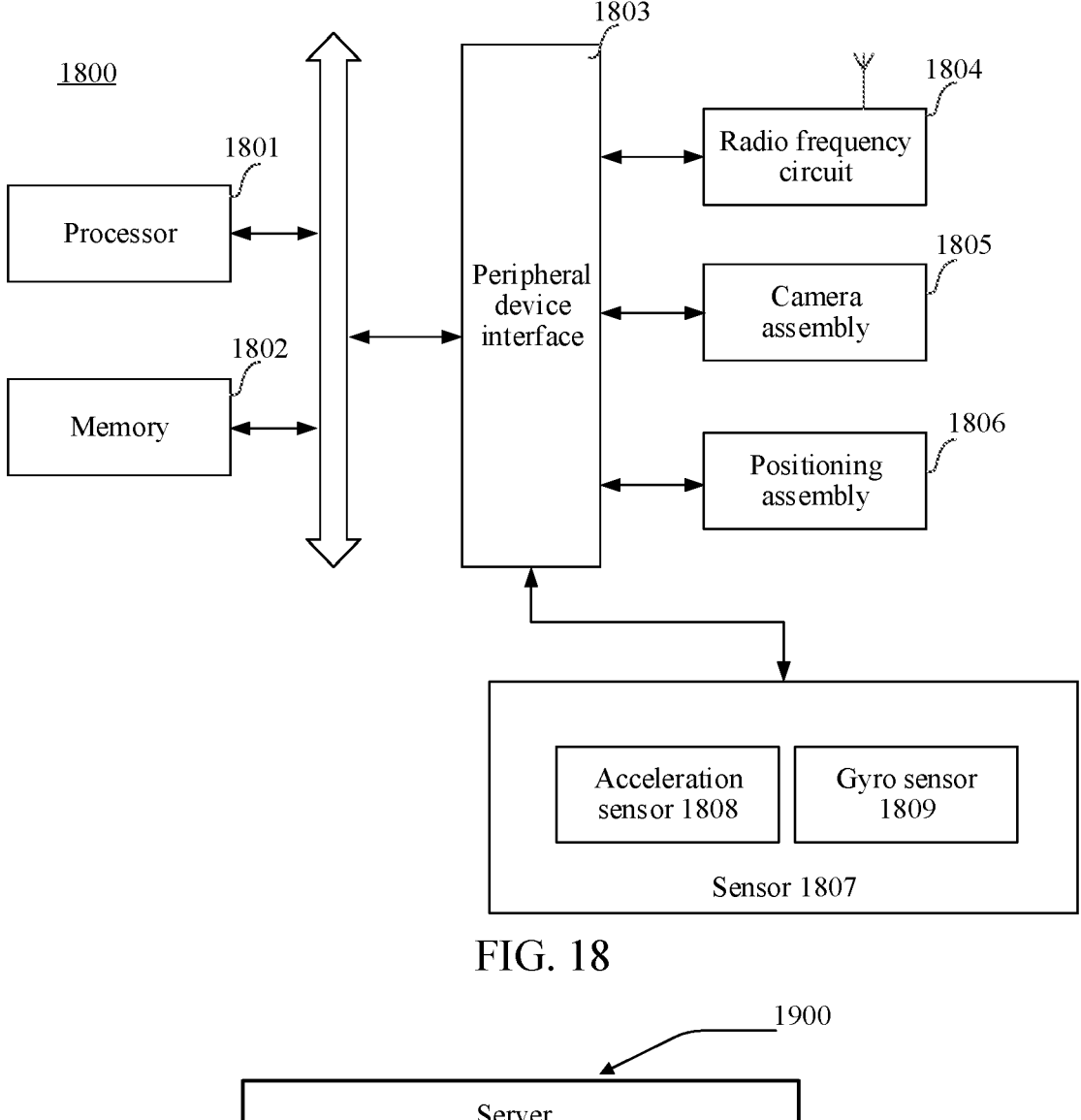
FIG. 18 shows an example of a legged robot according to an aspect of this disclosure.
FIG. 19 shows an exemplary diagram of a server according to an aspect of this disclosure.

FIG. 18 is an example of a legged robot 1800 according to an aspect of this disclosure. The legged robot 1800 is configured to perform the steps performed by the legged robot in the movement trajectory determining method. In an example, the legged robot 1800 includes one or more feet (e.g., including the foot 1202). In an example, the legged robot 1800 includes a control apparatus that includes processing circuitry such as a processor 1801. In an example, the legged robot 1800 can include a memory 1802.

The processing circuitry, such as the processor 1801, may include one or more processing cores, for example, a 4-core processor or an 8-core processor. The processor 1801 may be implemented in at least one hardware form of a digital signal processor (DSP), a field-programmable gate array (FPGA), and a programmable logic array (PLA). The memory 1802 may include one or more computer-readable storage media. The computer-readable storage medium may be non-transient. The memory 1802 may further include a high-speed random access memory and a nonvolatile memory, for example, one or more disk storage devices or flash storage devices. In some aspects, the non-transient computer-readable storage medium in the memory 1802 is configured to store at least one computer program, and the at least one computer program is executed by the processor 1801 to implement the movement trajectory determining method provided in the method aspects of this disclosure.

In some aspects, the legged robot 1800 further includes a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. In an example, the peripheral device includes at least one of a radio frequency circuit 1804, a camera assembly 1805, and a positioning assembly 1806.

The peripheral device interface 1803 may be configured to connect the at least one peripheral related to input/output (I/O) to the processor 1801 and the memory 1802. In some aspects, the processor 1801, the memory 1802, and the peripheral device interface 1803 are integrated on one chip or circuit board. In some other aspects, any one or two of the processor 1801, the memory 1802, and the peripheral device interface 1803 may be implemented on a separate chip or circuit board.

The radio frequency circuit 1804 is configured to receive and transmit a radio frequency (RF) signal, also referred to as an electromagnetic signal. The radio frequency circuit 1804 communicates with a communication network and other communication devices through the electromagnetic signal. The radio frequency circuit 1804 converts an electrical signal into an electromagnetic signal for transmission, or converts a received electromagnetic signal into an electrical signal. The camera assembly 1805 is configured to capture an image or a video. In some aspects, the camera assembly 1805 includes a front-facing camera and a rear-facing camera. In some aspects, the camera assembly 1805 may further include a flash. The flash may be a monochrome temperature flash, or may be a double color temperature flash. The positioning assembly 1806 is configured to determine a current geographic location of the legged robot 1800, to implement navigation or a location based service (LBS).

In some aspects, the legged robot 1800 further includes one or more sensors 1807. The one or more sensors 1807 include but are not limited to an acceleration sensor 1808 and a gyro sensor 1809. The acceleration sensor 1808 may detect a magnitude of an acceleration on three coordinate axes of a coordinate system established based on the legged robot 1800. For example, the acceleration sensor 1808 may be configured to detect components of an acceleration of gravity on the three coordinate axes. The gyro sensor 1809 may detect a body direction and a rotational angle of the legged robot 1800. The gyro sensor 1809 may cooperate with the acceleration sensor 1808 to capture a 3D action performed by a user on the legged robot 1800.

A person skilled in the art may understand that the structure shown in FIG. 18 constitutes no limitation on the legged robot 1800, and the terminal may include more or fewer components than those shown in the figure, or some components may be combined, or a different component layout may be used.

An aspect of this disclosure further provides a control device, the control device including a processor and a memory, the memory storing at least one computer program, and the at least one computer program being loaded and executed by the processor to implement the operations performed in the movement trajectory determining method in the foregoing aspects.

In some aspects, the control device is provided as a server. FIG. 19 is an exemplary diagram of a control device according to an aspect of this disclosure. The server 1900 may vary greatly due to different configurations or performance, and may include one or more central processing units (CPUs) 1901 and one or more memories 1902. The memory 1902 stores at least one computer program, and the at least one computer program is loaded and executed by the CPU 1901 to implement the methods provided in the foregoing method aspects. Certainly, the control device may further include components such as a wired or wireless network interface, a keyboard, and an input/output interface, to facilitate input and output. The control device may further include another component configured to implement a function of the device. Details are not described herein.

An aspect of this disclosure further provides a computer-readable storage medium. The computer-readable storage medium stores at least one computer program, and the at least one computer program is loaded and executed by a processor to implement the operations performed in the movement trajectory determining method in the foregoing aspects.

An aspect of this disclosure further provides a computer program product, including a computer program, the computer program, when being executed by a processor, implements the operations performed in the movement trajectory determining method according to the foregoing aspects.

A person of ordinary skill in the art may understand that all or some of the steps of the foregoing aspects may be implemented by hardware, or may be implemented by a program instructing relevant hardware. The program may be stored in a computer-readable storage medium. The storage medium may be a read-only memory, a magnetic disk, an optical disc, or the like.

One or more modules, submodules, and/or units of the apparatus (or the control apparatus) can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are merely exemplary aspects of this disclosure, and are not intended to limit the scope of this disclosure. Other embodiments shall also fall within the scope of this disclosure. Any modification, equivalent replacement, or improvement made within the spirit and principle of the aspects of this disclosure shall fall within the protection scope of this disclosure.

What is claimed is:

1. A method for movement trajectory determination, the method comprising:

generating second relational data and third relational data, the second relational data indicating a relationship between a movement duration and one or more forces applied to one or more feet of a legged robot in contact with a ground, the third relational data indicating a relationship between the one or more forces and a predicted rotational angle of the legged robot when the legged robot moves to a target location after a target movement duration elapses, and the second relational data comprising a vector C with elements to be determined;

generating fourth relational data based at least on the third relational data, the fourth relational data indicating a positive correlation between a target value J that is associated with the vector C and a status data error between predicted status data and target status data when the legged robot moves to the target location after the target movement duration elapses, the target status data comprising a target rotational angle of the legged robot at the target location, and the predicted status data comprising the predicted rotational angle;

determining, based on the second relational data and the fourth relational data, the elements of the vector C that minimize the target value J;

determining first relational data with the determined elements of the vector C, the first relational data with the determined elements of the vector C representing a movement trajectory of a torso of the legged robot, and causing the legged robot to move based on the movement trajectory.

2. The method according to claim 1, wherein the determining the elements of the vector C comprises:

determining, based on the fourth relational data, the one or more forces that minimize the target value J; and determining the elements of the vector C based on the one or more forces, the target movement duration, and the second relational data.

3. The method according to claim 1, wherein the method includes generating fifth relational data, the fifth relational data indicating a relationship between the one or more forces and a predicted angular velocity when the legged robot moves to the target location after the target movement duration elapses; and the generating the fourth relational data includes:

generating the fourth relational data based on the third relational data and the fifth relational data, the target status data further comprising a target angular velocity of the legged robot at the target location, and the predicted status data further comprising the predicted angular velocity.

4. The method according to claim 3, wherein the generating the fourth relational data based on the third relational data and the fifth relational data comprises:

determining the target value J in the fourth relational data based on a first difference and a second difference, the first difference being between the target rotational angle and the predicted rotational angle, and the second difference being between the target angular velocity and the predicted angular velocity.

5. The method according to claim 1, wherein the method further comprises generating sixth relational data, the sixth relational data indicating a relationship between the one or more forces and a predicted angular acceleration when the legged robot moves to the target location after the target movement duration elapses; and the generating the fourth relational data based on the third relational data includes generating the fourth relational data based on the third relational data and the sixth relational data, the target status data further comprising a target angular acceleration of the legged robot at the target location, and the predicted status data further comprising the predicted angular acceleration.

6. The method according to claim 5, wherein the generating the fourth relational data based on the third relational data and the sixth relational data comprises:

determining the target value J in the fourth relational data based on a first difference and a third difference, the first difference being between the target rotational angle and the predicted rotational angle, and the third difference being between the target angular acceleration and the predicted angular acceleration.

7. The method according to claim 1, wherein the method further comprises generating seventh relational data, the seventh relational data indicating a relationship between the one or more forces and a predicted torso location when the legged robot moves to the target location after the target movement duration elapses; and the generating the fourth relational data based on the third relational data includes generating the fourth relational data based on the third relational data and the seventh relational data, the target status data further comprising a target torso location of the legged robot at the target location, and the predicted status data further comprising the predicted torso location.

8. The method according to claim 7, wherein the generating the fourth relational data based on the third relational data and the seventh relational data comprises:

determining the target value J in the fourth relational data based on a first difference and a fourth difference, the first difference being between the target rotational angle and the predicted rotational angle, and the fourth difference being between the target torso location and the predicted torso location.

9. The method according to claim 1, wherein the method further comprises generating eighth relational data, the eighth relational data indicating a relationship between the one or more forces and a predicted movement speed when the legged robot moves to the target location after the target movement duration elapses; and the generating the fourth relational data includes:

generating the fourth relational data based on the third relational data and the eighth relational data, the target status data further comprising a target movement speed of the legged robot at the target location, and the predicted status data further comprising the predicted movement speed.

10. The method according to claim 9, wherein the generating the fourth relational data based on the third relational data and the eighth relational data comprises:

determining the target value J in the fourth relational data based on a first difference and a fifth difference, the first difference being between the target rotational angle and the predicted rotational angle, and the fifth difference being between the target movement speed and the predicted movement speed.

11. The method according to claim 1, wherein the method includes generating ninth relational data, the ninth relational data indicating a relationship between the one or more forces and a predicted acceleration when the legged robot moves to the target location after the target movement duration elapses; and the generating the fourth relational data based on the third relational data includes:

generating the fourth relational data based on the third relational data and the ninth relational data, the target status data further comprising a target acceleration of the legged robot at the target location, and the predicted status data further comprising the predicted acceleration.

12. The method according to claim 11, wherein the generating the fourth relational data based on the third relational data and the ninth relational data comprises:

determining the target value J in the fourth relational data based on a first difference and a sixth difference, the first difference being between the target rotational angle and the predicted rotational angle, and the sixth difference being between the target acceleration and the predicted acceleration.

13. The method according to claim 1, wherein the method includes selecting a plurality of sampling time points within the target movement duration; and generating tenth relational data for each sampling time point, the tenth relational data indicating a relationship between the one or more forces and a rotational angle of the legged robot after a movement duration between the sampling time point and an initial time point elapses; and the generating the fourth relational data based on the third relational data includes generating the fourth relational data based on the third relational data and the tenth relational data, the fourth relational data indicating a positive correlation between the target value J and the status data error and the rotational angle at the sampling time point.

14. The method according to claim 1, wherein the method includes selecting a plurality of sampling time points within the target movement duration; and generating eleventh relational data for each sampling time point, the eleventh relational data indicating a relationship between the one or more forces and a predicted torso location of the legged robot after a movement duration between the sampling time point and an initial time point elapses; and the generating the fourth relational data based on the third relational data includes generating the fourth relational data based on the third relational data and the eleventh relational data, the fourth relational data indicating a positive correlation between the target value J and the status data error and the predicted torso location at each sampling time point.

15. The method according to claim 1, wherein c the method includes generating a friction constraint for the one or more forces applied to the one or more feet of the legged robot in contact with the ground; and the determining the elements of the vector C includes determining, based on the second relational data, the fourth relational data, and the friction constraint, the elements of the vector C that minimize the target value J.

16. The method according to claim 1, wherein the method includes generating a spatial constraint on the one or more feet of the legged robot, the spatial constraint indicating a spatial range within which the one or more feet of the legged robot is allowed to move, and the spatial constraint comprising the vector C; and the determining the elements of the vector C includes determining, based on the second relational data, the fourth relational data, and the spatial constraint, the elements of the vector C that minimize the target value J.

17. A control apparatus, comprising:

processing circuitry configured to:

generate second relational data and third relational data, the second relational data indicating a relationship between a movement duration and one or more forces applied to one or more feet of a legged robot in contact with a ground, the third relational data indicating a relationship between the one or more forces and a predicted rotational angle of the legged robot when the legged robot moves to a target location after a target movement duration elapses, and the second relational data comprising a vector C with elements to be determined, generate fourth relational data based on the third relational data, the fourth relational data indicating a positive correlation between a target value J that is associated with the vector C and a status data error, the status data error representing an error between predicted status data and target status data when the legged robot moves to the target location after the target movement duration elapses, the target status data comprising a target rotational angle of the legged robot at the target location, and the predicted status data comprising the predicted rotational angle;

determine, based on the second relational data and the fourth relational data, the elements of the vector C that minimize the target value J;

determine first relational data with the determined elements of the vector C, the first relational data with the determined elements of the vector C representing a movement trajectory of a torso of the legged robot; and cause the legged robot to move based on the movement trajectory.

18. A legged robot, the legged robot comprising:

the one or more feet; and the control apparatus according to claim 17.

19. A non-transitory computer-readable storage medium storing instructions which when executed by at least one processor cause the at least one processor to perform:

generating second relational data and third relational data, the second relational data indicating a relationship between a movement duration and one or more forces applied to one or more feet of a legged robot in contact with a ground, the third relational data indicating a relationship between the one or more forces and a predicted rotational angle of the legged robot when the legged robot moves to a target location after a target movement duration elapses, and the second relational data comprising a vector C with elements to be determined;

generating fourth relational data based on the third relational data, the fourth relational data indicating a positive correlation between a target value J that is associated with the vector C and a status data error, the status data error representing an error between predicted status data and target status data when the legged robot moves to the target location after the target movement duration elapses, the target status data comprising a target rotational angle of the legged robot at the target location, and the predicted status data comprising the predicted rotational angle;

determining, based on the second relational data and the fourth relational data, the elements of the vector C that minimize the target value J;

determining first relational data with the determined elements of the vector C, the first relational data with the determined elements of the vector C representing a movement trajectory of a torso of the legged robot; and causing the legged robot to move based on the movement trajectory.

* * * * *